US012800885B2

(12) United States Patent
Tsai

(10) Patent No.: US 12,800,885 B2
(45) Date of Patent: Nov. 17, 2026

(54) IMAGING OPTICAL LENS ASSEMBLY, IMAGE CAPTURING UNIT AND ELECTRONIC DEVICE

(71) Applicant: LARGAN PRECISION CO., LTD., Taichung City (TW)

(72) Inventor: Cheng-Yu Tsai, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 187 days.

(21) Appl. No.: 18/922,175

(22) Filed: Oct. 21, 2024

(65) Prior Publication Data

US 2026/0056394 A1 Feb. 26, 2026

(30) Foreign Application Priority Data

Aug. 21, 2024 (TW) ................................ 113131457

(51) Int. Cl.
*G02B 15/14* (2006.01)
*G02B 13/00* (2006.01)
*G02B 13/02* (2006.01)

(52) U.S. Cl.
CPC ....... *G02B 13/009* (2013.01); *G02B 13/0045* (2013.01); *G02B 13/0065* (2013.01); *G02B 13/02* (2013.01); *G02B 15/1421* (2019.08)

(58) Field of Classification Search
CPC .................................................... G02B 15/142
See application file for complete search history.

(56) References Cited

U.S. PATENT DOCUMENTS 4,560,253 A 12/1985 Ogino
5,543,970 A 8/1996 Hata et al.
5,559,635 A 9/1996 Sato
5,570,234 A 10/1996 Shibata
(Continued)

FOREIGN PATENT DOCUMENTS

CN 101566724 A 10/2009
CN 116088154 A 5/2023
(Continued)

OTHER PUBLICATIONS

GB Search and Examination Report dated Jan. 9, 2026 in application No. 2510945.5.
(Continued)

*Primary Examiner* — Edmond C Lau
(74) *Attorney, Agent, or Firm* — Maschoff Brennan

(57) ABSTRACT

An imaging optical lens assembly includes two lens groups which are, in order from an object side to an image side along an optical path: a first lens group and a second lens group. The imaging optical lens assembly has a first state corresponding to an infinite object distance. The imaging optical lens assembly at the first state has a long-focal-end first state corresponding to a long focal end and a short-focal-end first state corresponding to a short focal end during a zoom process. At least one lens group of the two lens groups moves along a direction parallel to an optical axis during the zoom process. The first lens group has positive refractive power. At least one of an object-side surface and an image-side surface of at least one lens element of the two lens groups has at least one inflection point in an off-axis region thereof.

28 Claims, 25 Drawing Sheets

(56) References Cited

U.S. PATENT DOCUMENTS

| | | | |
|---|---|---|---|
| 5,636,067 | A | 6/1997 | Shimizu |
| 5,659,428 | A | 8/1997 | Hagimori |
| 5,798,873 | A | 8/1998 | Hoshi et al. |
| 5,808,810 | A | 9/1998 | Mihara |
| 6,028,717 | A | 2/2000 | Kohno et al. |
| 6,154,322 | A | 11/2000 | Nakayama |
| 8,023,198 | B2 | 9/2011 | Masugi |
| 2017/0045720 | A1 * | 2/2017 | Okumura ....... G02B 15/143507 |
| 2019/0004286 | A1 * | 1/2019 | Heu ..................... G02B 15/143 |
| 2021/0063704 | A1 | 3/2021 | Son et al. |
| 2021/0157090 | A1 | 5/2021 | Lin et al. |
| 2022/0308322 | A1 | 9/2022 | Liu |
| 2023/0168466 | A1 | 6/2023 | Kim et al. |
| 2023/0204906 | A1 | 6/2023 | Lim et al. |

FOREIGN PATENT DOCUMENTS

| | | | |
|---|---|---|---|
| CN | 116482837 | A | 7/2023 |
| CN | 117075317 | A | 11/2023 |
| CN | 117348210 | A | 1/2024 |
| CN | 117590559 | A | 2/2024 |
| CN | 117590570 | A | 2/2024 |
| CN | 118091911 | A | 5/2024 |
| JP | S62138818 | A | 6/1987 |
| JP | H06-235858 | A | 8/1994 |
| JP | H06258577 | A | 9/1994 |
| JP | H08129132 | A | 5/1996 |
| JP | H112762 | A | 1/1999 |
| JP | H11-305125 | A | 11/1999 |
| JP | 2000137164 | A | 5/2000 |
| JP | 2006163075 | A | 6/2006 |
| JP | 2021189188 | A | 12/2021 |
| TW | 201504676 | A | 2/2015 |
| WO | 2023160594 | A1 | 8/2023 |
| WO | 2024062416 | A1 | 3/2024 |

OTHER PUBLICATIONS

Taiwan Office Action dated Oct. 13, 2025 as received in application No. 113131457.

* cited by examiner

IMAGING OPTICAL LENS ASSEMBLY, IMAGE CAPTURING UNIT AND ELECTRONIC DEVICE

RELATED APPLICATIONS

This application claims priority to Taiwan Application 113131457, filed on Aug. 21, 2024, which is incorporated by reference herein in its entirety.

BACKGROUND

Technical Field

The present disclosure relates to an imaging optical lens assembly, an image capturing unit and an electronic device, more particularly to an imaging optical lens assembly and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

Specifically, in recent years, electronic devices such as electronic products have been required for lightness and thinness, so it is difficult for a conventional optical lens to simultaneously meet the requirements of high-specification and compactness, especially a small lens featuring a large aperture or a telephoto function. The conventional telephoto lens becomes unable to catch the technology requirements and thus have problems such as an overly long total length, an overly small aperture, insufficient quality and inability in compactness. Therefore, it needs to introduce different optical features to overcome the abovementioned problems for meeting the requirements.

Moreover, in order to enhance the mid-to-long-range photographing experience, some current mobile phones adopt a fixed-focus telephoto lens combined with digital zoom algorithms. However, the visual effects obtained are not from true optical zoom, leading to a decrease in image quality. Alternatively, other mobile phones achieve zoom effects across near and far ranges through the collaboration of a plurality of lenses with different focal lengths. However, its drawbacks include screen stuttering when switching between lenses and discrepancies in light incident amount and color consistency, resulting in a poor photographing experience. Additionally, the use of multiple lenses significantly increases the occupied space within an electronic product.

SUMMARY

According to one aspect of the present disclosure, an imaging optical lens assembly includes two lens groups. The two lens groups are, in order from an object side to an image side along an optical path, a first lens group and a second lens group. Each lens element of the two lens groups has an object-side surface facing toward the object side and an image-side surface facing toward the image side. The total number of lens groups of the imaging optical lens assembly is two.

Preferably, the imaging optical lens assembly has a first state corresponding to an infinite object distance.

Preferably, the imaging optical lens assembly at the first state has a long-focal-end first state corresponding to a long focal end and a short-focal-end first state corresponding to a short focal end during a zoom process. Preferably, at least one lens group of the two lens groups moves along a direction parallel to an optical axis during the zoom process.

Preferably, the first lens group has positive refractive power. Preferably, at least one of the object-side surface and the image-side surface of at least one lens element of the two lens groups has at least one inflection point in an off-axis region thereof.

When half of a maximum field of view of the imaging optical lens assembly at the short-focal-end first state is HFOVSf, half of a maximum field of view of the imaging optical lens assembly at the long-focal-end first state is HFOVLf, an axial distance between the object-side surface of a lens element closest to the object side and an image surface of the imaging optical lens assembly at the short-focal-end first state is TLSf, and an axial distance between the object-side surface of the lens element closest to the object side and the image surface of the imaging optical lens assembly at the long-focal-end first state is TLLf, the following conditions are preferably satisfied:

$$1.20 < HFOVSf/HFOVLf < 2.50; \text{ and}$$

$$0 \leq 10 \times |TLSf - TLLf|/TLSf < 1.00.$$

According to another aspect of the present disclosure, an imaging optical lens assembly includes two lens groups. The two lens groups are, in order from an object side to an image side along an optical path, a first lens group and a second lens group. Each lens element of the two lens groups has an object-side surface facing toward the object side and an image-side surface facing toward the image side. The total number of lens groups of the imaging optical lens assembly is two.

Preferably, the imaging optical lens assembly has a first state corresponding to an infinite object distance and a second state corresponding to a finite object distance.

Preferably, the imaging optical lens assembly performs a focus process to change the first state to the second state thereof during movement of an imaged object from the infinite object distance to the finite object distance.

Preferably, the imaging optical lens assembly at the first state has a long-focal-end first state corresponding to a long focal end and a short-focal-end first state corresponding to a short focal end during a zoom process. Preferably, at least one lens group of the two lens groups moves along a direction parallel to an optical axis during the zoom process.

Preferably, at least one of the object-side surface and the image-side surface of at least one lens element of the two lens groups has at least one inflection point in an off-axis region thereof.

When half of a maximum field of view of the imaging optical lens assembly at the short-focal-end first state is HFOVSf, half of a maximum field of view of the imaging optical lens assembly at the long-focal-end first state is HFOVLf, an axial distance between the object-side surface of a lens element closest to the object side and an image surface of the imaging optical lens assembly at the short-focal-end first state is TLSf, and an axial distance between the object-side surface of the lens element closest to the object side and the image surface of the imaging optical lens assembly at the long-focal-end first state is TLLf, the following conditions are preferably satisfied:

$$1.20 < HFOVSf/HFOVLf < 2.50; \text{ and}$$

$$0 \leq 10 \times |TLSf - TLLf|/TLSf < 1.00.$$

According to another aspect of the present disclosure, an image capturing unit includes one of the aforementioned imaging optical lens assemblies and an image sensor, wherein the image sensor is disposed on the image surface of the imaging optical lens assembly.

According to another aspect of the present disclosure, an electronic device includes a first image capturing unit and a second image capturing unit, wherein the first image capturing unit includes the aforementioned image capturing unit. Half of a maximum field of view of the first image capturing unit ranges from 5 degrees to 30 degrees. The second image capturing unit is located on the same side of the electronic device as the first image capturing unit. Half of a maximum field of view of the second image capturing unit ranges from 30 degrees to 60 degrees.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
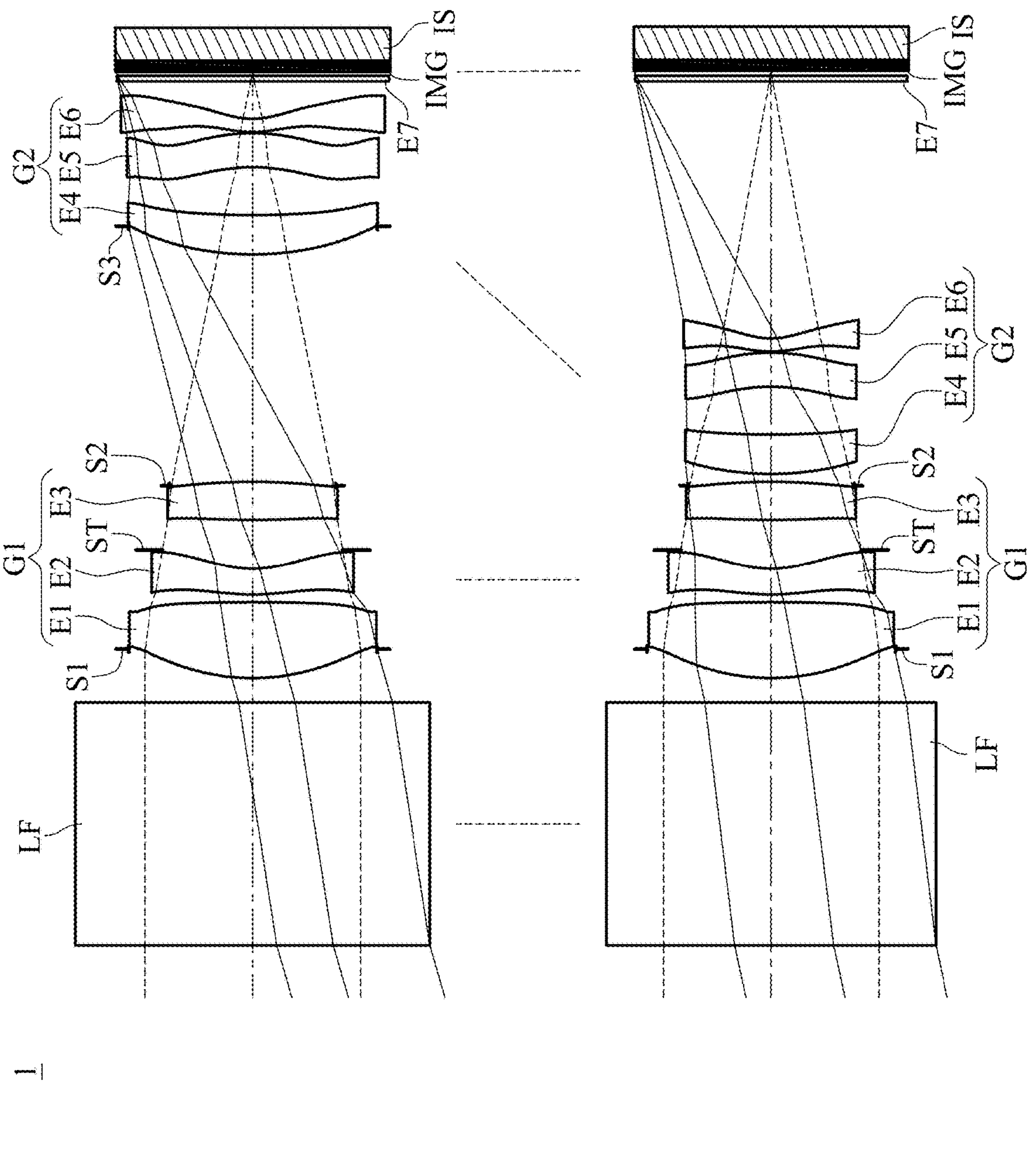
FIG. 1 is a schematic view of an image capturing unit respectively at a short-focal-end first state and at a long-focal-end first state according to the 1st embodiment of the present disclosure.

An imaging optical lens assembly can include two lens groups. The two lens groups can be, in order from an object side to an image side along an optical path, a first lens group and a second lens group. The two lens groups can include six lens elements. The six lens elements can be, in order from the object side to the image side along the optical path, a first lens element, a second lens element, a third lens element, a fourth lens element, a fifth lens element and a sixth lens element. The total number of lens groups of the imaging optical lens assembly can be two. The first lens group can include the first lens element, the second lens element and the third lens element, and the second lens group can include the fourth lens element, the fifth lens element and the sixth lens element. Each lens element of the two lens groups can have an object-side surface facing toward the object side and an image-side surface facing toward the image side. Therefore, with the configuration of the total two lens groups of the imaging optical lens assembly, it is favorable for obtaining a proper balance between the overall size, the zoom ratio, the object distance range, the movement focus, the image quality and the assembly difficulty, thereby achieving the optical zoom and the optical focus for mid-to-long-range photographing.

The imaging optical lens assembly can have a first state corresponding to an infinite object distance and a second state corresponding to a finite object distance, wherein the first state can refer to a state of the imaging optical lens assembly with an imaged object at an infinite distance (the infinite object distance), and the second state can refer to a state of the imaging optical lens assembly with an imaged object at a finite distance (the finite object distance). In the present disclosure, the finite object distance can refer to a position of an imaged object which is obviously closer to the imaging optical lens assembly than infinity. Moreover, the infinite object distance refers to an axial distance between an imaged object and the object-side surface of one lens element of the imaging optical lens assembly closest to the object side (e.g., the first lens element) being equal to or greater than 1000 meters. Moreover, the finite object distance refers to an axial distance between an imaged object and the object-side surface of one lens element of the imaging optical lens assembly closest to the object side (e.g., the first lens element) being equal to or less than 5 meters. When an imaged object at the infinite object distance moves to the finite object distance, the imaging optical lens assembly can perform a focus process to change the first state to the second state thereof. Conversely, when an imaged object at the finite object distance moves to the infinite object distance, the imaging optical lens assembly can also perform the focus process to change the second state to the first state thereof. At least one lens group of the two lens groups can move along a direction parallel to an optical axis during the focus process. Moreover, the second lens group can move along the direction parallel to the optical axis during the focus process. Therefore, it is favorable for preventing an extension or a shrinkage of the overall lens structure of the imaging optical lens assembly towards or from the object side due to the focus process, thereby improving operability and robustness of the lens and simplifying the optical design and the mechanism thereof. Moreover, all lens elements of each of the first lens group and the second lens group can have no relative movement with respect to one another during the focus process. Therefore, it is favorable for simplifying the mechanism thereof.

The imaging optical lens assembly at the first state can have a long-focal-end first state corresponding to a long focal end and a short-focal-end first state corresponding to a short focal end during a zoom process. At least one lens group of the two lens groups can move along a direction parallel to the optical axis during the zoom process. Please refer to FIG. 1, which is a schematic view of an image capturing unit respectively at a short-focal-end first state and at a long-focal-end first state according to the 1st embodiment of the present disclosure. The upper part of FIG. 1 shows the imaging optical lens assembly at the short-focal-end first state, and the lower part of FIG. 1 shows the imaging optical lens assembly at the long-focal-end first state. Moreover, the second lens group can move along the direction parallel to the optical axis during the zoom process. Therefore, it is favorable for preventing an extension or a shrinkage of the overall lens structure of the imaging optical lens assembly towards or from the object side due to the zoom process, thereby improving operability and robustness of the lens and simplifying the optical design and the mechanism thereof. Moreover, all lens elements of each of the first lens group and the second lens group can have no relative movement with respect to one another during the zoom process. Therefore, it is favorable for simplifying the mechanism thereof.

Similarly, the imaging optical lens assembly at the second state can have a long-focal-end second state corresponding to the long focal end and a short-focal-end second state corresponding to the short focal end during the zoom process.

The first lens group can have positive refractive power. Therefore, it is favorable for adjusting the refractive power of the first lens group so as to converge light, thereby controlling the field of view while increasing light incident amount.

A lens element of the first lens group closest to the object side can have positive refractive power. Therefore, it is favorable for converging light to effectively control the travelling direction of the optical path, while obtaining a proper balance between the field of view and the size distribution. In one aspect of the present application, the lens element of the first lens group closest to the object side can be the first lens element.

The object-side surface of the first lens element can be convex in a paraxial region thereof. Therefore, it is favorable for adjusting the lens shape of the first lens element, thereby reducing the outer diameter of the imaging optical lens assembly at an object end thereof.

The second lens element can have negative refractive power. Therefore, it is favorable for effectively balancing the intensity of the refractive power of the first lens element so as to prevent generating excessive aberrations due to an overly large deflective angle of light.

The sixth lens element can have negative refractive power. Therefore, it is favorable for balancing the refractive power of the imaging optical lens assembly at an image end thereof so as to increase convergence quality of light from various fields of view onto an image surface and to correct aberrations. The image-side surface of the sixth lens element can be concave in a paraxial region thereof. Therefore, it is favorable for assisting in balancing the back focal length of the imaging optical lens assembly while correcting off-axis aberrations.

Figure 20:
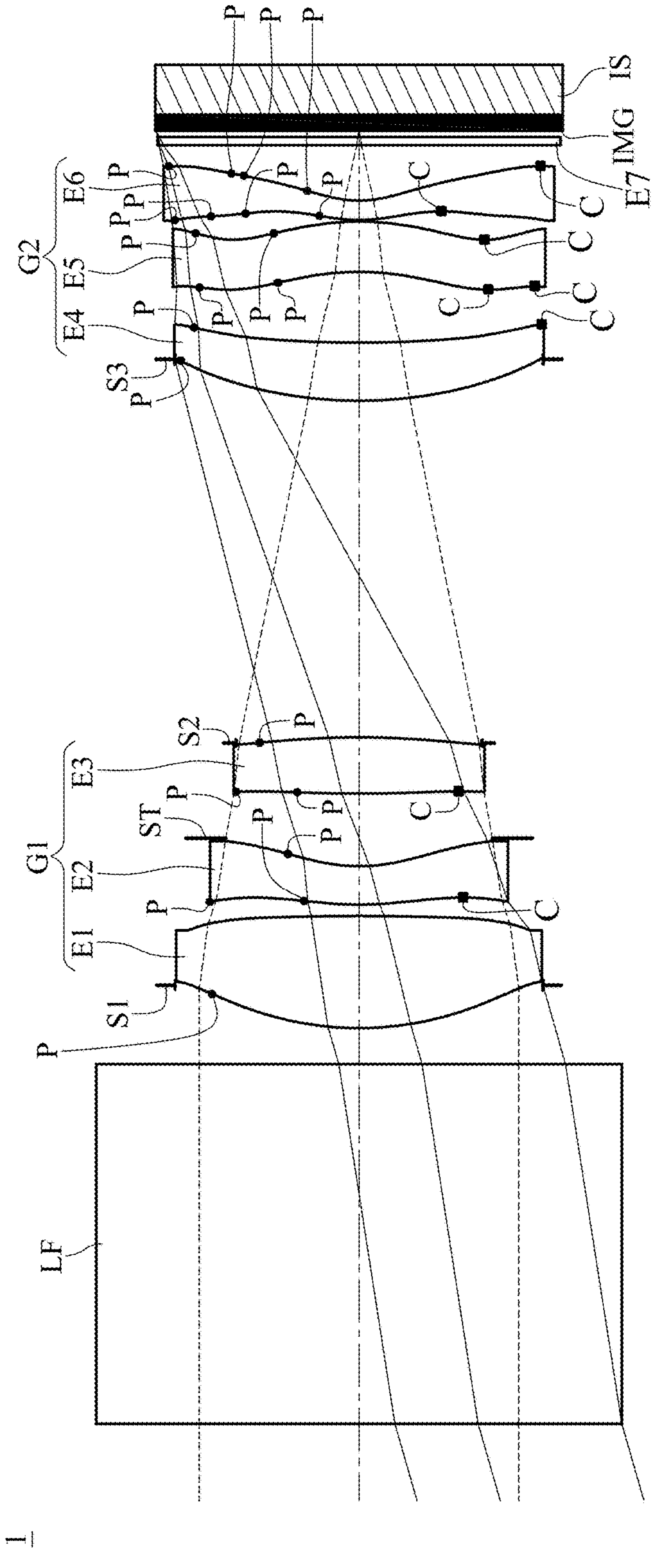
FIG. 20 shows a schematic view of inflection points and critical points of lens elements of image capturing unit at the short-focal-end first state according to the 1st embodiment of the present disclosure.

According to the present disclosure, at least one of the object-side surface and the image-side surface of at least one lens element of the two lens groups can have at least one inflection point in an off-axis region thereof. Therefore, it is favorable for increasing the optical design flexibility so as to correct astigmatism. Moreover, the image-side surface of the sixth lens element can have at least one inflection point in an off-axis region thereof. Therefore, it is favorable for controlling the angle of light passing through the periphery of the image-side surface of the sixth lens element, thereby maintaining optical illuminance and preventing generating excessive aberrations due to an overly large deflective angle of light. Please refer to FIG. 20, which shows a schematic view of inflection points P of the object-side surface of the first lens element E1, the object-side surface of the second lens element E2, the image-side surface of the second lens element E2, the object-side surface of the third lens element E3, the image-side surface of the third lens element E3, the object-side surface of the fourth lens element E4, the image-side surface of the fourth lens element E4, the object-side surface of the fifth lens element E5, the image-side surface of the fifth lens element E5, the object-side surface of the sixth lens element E6 and the image-side surface of the sixth lens element E6 of the image capturing unit at the short-focal-end first state according to the 1st embodiment of the present disclosure. The inflection points of the object-side surface of the first lens element, the object-side surface of the second lens element, the image-side surface of the second lens element, the object-side surface of the third lens element, the image-side surface of the third lens element, the object-side surface of the fourth lens element, the image-side surface of the fourth lens element, the object-side surface of the fifth lens element, the image-side surface of the fifth lens element, the object-side surface of the sixth lens element and the image-side surface of the sixth lens element in FIG. 20 are only exemplary. Each of the object-side surfaces and the image-side surfaces of the lens elements in the 1st and other embodiments of the present disclosure can also have one or more inflection points in an off-axis region thereof.

According to the present disclosure, at least one of the object-side surface and the image-side surface of at least one lens element of the two lens groups can have at least one critical point in an off-axis region thereof. Therefore, it is favorable for enhancing the ability of correcting aberrations at the peripheral image. Please refer to FIG. 20, which shows a schematic view of critical points C of the object-side surface of the second lens element E2, the object-side surface of the third lens element E3, the image-side surface of the fourth lens element E4, the object-side surface of the fifth lens element E5, the image-side surface of the fifth lens element E5, the object-side surface of the sixth lens element E6 and the image-side surface of the sixth lens element E6 of the image capturing unit at the short-focal-end first state according to the 1st embodiment of the present disclosure. The critical points of the object-side surface of the second lens element, the object-side surface of the third lens element, the image-side surface of the fourth lens element, the object-side surface of the fifth lens element, the image-side surface of the fifth lens element, the object-side surface of the sixth lens element and the image-side surface of the sixth lens element in FIG. 20 are only exemplary. Each of the object-side surfaces and the image-side surfaces of the lens elements in the 1st and other embodiments of the present disclosure can also have one or more critical points in an off-axis region thereof.

According to the present disclosure, the imaging optical lens assembly can include at least one reflective element with an optical path folding function located between an imaged object and the image surface, such as a prism, a reflective mirror, etc. Moreover, the at least one reflective element can be located between an imaged object and the first lens group. The reflective element can have at least one reflective surface. The optical path can be deflected at least once through the at least one reflective surface of the at least one reflective element, which is favorable for reducing the overall size, such that the imaging optical lens assembly can have a deflected optical path and can be more flexible in space arrangement, and therefore the dimensions of an electronic device are not restricted by the total track length of the imaging optical lens assembly, thereby reducing mechanical limitation, miniaturizing the imaging optical lens assembly, and thus achieving various specification requirements.

An angle between the optical axis and the normal direction of the at least one reflective surface of the at least one reflective element is not limited to 45 degrees, but can be other angles depending on the space arrangement. The optical path along an optical axis at the object side can be redirected to an optical axis at the image side by the at least one reflective element. An angle between a vector of the optical axis at the object side and that at the image side can be any angle, but not limited to 0, 90 or 180 degrees. In addition, in order to reduce the size of the imaging optical lens assembly, the length and the width of the reflective mirror may be different from each other, and the length, the width and the height of the prism may be different from one another. The surface of the at least one reflective element (e.g., the surface of the prism or the reflective mirror) can be planar, spherical, aspheric or have a freeform shape according to the optical design requirements, but the present disclosure is not limited thereto. The at least one reflective element can consist of more than one prism depending on the design requirements. The prism can be made of glass material or plastic material depending on the design requirements. In addition, the prism with optical path folding function is not one of the lens elements; that is, the prism with the optical path folding function is not included in the six lens elements of the imaging optical lens assembly.

Figure 21:
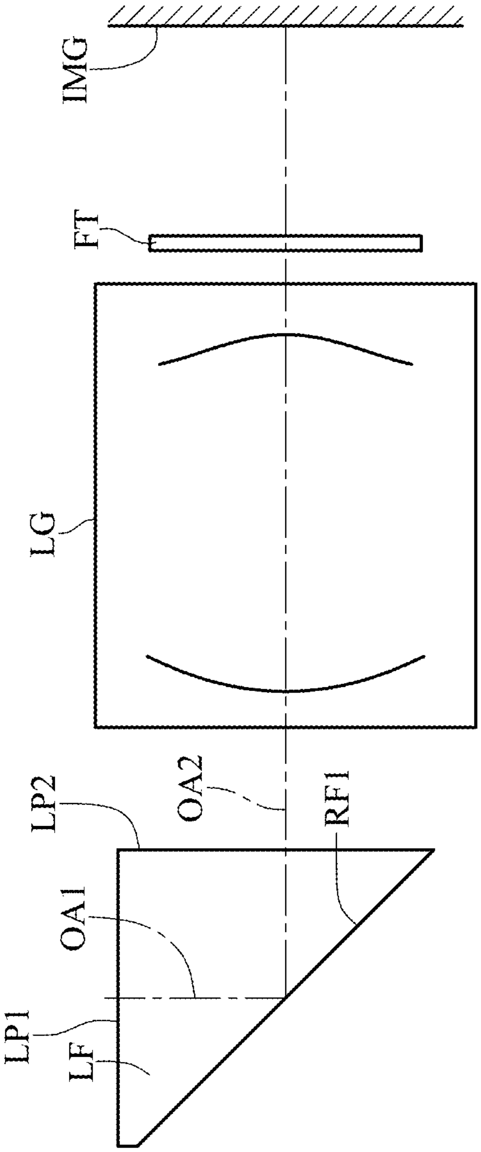
FIG. 21 shows a schematic view of a configuration of a reflective element in an imaging optical lens assembly according to one embodiment of the present disclosure.
Figure 22:
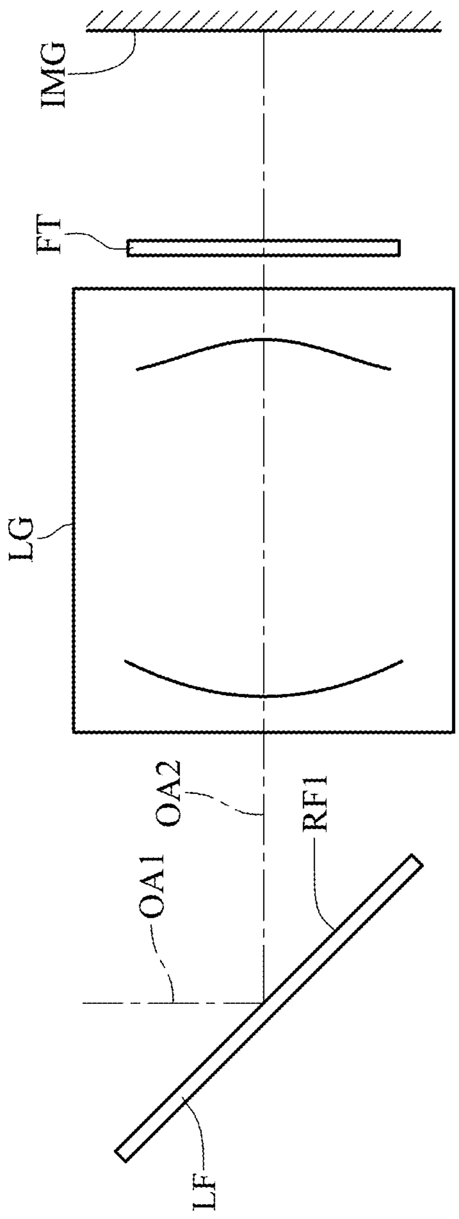
FIG. 22 shows a schematic view of another configuration of a reflective element in an imaging optical lens assembly according to one embodiment of the present disclosure.
Figure 23:
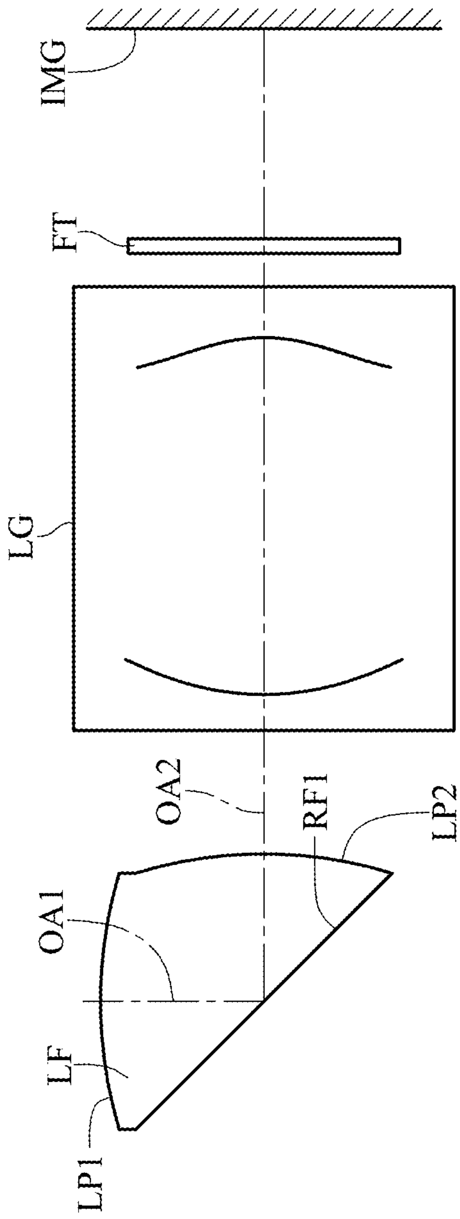
FIG. 23 shows a schematic view of further another configuration of a reflective element in an imaging optical lens assembly according to one embodiment of the present disclosure.

Furthermore, please refer to FIG. 21 to FIG. 23, each of which shows a schematic view of a configuration of one reflective element in an imaging optical lens assembly according to one embodiment of the present disclosure. As shown in FIG. 21 to FIG. 23, the imaging optical lens assembly can include, in order from an imaged object (not shown in the drawings) to an image surface IMG along a travelling direction of an optical path, a reflective element LF, a lens group LG, a filter FT and the image surface IMG. Moreover, the lens group LG can correspond to the two lens groups disclosed in the present disclosure.

In FIG. 21, the reflective element LF is a prism and has, in sequence along a travelling direction of light on the optical path, a first light passable surface LP1, a reflective surface RF1 and a second light passable surface LP2. The optical path enters the reflective element LF through the first light passable surface LP1 and reaches the reflective surface RF1 along a first optical axis OA1. The reflective surface RF1 deflects the optical path from the first optical axis OA1 to a second optical axis OA2, and the optical path then passes through the second light passable surface LP2, travels through the lens group LG and the filter FT, and ultimately arrives at the image surface IMG along the second optical axis OA2. As shown in FIG. 21, both of the first light passable surface LP1 and the second light passable surface LP2 of the reflective element LF can be planar.

In FIG. 22, the reflective element LF is a flat reflective mirror having a reflective surface RF1. The optical path reaches the reflective surface RF1 along a first optical axis OA1. The reflective surface RF1 deflects the optical path from the first optical axis OA1 to a second optical axis OA2. Subsequently, the optical path travels through the lens group LG and the filter FT, and ultimately arrives at the image surface IMG along the second optical axis OA2.

In FIG. 23, the reflective element LF is a prism and has, in sequence along a travelling direction of light on the optical path, a first light passable surface LP1, a reflective surface RF1, and a second light passable surface LP2. The optical path enters the reflective element LF through the first light passable surface LP1 and reaches the reflective surface RF1 along a first optical axis OA1. The reflective surface RF1 deflects the optical path from the first optical axis OA1 to a second optical axis OA2, and the optical path then passes through the second light passable surface LP2, travels through the lens group LG and the filter FT, and ultimately arrives at the image surface IMG along the second optical axis OA2. As shown in FIG. 23, both of the first light passable surface LP1 and the second light passable surface LP2 of the reflective element LF can be curved.

Figure 24:
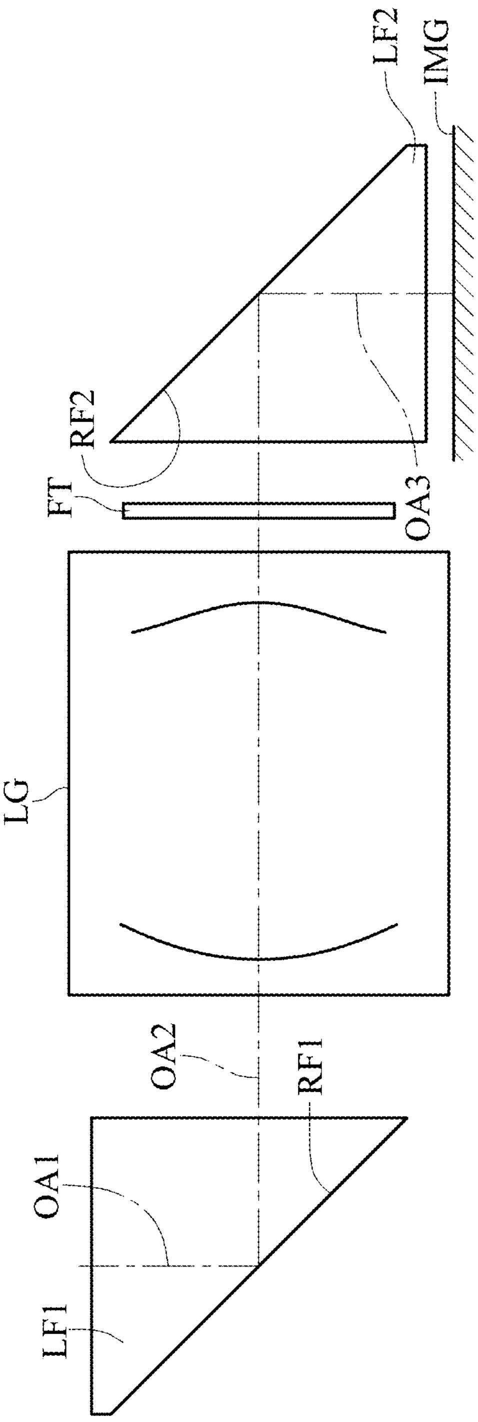
FIG. 24 shows a schematic view of a configuration of two reflective elements in an imaging optical lens assembly according to one embodiment of the present disclosure.
Figure 25:
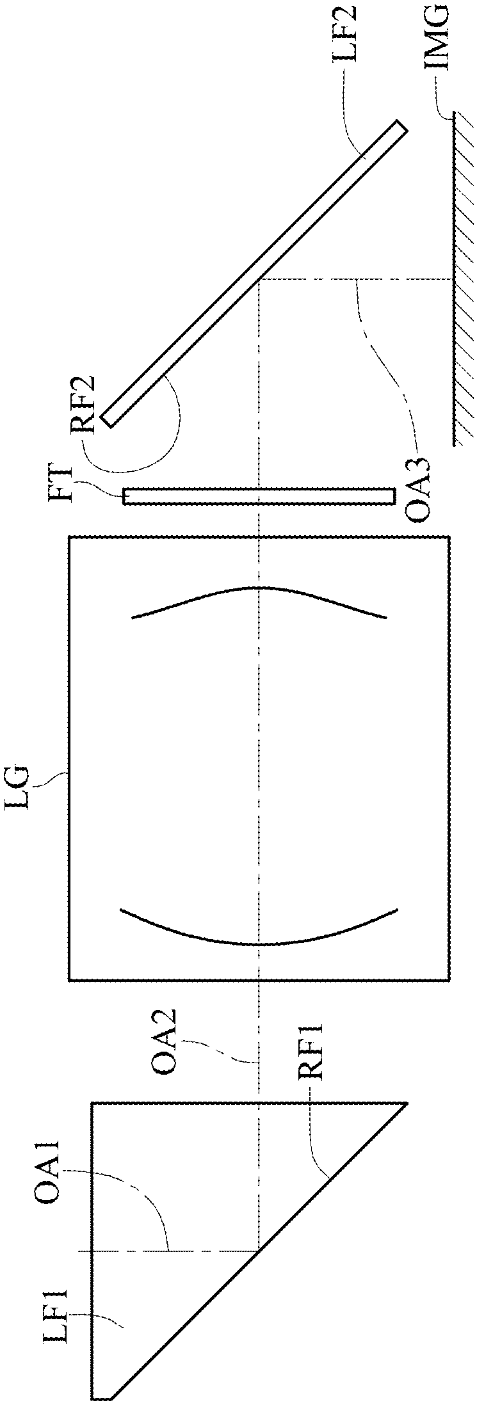
FIG. 25 shows a schematic view of another configuration of two reflective elements in an imaging optical lens assembly according to one embodiment of the present disclosure.

Moreover, please refer to FIG. 24 and FIG. 25, each of which shows a schematic view of a configuration of two reflective elements in an imaging optical lens assembly according to one embodiment of the present disclosure. As shown in FIG. 24 and FIG. 25, the imaging optical lens assembly can include, in order from an imaged object (not shown in the figures) to an image surface IMG along a travelling direction of an optical path, a first reflective element LF1, a lens group LG, a filter FT, a second reflective element LF2 and the image surface IMG. The optical path enters the first reflective element LF1 and reaches the first reflective surface RF1 along a first optical axis OA1, and the first reflective surface RF1 deflects the optical path from the first optical axis OA1 to a second optical axis OA2. The optical path travels through the lens group LG and the filter FT along the second optical axis OA2. Subsequently, the optical path enters the second reflective element LF2 and reaches the second reflective surface RF2 along the second optical axis OA2, and the second reflective surface RF2 deflects the optical path from the second optical axis OA2 to a third optical axis OA3. The optical path ultimately arrives at the image surface IMG along the third optical axis OA3. In FIG. 24, each of the first reflective element LF1 and the second reflective element LF2 can be a prism. In FIG. 25, the first reflective element LF1 and the second reflective element LF2 can be a prism and a flat reflective mirror, respectively.

According to the present disclosure, the first lens group can have no relative movement with respect to the at least one reflective surface during the zoom process or the focus process. Therefore, it is favorable for preventing an extension or a shrinkage of the overall lens structure of the imaging optical lens assembly towards or from the object side due to the zoom or focus process, thereby improving operability and robustness of the lens and simplifying the optical design and the mechanism thereof.

According to the present disclosure, the image surface can move along a direction parallel to the optical axis during the zoom process or the focus process. Therefore, focus adjustment for each of the zooming photography and the close-up focusing can be achieved by movement of the image surface along the optical axis, thereby increasing light convergence quality in various photography scenarios.

When half of a maximum field of view of the imaging optical lens assembly at the short-focal-end first state is HFOVSf, and half of a maximum field of view of the imaging optical lens assembly at the long-focal-end first state is HFOVLf, the following condition can be satisfied: $1.20<HFOVSf/HFOVLf<2.50$. Therefore, it is favorable for increasing the optical zoom ratio, thereby increasing photography quality and photography diversity of mid-to-long-range photographing. Moreover, the following condition can also be satisfied: $1.22<HFOVSf/HFOVLf<2.00$. Moreover, the following condition can also be satisfied: $1.25<HFOVSf/HFOVLf<1.80$. Moreover, the following condition can also be satisfied: $1.28\leq HFOVSf/HFOVLf\leq 1.52$.

When an axial distance between the object-side surface of a lens element closest to the object side and the image surface of the imaging optical lens assembly at the short-focal-end first state is TLSf, and an axial distance between the object-side surface of the lens element closest to the object side and the image surface of the imaging optical lens assembly at the long-focal-end first state is TLLf, the following condition can be satisfied: $0\leq 10\times|TLSf-TLLf|/TLSf<1.00$. Therefore, it is favorable for maintaining a certain optical total track length during the zoom process and the focus process, thereby simplifying mechanism design so as to facilitate the lens assembly and increase the yield rate. Moreover, the following condition can also be satisfied: $0.01<10\times|TLSf-TLLf|/TLSf<0.50$. Moreover, the following condition can also be satisfied: $0.01<10\times|TLSf-TLLf|/TLSf<0.30$. Moreover, the following condition can also be satisfied: $0.01<10\times|TLSf-TLLf|/TLSf<0.20$. Moreover, the following condition can also be satisfied: $0.02\leq 10\times|TLSf-TLLf|/TLSf\leq 0.15$. In one aspect of the present disclosure, the lens element of the imaging optical lens assembly closest to the object side can be the first lens element.

When an f-number of the imaging optical lens assembly at the short-focal-end first state is FnoSf, the following condition can be satisfied: $1.50<FnoSf<4.00$. Therefore, it is favorable for adjusting the f-number of the short focal end so as to obtain a proper balance between the illuminance and the depth of field and increase light incident amount for improving image quality. Moreover, the following condition can also be satisfied: $1.80<FnoSf<3.50$. Moreover, the following condition can also be satisfied: $2.00<FnoSf<3.00$.

When an f-number of the imaging optical lens assembly at the long-focal-end first state is FnoLf, the following condition can be satisfied: $1.80<FnoLf<4.50$. Therefore, it is favorable for adjusting the f-number of the long focal end so as to obtain a proper balance between the illuminance and the depth of field and increase light incident amount for improving image quality. Moreover, the following condition can also be satisfied: $2.00<FnoLf<4.20$. Moreover, the following condition can also be satisfied: $2.50<FnoLf<3.80$.

When half of the maximum field of view of the imaging optical lens assembly at the short-focal-end first state is HFOVSf, the following condition can be satisfied: 8.0 degrees<HFOVSf<25.0 degrees. Therefore, it is favorable for having an appropriate field of view of the imaging optical lens assembly for the collaboration with applications of mid-to-long photographing. Moreover, the following condition can also be satisfied: 12.0 degrees<HFOVSf<22.0 degrees.

When the axial distance between the object-side surface of the lens element closest to the object side and the image surface of the imaging optical lens assembly at the short-focal-end first state is TLSf, and a maximum image height of the imaging optical lens assembly (which can be half of a diagonal length of an effective photosensitive area of an image sensor) is ImgH, the following condition can be satisfied: $3.00<TLSf/ImgH<6.50$. Therefore, it is favorable for balancing the image height and the total track length of the imaging optical lens assembly at the short focal end so as to enhance photography experience of portrait photography, thereby emphasizing the imaged character. Moreover, the following condition can also be satisfied: $3.30<TLSf/ImgH<6.00$.

When the axial distance between the object-side surface of the lens element closest to the object side and the image surface of the imaging optical lens assembly at the long-focal-end first state is TLLf, and the maximum image height of the imaging optical lens assembly is ImgH, the following condition can be satisfied: $3.00<TLLf/ImgH<6.50$. Therefore, it is favorable for balancing the image height and the total track length of the imaging optical lens assembly at the long focal end so as to provide a short depth of field, thereby blurring the distant background and adjusting characteristics such as the distance sense in a scene. Moreover, the following condition can also be satisfied: $3.40<TLLf/ImgH<6.00$.

When an axial distance between the object-side surface of a lens element of the first lens group closest to the object side and the image-side surface of a lens element of the first lens group closest to the image side is TG1, and an axial distance between the object-side surface of a lens element of the second lens group closest to the object side and the image-side surface of a lens element of the second lens group closest to the image side is TG2, the following condition can be satisfied: $0.50<TG1/TG2<1.80$. Therefore, it is favorable for adjusting the length of the first lens group along the optical axis and the length of the second lens group along the optical axis so as to balance the space configuration of lens elements, thereby reducing the sensitivity of the imaging optical lens assembly during the zoom process or the focus process. Moreover, the following condition can also be satisfied: $0.65<TG1/TG2<1.60$. In one aspect of the present disclosure, the lens element of the first lens group closest to the object side can be the first lens element, the lens element of the first lens group closest to the image side can be the third lens element, the lens element of the second lens group closest to the object side can be the fourth lens element, and the lens element of the second lens group closest to the image side can be the sixth lens element.

When an axial distance between the object-side surface of the lens element closest to the object side and the image-side surface of a lens element closest to the image side of the imaging optical lens assembly at the short-focal-end first state is TDSf, an axial distance between the object-side surface of the lens element closest to the object side and the image-side surface of the lens element closest to the image side of the imaging optical lens assembly at the long-focal-end first state is TDLf, and the axial distance between the object-side surface of the lens element closest to the object side and the image surface of the imaging optical lens assembly at the short-focal-end first state is TLSf, the following condition can be satisfied: $0.20<(TDSf-TDLf)/TLSf<0.70$. Therefore, it is favorable for obtaining a proper balance between the movement amount and the optical total track length of the lens group while covering the optical zoom of the imaging optical lens assembly for mid-to-long photographing. Moreover, the following condition can also be satisfied: $0.30<(TDSf-TDLf)/TLSf<0.60$. Moreover, the following condition can also be satisfied: $0.35<(TDSf-TDLf)/TLSf<0.55$. In one aspect of the present disclosure, the lens element of the imaging optical lens assembly closest to the object side can be the first lens element, and the lens element of the imaging optical lens assembly closest to the image side can be the sixth lens element.

When a focal length of the imaging optical lens assembly at the short-focal-end first state is fSf, and a focal length of the first lens group is fG1, the following condition can be satisfied: $0.30<fSf/fG1<2.00$. Therefore, it is favorable for adjusting the refractive power of the first lens element so as to converge light, while controlling the field of view of photography and increasing light incident amount. Moreover, the following condition can also be satisfied: $0.50<fSf/fG1<1.50$. Moreover, the following condition can also be satisfied: $0.70<fSf/fG1<1.20$.

When the f-number of the imaging optical lens assembly at the short-focal-end first state is FnoSf, and an f-number of the imaging optical lens assembly at the short-focal-end second state is FnoSn, the following condition can be satisfied: $0.01<10\times|FnoSn-FnoSf|<1.00$. Therefore, it is favorable for obtaining a proper balance between light incident amounts of a long shot photography and a short shot photography both at the short focal end during the focus process. Moreover, the following condition can also be satisfied: $0.10<10\times|FnoSn-FnoSf|<0.80$. Moreover, the following condition can also be satisfied: $0.30<10\times|FnoSn-FnoSf|<0.60$.

When the f-number of the imaging optical lens assembly at the long-focal-end first state is FnoLf, and an f-number of the imaging optical lens assembly at the long-focal-end second state is FnoLn, the following condition can be satisfied: $0.01<10\times|FnoLn-FnoLf|<1.00$. Therefore, it is favorable for obtaining a proper balance between light incident amounts of a long shot photography and a short shot photography both at the long focal end during the focus process. Moreover, the following condition can also be satisfied: $0.05<10\times|FnoLn-FnoLf|<0.80$. Moreover, the following condition can also be satisfied: $0.08<10\times|FnoLn-FnoLf|<0.60$.

When the axial distance between the object-side surface of the lens element closest to the object side and the image surface of the imaging optical lens assembly at the short-focal-end first state is TLSf, an axial distance between the object-side surface of the lens element closest to the object side and the image surface of the imaging optical lens assembly at the short-focal-end second state is TLSn, the focal length of the imaging optical lens assembly at the short-focal-end first state is fSf, and a focal length of the imaging optical lens assembly at the short-focal-end second state is fSn, the following condition can be satisfied: $0.10<10\times(TLSn/fSn-TLSf/fSf)<0.80$. Therefore, it is favorable for obtaining a proper balance between ratios of the size to the field of view of a long shot photography and a short shot photography both at the short focal end during the focus process. Moreover, the following condition can also be satisfied: $0.15<10\times(TLSn/fSn-TLSf/fSf)<0.50$. Moreover, the following condition can also be satisfied: $0.18<10\times(TLSn/fSn-TLSf/fSf)<0.30$.

When the axial distance between the object-side surface of the lens element closest to the object side and the image surface of the imaging optical lens assembly at the long-focal-end first state is TLLf, an axial distance between the object-side surface of the lens element closest to the object side and the image surface of the imaging optical lens assembly at the long-focal-end second state is TLLn, a focal length of the imaging optical lens assembly at the long-focal-end first state is fLf, and a focal length of the imaging optical lens assembly at the long-focal-end second state is fLn, the following condition can be satisfied: $0.10<10\times(TLLn/fLn-TLLf/fLf)<0.80$. Therefore, it is favorable for obtaining a proper balance between ratios of the size to the field of view of a long shot photography and a short shot photography both at the long focal end during the focus process. Moreover, the following condition can also be satisfied: $0.15<10\times(TLLn/fLn-TLLf/fLf)<0.60$. Moreover, the following condition can also be satisfied: $0.18<10\times(TLLn/fLn-TLLf/fLf)<0.45$.

When a central thickness of the first lens element is CT1, a central thickness of the second lens element is CT2, a central thickness of the third lens element is CT3, an axial distance between the first lens element and the second lens element is T12, and an axial distance between the second lens element and the third lens element is T23, the following condition can be satisfied: $1.00<(CT1+CT2+CT3)/(T12+T23)<4.50$. Therefore, it is favorable for adjusting the ratio of the central thickness sum to the lens interval sum of lens elements of the first lens group, thereby balancing the space configuration of the first lens group and increasing the space utilization efficiency. Moreover, the following condition can also be satisfied: $1.50<(CT1+CT2+CT3)/(T12+T23)<4.00$.

When the central thickness of the first lens element is CT1, and a central thickness of the sixth lens element is CT6, the following condition can be satisfied: $2.50<CT1/CT6<8.00$. Therefore, it is favorable for controlling the ratio of the central thickness of the first lens element to the central thickness of the sixth lens element, thereby taking the manufacturing restriction of the first lens element into account while reducing the size of the imaging optical lens assembly by adjusting the central thickness of the sixth lens element. Moreover, the following condition can also be satisfied: $3.50<CT1/CT6<6.50$.

When the focal length of the imaging optical lens assembly at the short-focal-end first state is fSf, a focal length of the second lens element is f2, a focal length of the fourth lens element is f4, and a focal length of the fifth lens element is f5, the following condition can be satisfied: $0.01<(|fSf/f4|+|fSf/f5|)/|fSf/f2|<1.50$. Therefore, it is favorable for adjusting the refractive power ratio of the second, fourth and fifth lens elements to have a relatively strong light deflection ability of the second lens element balanced by the fourth and fifth lens elements, thereby balancing light convergence or light divergence between the two lens groups so as to improve convergence quality of full fields of view. Moreover, the following condition can also be satisfied: $0.05<(|fSf/f4|+|fSf/f5|)/|fSf/f2|<1.00$.

When a displacement of the image surface during changing of the imaging optical lens assembly from the short-focal-end first state to the short-focal-end second state is DImgS, the following condition can be satisfied: 0.050 mm (millimeters)<DImgS<0.800 mm. Therefore, focus adjustment for each of the zooming photography and the close-up focusing can be achieved by movement of the image surface along the optical axis, thereby increasing light convergence quality in various photography scenarios. Moreover, the following condition can also be satisfied: 0.100 mm<DImgS<0.600 mm. Moreover, the following condition can also be satisfied: 0.150 mm<DImgS<0.500 mm. Moreover, the following condition can also be satisfied: 0.200 mm<DImgS<0.400 mm.

When the displacement of the image surface during changing of the imaging optical lens assembly from the short-focal-end first state to the short-focal-end second state is DImgS, and a minimum value among central thicknesses of all lens elements of the imaging optical lens assembly is CTmin, the following condition can be satisfied: $0.20<DImgS/CTmin<1.50$. Therefore, it is favorable for maintaining the ratio of movement amount of the image surface to the central thickness of the thinnest lens element, displacing the image sensor while satisfying the manufacturing restriction of the lens thickness, and increasing the contrast and the clarity of images during the zooming photography or the close-up focusing. Moreover, the following condition can also be satisfied: $0.30<DImgS/CTmin<1.00$. Moreover, the following condition can also be satisfied: $0.45<DImgS/CTmin<0.80$.

According to the present disclosure, the aforementioned features and conditions can be utilized in numerous combinations so as to achieve corresponding effects.

According to the present disclosure, the lens elements of the imaging optical lens assembly can be made of either glass or plastic material. When the lens elements are made of glass material, the refractive power distribution of the imaging optical lens assembly may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the imaging optical lens assembly can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the imaging optical lens assembly, based on the corresponding image sensor, can be flat or curved, especially a curved surface being concave facing towards the object side of the imaging optical lens assembly.

According to the present disclosure, an image correction unit, such as a field flattener, can be optionally disposed between the lens element closest to the image side of the imaging optical lens assembly along the optical path and the image surface for correction of aberrations such as field curvature. The optical characteristics of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

According to the present disclosure, the imaging optical lens assembly can include at least one stop, such as an aperture stop, a glare stop or a field stop. Said glare stop or said field stop can be disposed between an imaged object and the first lens element, between adjacent lens elements, or between the last lens element and the image surface, and is set for eliminating the stray light and thereby improving image quality thereof.

According to the present disclosure, an aperture stop can be configured as a front stop or a middle stop. Afront stop disposed between an imaged object and the first lens element can provide a longer distance between an exit pupil of the imaging optical lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the imaging optical lens assembly and thereby provides a wider field of view for the same.

According to the present disclosure, the imaging optical lens assembly can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the present disclosure, the imaging optical lens assembly can include one or more optical elements for limiting the form of light passing through the imaging optical lens assembly. Each optical element can be, but not limited to, a filter, a polarizer, etc., and each optical element can be, but not limited to, a single-piece element, a composite component, a thin film, etc. The optical element can be located at the object side or the image side of the imaging optical lens assembly or between any two adjacent lens elements so as to allow light in a specific form to pass through, thereby meeting application requirements.

According to the present disclosure, the imaging optical lens assembly can include at least one optical lens element, an optical element, or a carrier, which has at least one surface with a low reflection layer. The low reflection layer can effectively reduce stray light generated due to light reflection at the interface. The low reflection layer can be disposed in an optical non-effective area of an object-side surface or an image-side surface of the said optical lens element, or a connection surface between the object-side surface and the image-side surface. The said optical element can be a light-blocking element, an annular spacer, a barrel element, a cover glass, a blue glass, a filter, a color filter, an optical path folding element, a prism, a mirror, etc. The said carrier can be a base for supporting a lens assembly, a micro lens disposed on an image sensor, a substrate surrounding the image sensor, a glass plate for protecting the image sensor, etc.

According to the present disclosure, the imaging optical lens assembly can further include a light-blocking element. The light-blocking element can have a non-circular opening, and the non-circular opening can have different effective radii in different directions which are perpendicular to the optical axis. Therefore, it is favorable for coordinating with the shape of non-circular lens elements or aperture stop so as to effectively save the space and make full use of the light passing through said non-circular lens elements or aperture stop, thereby reducing stray light. Moreover, the light-blocking element can be provided with a wavy structure or a jagged structure at a periphery of an inner hole portion thereof.

According to the present disclosure, the object side and image side are defined in accordance with the direction of the optical axis, and the axial optical data are calculated along the optical axis. Furthermore, if the optical axis is folded by a light-folding element, the axial optical data are also calculated along the folded optical axis.

According to the above description of the present disclosure, the following specific embodiments are provided for further explanation.

1st Embodiment

Figure 2:
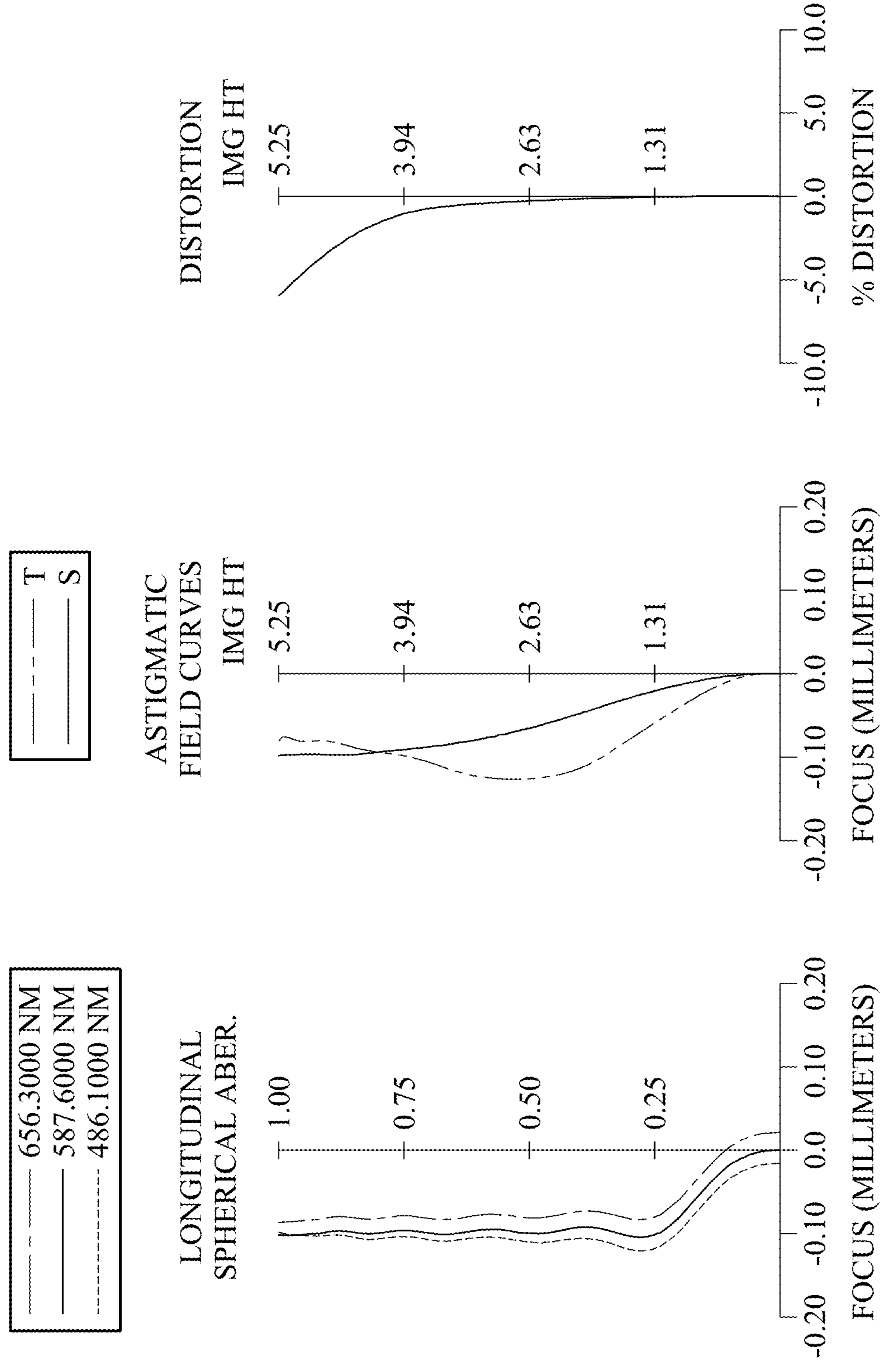
FIG. 2 shows spherical aberration curves, astigmatic field curves and a distortion curve of the image capturing unit at the short-focal-end first state according to the 1st embodiment.
Figure 3:
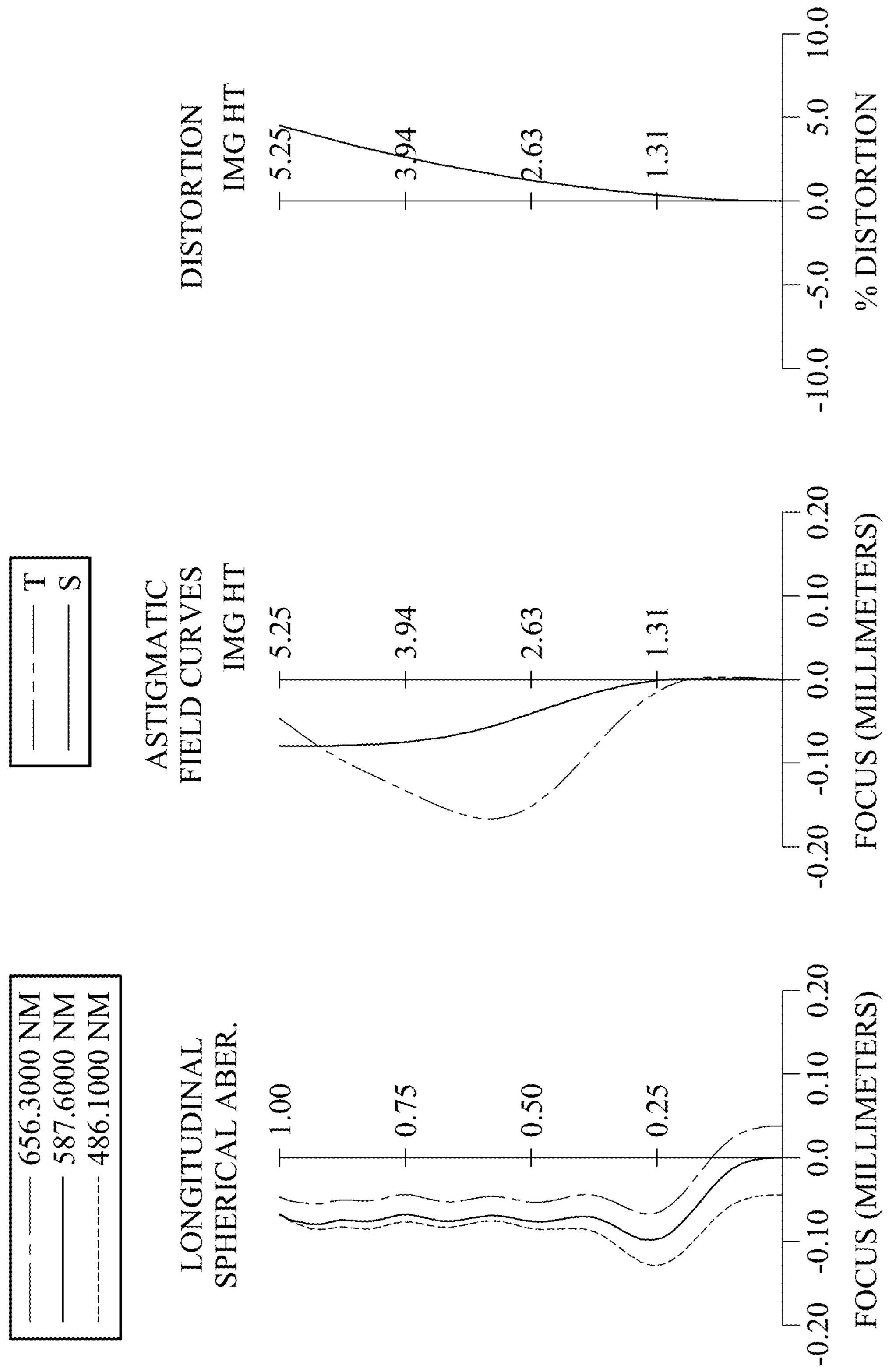
FIG. 3 shows spherical aberration curves, astigmatic field curves and a distortion curve of the image capturing unit at the long-focal-end first state according to the 1st embodiment.

FIG. 1 is a schematic view of an image capturing unit respectively at a short-focal-end first state and at a long-focal-end first state according to the 1st embodiment of the present disclosure. FIG. 2 shows, in order from left to right, spherical aberration curves, astigmatic field curves and a distortion curve of the image capturing unit at the short-focal-end first state according to the 1st embodiment. FIG. 3 shows, in order from left to right, spherical aberration curves, astigmatic field curves and a distortion curve of the image capturing unit at the long-focal-end first state according to the 1st embodiment. The upper part of FIG. 1 shows the imaging optical lens assembly at the short-focal-end first state, and the lower part of FIG. 1 shows the imaging optical lens assembly at the long-focal-end first state. In FIG. 1, the image capturing unit 1 includes the imaging optical lens assembly (its reference numeral is omitted) of the present disclosure and an image sensor IS. The imaging optical lens assembly includes, in order from an object side to an image side along an optical path, a reflective element LF, a stop S1, a first lens element E1, a second lens element E2, an aperture stop ST, a third lens element E3, a stop S2, a stop S3, a fourth lens element E4, a fifth lens element E5, a sixth lens element E6, a filter E7 and an image surface IMG. Further, the imaging optical lens assembly includes, in order from the object side to the image side along the optical path, a first lens group G1 and a second lens group G2. The first lens group G1 includes the first lens element E1, the second lens element E2 and the third lens element E3, and the second lens group G2 includes the fourth lens element E4, the fifth lens element E5 and the sixth lens element E6. Moreover, the first lens group G1 has positive refractive power. The imaging optical lens assembly includes six lens elements (E1, E2, E3, E4, E5 and E6) with no additional lens element disposed between each of the adjacent six lens elements.

The imaging optical lens assembly has a first state corresponding to an infinite object distance and a second state corresponding to a finite object distance. The first state refers to a state of the imaging optical lens assembly with an imaged object at an infinite distance (the infinite object distance), and the second state refers to a state of the imaging optical lens assembly with an imaged object at a finite distance (the finite object distance). When an imaged object at the infinite object distance moves to the finite object distance, the imaging optical lens assembly performs a focus process to change the first state to the second state thereof.

Conversely, when an imaged object at the finite object distance moves to the infinite object distance, the imaging optical lens assembly also performs the focus process to change the second state to the first state thereof. Moreover, during the focus process of the imaging optical lens assembly, the first lens group G1 has no relative movement with respect to a reflective surface of the reflective element LF, the second lens group G2 moves along a direction parallel to an optical axis with respect to the first lens group G1, and the image surface IMG moves along a direction parallel to the optical axis. Please be noted that there is no relative movement between any two lens elements of each of the first lens group and the second lens group of the two lens groups during the focus process.

The imaging optical lens assembly at the first state has a long-focal-end first state corresponding to a long focal end and a short-focal-end first state corresponding to a short focal end during a zoom process. Moreover, when the imaging optical lens assembly changes its long-focal-end first state to the short-focal-end first state during the zoom process, the second lens group G2 moves along a direction parallel to the optical axis toward the image side with respect to the first lens group G1. Conversely, when the imaging optical lens assembly changes its short-focal-end first state to the long-focal-end first state during the zoom process, the second lens group G2 moves along a direction parallel to the optical axis towards the object side with respect to the first lens group G1. As shown in FIG. 1, the upper part of FIG. 1 shows the imaging optical lens assembly at the short-focal-end first state, and the lower part of FIG. 1 shows the imaging optical lens assembly at the long-focal-end first state. Similarly, the imaging optical lens assembly at the second state has a long-focal-end second state corresponding to the long focal end and a short-focal-end second state corresponding to the short focal end during the zoom process. Moreover, during the zoom process of the imaging optical lens assembly, the first lens group G1 has no relative movement with respect to the reflective surface of the reflective element LF, the second lens group G2 moves along a direction parallel to the optical axis with respect to the first lens group G1, and the image surface IMG moves along a direction parallel to the optical axis. Please be noted that there is no relative movement between any two lens elements of each of the first lens group and the second lens group of the two lens groups during the zoom process. Please be noted that only optical effective areas of lens elements of the imaging optical lens assembly at the long-focal-end first state in the lower part of FIG. 1 are illustrated, and the non-optical effective areas, such as peripheral areas of the stop S3 and the fourth lens element E4 through the sixth lens element E6, are omitted.

The first lens element E1 with positive refractive power has an object-side surface being convex in a paraxial region thereof and an image-side surface being convex in a paraxial region thereof. The first lens element E1 is made of glass material and has the object-side surface and the image-side surface being both aspheric. The object-side surface of the first lens element E1 has one inflection point in an off-axis region thereof.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has two inflection points in an off-axis region thereof. The image-side surface of the second lens element E2 has one inflection point in an off-axis region thereof. The object-side surface of the second lens element E2 has one concave critical point in the off-axis region thereof.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric. The object-side surface of the third lens element E3 has two inflection points in an off-axis region thereof. The image-side surface of the third lens element E3 has one inflection point in an off-axis region thereof. The object-side surface of the third lens element E3 has one concave critical point in the off-axis region thereof.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has one inflection point in an off-axis region thereof. The image-side surface of the fourth lens element E4 has one inflection point in an off-axis region thereof. The image-side surface of the fourth lens element E4 has one convex critical point in the off-axis region thereof.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric. The object-side surface of the fifth lens element E5 has two inflection points in an off-axis region thereof. The image-side surface of the fifth lens element E5 has two inflection points in an off-axis region thereof. The object-side surface of the fifth lens element E5 has one convex critical point and one concave critical point in the off-axis region thereof. The image-side surface of the fifth lens element E5 has one concave critical point in the off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has four inflection points in an off-axis region thereof. The image-side surface of the sixth lens element E6 has four inflection points in an off-axis region thereof. The object-side surface of the sixth lens element E6 has one concave critical point in the off-axis region thereof. The image-side surface of the sixth lens element E6 has one convex critical point in the off-axis region thereof.

The reflective element LF is made of glass material. The reflective element LF is disposed between an imaged object and the first lens group G1 (it can be also considered that the reflective element LF is disposed at an object side of the first lens element E1). The reflective element LF will not affect the focal length of the imaging optical lens assembly. The reflective element LF is a prism which provides an optical path folding function. For simplicity, the optical path folding effect generated by the reflective element LF in FIG. 1 is omitted. The reflective element LF has an object-side surface and an image-side surface both being planar, but the present disclosure is not limited thereto. The reflective element LF can have various forms for providing different deflecting effect to the optical path. For example, the reflective element LF of the 1st embodiment can be the reflective element LF as shown in FIG. 21 to FIG. 23, which deflects the optical path once, wherein the reflective surface RF1 of the reflective element LF deflects the first axis OA1 into the second optical axis OA2. The detail can be referred to the description related to FIG. 21 to FIG. 23, which will not be repeated again.

The filter E7 is made of glass material and located between the sixth lens element E6 and the image surface IMG, and will not affect the focal length of the imaging optical lens assembly. The image sensor IS is disposed on or near the image surface IMG.

The equation of the aspheric surface profiles of the aforementioned lens elements of the 1st embodiment is expressed as follows:

$$X(Y)=(Y^2/R)/(1+sqrt(1-(1+k)\times(Y/R)^2))+\sum_i (Ai)\times(Y^i),$$

where,

X is the displacement in parallel with the optical axis from an axial vertex on the aspheric surface to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18, 20, 22, 24, 26, 28 and 30.

In the imaging optical lens assembly of the image capturing unit 1 according to the 1st embodiment, the first lens element E1 is one lens element of the imaging optical lens assembly closest to the object side surface and one lens element of the first lens group G1 closest to the object side, the third lens element E3 is one lens element of the first lens group G1 closest to the image side, the fourth lens element E4 is one lens element of the second lens group G2 closest to the object side, and the sixth lens element E6 is one lens element of the imaging optical lens assembly closest to the image side and one lens element of the second lens group G2 closest to the image side.

When a focal length of the imaging optical lens assembly at the short-focal-end first state is fSf, an f-number of the imaging optical lens assembly at the short-focal-end first state is FnoSf, half of a maximum field of view of the imaging optical lens assembly at the short-focal-end first state is HFOVSf, an axial distance between the object-side surface of the lens element closest to the object side and the image surface of the imaging optical lens assembly at the short-focal-end first state is TLSf, and an axial distance between the object-side surface of the lens element closest to the object side and the image-side surface of the lens element closest to the image side of the imaging optical lens assembly at the short-focal-end first state is TDSf, the following conditions are satisfied: fSf=19.61 mm (millimeters); FnoSf=2.38; HFOVSf=16.0 degrees; TLSf=23.187 mm; and TDSf=21.389 mm. In this embodiment, TLSf is an axial distance between the object-side surface of the first lens element E1 and the image surface IMG in the imaging optical lens assembly at the short-focal-end first state, and TDSf is an axial distance between the object-side surface of the first lens element E1 and the image-side surface of the sixth lens element E6 in the imaging optical lens assembly at the short-focal-end first state.

When a focal length of the imaging optical lens assembly at the long-focal-end first state is fLf, an f-number of the imaging optical lens assembly at the long-focal-end first state is FnoLf, half of a maximum field of view of the imaging optical lens assembly at the long-focal-end first state is HFOVLf, an axial distance between the object-side surface of the lens element closest to the object side and the image surface of the imaging optical lens assembly at the long-focal-end first state is TLLf, and an axial distance between the object-side surface of the lens element closest to the object side and the image-side surface of the lens element closest to the image side of the imaging optical lens assembly at the long-focal-end first state is TDLf, the following conditions are satisfied: fLf=22.77 mm; FnoLf=2.76; HFOVLf=12.5 degrees; TLLf=23.228 mm; and TDLf=12.985 mm. In this embodiment, TLLf is an axial distance between the object-side surface of the first lens element E1 and the image surface IMG in the imaging optical lens assembly at the long-focal-end first state, and TDLf is an axial distance between the object-side surface of the first lens element E1 and the image-side surface of the sixth lens element E6 in the imaging optical lens assembly at the long-focal-end first state.

When a focal length of the imaging optical lens assembly at the short-focal-end second state is fSn, an f-number of the imaging optical lens assembly at the short-focal-end second state is FnoSn, half of a maximum field of view of the imaging optical lens assembly at the short-focal-end second state is HFOVSn, an axial distance between the object-side surface of the lens element closest to the object side and the image surface of the imaging optical lens assembly at the short-focal-end second state is TLSn, and an axial distance between the object-side surface of the lens element closest to the object side and the image-side surface of the lens element closest to the image side of the imaging optical lens assembly at the short-focal-end second state is TDSn, the following conditions are satisfied: fSn=19.51 mm; FnoSn=2.42; HFOVSn=15.8 degrees; TLSn=23.482 mm; and TDSn=21.687 mm. In this embodiment, TLSn is an axial distance between the object-side surface of the first lens element E1 and the image surface IMG in the imaging optical lens assembly at the short-focal-end second state, and TDSn is an axial distance between the object-side surface of the first lens element E1 and the image-side surface of the sixth lens element E6 in the imaging optical lens assembly at the short-focal-end second state.

When a focal length of the imaging optical lens assembly at the long-focal-end second state is fLn, an f-number of the imaging optical lens assembly at the long-focal-end second state is FnoLn, half of a maximum field of view of the imaging optical lens assembly at the long-focal-end second state is HFOVLn, an axial distance between the object-side surface of the lens element closest to the object side and the image surface of the imaging optical lens assembly at the long-focal-end second state is TLLn, and an axial distance between the object-side surface of the lens element closest to the object side and the image-side surface of the lens element closest to the image side of the imaging optical lens assembly at the long-focal-end second state is TDLn, the following conditions are satisfied: fLn=22.57 mm; FnoLn=2.80; HFOVLn=12.3 degrees; TLLn=23.232 mm; and TDLn=13.455 mm. In this embodiment, TLLn is an axial distance between the object-side surface of the first lens element E1 and the image surface IMG in the imaging optical lens assembly at the long-focal-end second state, and TDLn is an axial distance between the object-side surface of the first lens element E1 and the image-side surface of the sixth lens element E6 in the imaging optical lens assembly at the long-focal-end second state.

In this embodiment, DO is an axial distance between an imaged object and the object-side surface of the reflective element LF (which approximates an object distance of the imaging optical lens assembly), D1 is an axial distance between the stop S2 and the stop S3, D2 is an axial distance between the image-side surface of the sixth lens element E6 and the filter E7, and D3 is a movement distance of the image surface IMG along the optical axis (whose comparison origin is based on the imaging optical lens assembly at the short-focal-end first state). The imaging optical lens assembly is changeable between the short-focal-end first state, the long-focal-end first state, the short-focal-end second state and the long-focal-end second state through the zoom process or the focus process, and the values of D0 to D3 vary accordingly. When the imaging optical lens assembly is at the short-focal-end first state, the aforementioned parameters have the following values: the object distance=∞ (infinity); D0=∞; D1=9.921 mm; D2=1.433 mm; and D3=0.000 mm. When the imaging optical lens assembly is at the long-focal-end first state, the aforementioned parameters have the following values: the object distance=∞; D0=∞; D1=1.517 mm; D2=9.837 mm; and D3=0.041 mm. When the imaging optical lens assembly is at the short-focal-end second state, the aforementioned parameters have the following values: the object distance=1510.278 mm; D0=1500.050 mm; D1=10.219 mm; D2=1.135 mm; and D3=0.295 mm. When the imaging optical lens assembly is at the long-focal-end second state, the aforementioned parameters have the following values: the object distance=1510.278 mm; D0=1500.050 mm; D1=1.987 mm; D2=9.367 mm; and D3=0.295 mm.

When half of the maximum field of view of the imaging optical lens assembly at the short-focal-end first state is HFOVSf, and half of the maximum field of view of the imaging optical lens assembly at the long-focal-end first state is HFOVLf, the following condition is satisfied: HFOVSf/HFOVLf=1.28.

When the axial distance between the object-side surface of the lens element closest to the object side (the first lens element E1) and the image surface IMG of the imaging optical lens assembly at the short-focal-end first state is TLSf, and the axial distance between the object-side surface of the lens element closest to the object side (the first lens element E1) and the image surface IMG of the imaging optical lens assembly at the long-focal-end first state is TLLf, the following condition is satisfied: 10×|TLSf−TLLf|/TLSf=0.02.

When the axial distance between the object-side surface of the lens element closest to the object side (the first lens element E1) and the image-side surface of the lens element closest to the image side (the sixth lens element E6) of the imaging optical lens assembly at the short-focal-end first state is TDSf, the axial distance between the object-side surface of the lens element closest to the object side (the first lens element E1) and the image-side surface of the lens element closest to the image side (the sixth lens element E6) of the imaging optical lens assembly at the long-focal-end first state is TDLf, and the axial distance between the object-side surface of the lens element closest to the object side (the first lens element E1) and the image surface IMG of the imaging optical lens assembly at the short-focal-end first state is TLSf, the following condition is satisfied: (TDSf-TDLf)/TLSf=0.36.

When the axial distance between the object-side surface of the lens element closest to the object side (the first lens element E1) and the image surface IMG of the imaging optical lens assembly at the short-focal-end first state is TLSf, and a maximum image height of the imaging optical lens assembly is ImgH, the following condition is satisfied: TLSf/ImgH=4.42.

When the axial distance between the object-side surface of the lens element closest to the object side (the first lens element E1) and the image surface IMG of the imaging optical lens assembly at the long-focal-end first state is TLLf, and the maximum image height of the imaging optical lens assembly is ImgH, the following condition is satisfied: TLLf/ImgH=4.42.

When the focal length of the imaging optical lens assembly at the short-focal-end first state is fSf, and a focal length of the first lens group G1 is fG1, the following condition is satisfied: fSf/fG1=0.93.

When an axial distance between the object-side surface of the lens element of the first lens group G1 closest to the object side (the first lens element E1) and the image-side surface of the lens element of the first lens group G1 closest to the image side (the third lens element E3) is TG1, and an axial distance between the object-side surface of the lens element of the second lens group G2 closest to the object side (the fourth lens element E4) and the image-side surface of the lens element of the second lens group G2 closest to the image side (the sixth lens element E6) is TG2, the following condition is satisfied: TG1/TG2=1.45.

When the f-number of the imaging optical lens assembly at the short-focal-end first state is FnoSf, and the f-number of the imaging optical lens assembly at the short-focal-end second state is FnoSn, the following condition is satisfied:

$$10 \times |FnoSn - FnoSf| = 0.40.$$

When the f-number of the imaging optical lens assembly at the long-focal-end first state is FnoLf, and the f-number of the imaging optical lens assembly at the long-focal-end second state is FnoLn, the following condition is satisfied: 10×|FnoLn−FnoLf|=0.40.

When the axial distance between the object-side surface of the lens element closest to the object side (the first lens element E1) and the image surface IMG of the imaging optical lens assembly at the short-focal-end first state is TLSf, the axial distance between the object-side surface of the lens element closest to the object side (the first lens element E1) and the image surface IMG of the imaging optical lens assembly at the short-focal-end second state is TLSn, the focal length of the imaging optical lens assembly at the short-focal-end first state is fSf, and the focal length of the imaging optical lens assembly at the short-focal-end second state is fSn, the following condition is satisfied: 10×(TLSn/fSn−TLSf/fSf)=0.21.

When the axial distance between the object-side surface of the lens element closest to the object side (the first lens element E1) and the image surface IMG of the imaging optical lens assembly at the long-focal-end first state is TLLf, the axial distance between the object-side surface of the lens element closest to the object side (the first lens element E1) and the image surface IMG of the imaging optical lens assembly at the long-focal-end second state is TLLn, the focal length of the imaging optical lens assembly at the long-focal-end first state is fLf, and the focal length of the imaging optical lens assembly at the long-focal-end second state is fLn, the following condition is satisfied: 10×(TLLn/fLn−TLLf/fLf)=0.20.

When the focal length of the imaging optical lens assembly at the short-focal-end first state is fSf, a focal length of the second lens element E2 is f2, a focal length of the fourth lens element E4 is f4, and a focal length of the fifth lens element E5 is f5, the following condition is satisfied: (|fSf/f4|+|fSf/f5|)/|fSf/f2|=0.59.

When a central thickness of the first lens element E1 is CT1, and a central thickness of the sixth lens element E6 is CT6, the following condition is satisfied:

$$CT1/CT6=5.79.$$

When the central thickness of the first lens element E1 is CT1, a central thickness of the second lens element E2 is CT2, a central thickness of the third lens element E3 is CT3, an axial distance between the first lens element E1 and the second lens element E2 is T12, and an axial distance between the second lens element E2 and the third lens element E3 is T23, the following condition is satisfied: (CT1+CT2+CT3)/(T12+T23)=2.46. In this embodiment, an axial distance between two adjacent lens elements is a distance in a paraxial region between two adjacent lens surfaces of the two adjacent lens elements.

When a displacement of the image surface IMG during changing of the imaging optical lens assembly from the short-focal-end first state to the short-focal-end second state is DImgS, the following condition is satisfied: DImgS=0.295 mm.

When the displacement of the image surface IMG during changing of the imaging optical lens assembly from the short-focal-end first state to the short-focal-end second state is DImgS, and a minimum value among central thicknesses of all lens elements of the imaging optical lens assembly is CTmin, the following condition is satisfied: DImgS/CTmin=0.59. In this embodiment, among the first lens element Eu through the sixth lens element E6, a central thickness of the sixth lens element E6 is smaller than that of each of the other lens elements, so CTmin is the central thickness of the sixth lens element E6.

The detailed optical data of the 1 st embodiment are shown in Table 1A and Table 1B, and the aspheric surface data are shown in Table 1C below.

TABLE 1A

| 1st Embodiment | | | | | | | |
|---|---|---|---|---|---|---|---|
| Surface # | | Curvature Radius | Thickness | Material | Index | Abbe # | Focal Length |
| 0 | Object | Plano | D0 | | | | |
| 1 | Reflective element | Plano | 9.300 | Glass | 1.785 | 25.7 | — |
| 2 | | Plano | 2.033 | | | | |
| 3 | Stop | Plano | −1.105 | | | | |
| 4 | Lens 1 | 8.4271 (ASP) | 2.896 | Glass | 1.497 | 81.6 | 14.72 |
| 5 | | −49.2226 (ASP) | 0.295 | | | | |
| 6 | Lens 2 | 9.0266 (ASP) | 0.992 | Plastic | 1.566 | 37.4 | −15.40 |
| 7 | | 4.2587 (ASP) | 0.721 | | | | |
| 8 | Ape. Stop | Plano | 1.158 | | | | |
| 9 | Lens 3 | 36.3351 (ASP) | 1.452 | Plastic | 1.544 | 56.0 | 24.90 |
| 10 | | −21.2971 (ASP) | −0.148 | | | | |
| 11 | Stop | Plano | D1 | | | | |
| 12 | Stop | Plano | −1.070 | | | | |
| 13 | Lens 4 | 11.1908 (ASP) | 1.500 | Plastic | 1.544 | 56.0 | 34.44 |
| 14 | | 26.4725 (ASP) | 1.832 | | | | |
| 15 | Lens 5 | −6.2845 (ASP) | 1.300 | Plastic | 1.669 | 19.5 | 104.19 |
| 16 | | −6.2428 (ASP) | 0.040 | | | | |
| 17 | Lens 6 | 3.9372 (ASP) | 0.500 | Plastic | 1.544 | 56.0 | −17.15 |
| 18 | | 2.6449 (ASP) | D2 | | | | |
| 19 | Filter | Plano | 0.210 | Glass | 1.517 | 64.2 | — |
| 20 | | Plano | 0.155 | | | | |
| 21 | Image | Plano | D3 | | | | |

Note:
Reference wavelength is 587.6 nm (d-line).
An effective radius of the stop S1 (Surface 3) is 4.750 mm.
An effective radius of the stop S2 (Surface 11) is 3.174 mm.
An effective radius of the stop S3 (Surface 12) is 4.760 mm.

In Table 1A, the curvature radius, the thickness and the focal length are shown in millimeters (mm). Surface numbers 0-21 represent the surfaces sequentially arranged from the object side to the image side along the optical axis.

TABLE 1B

Optical data for imaging optical lens assembly at the short-focal-end first state, the long-focal-end first state, the short-focal-end second state and the long-focal-end second state

| | short-focal-end first state | | long-focal-end first state |
|---|---|---|---|
| fSf [mm] | 19.61 | fLf [mm] | 22.77 |
| FnoSf | 2.38 | FnoLf | 2.76 |
| HFOVSf [deg.] | 16.0 | HFOVLf [deg.] | 12.5 |
| Object distance [mm] | infinity | Object distance [mm] | infinity |
| D0 [mm] | infinity | D0 [mm] | infinity |
| D1 [mm] | 9.921 | D1 [mm] | 1.517 |
| D2 [mm] | 1.433 | D2 [mm] | 9.837 |
| D3 [mm] | 0.000 | D3 [mm] | 0.041 |
| | **short-focal-end second state** | | **long-focal-end second state** |
| fSn [mm] | 19.51 | fLn [mm] | 22.57 |
| FnoSn | 2.42 | FnoLn | 2.80 |
| HFOVSn [deg.] | 15.8 | HFOVLn [deg.] | 12.3 |
| Object distance [mm] | 1510.278 | Object distance [mm] | 1510.278 |
| D0 [mm] | 1500.050 | D0 [mm] | 1500.050 |
| D1 [mm] | 10.219 | D1 [mm] | 1.987 |
| D2 [mm] | 1.135 | D2 [mm] | 9.367 |
| D3 [mm] | 0.295 | D3 [mm] | 0.295 |

Table 1B shows optical data of the imaging optical lens assembly at the short-focal-end first state, the long-focal-end first state, the short-focal-end second state and the long-focal-end second state in different focus conditions and different zoom conditions. It should be understood that only two focus conditions (i.e., the first state and the second state) are disclosed in this embodiment, but the present disclosure is not limited thereto. The imaging optical lens assembly of this embodiment can further have other focal lengths corresponding to the intermediate range of the first state and the second state in other focus conditions besides the first state and the second state for different object distances.

It can be known from Table 1B, the second lens group G2 moves along a direction parallel to the optical axis with respect to the first lens group G1 during the focus process and the zoom process.

TABLE 1C

Aspheric Coefficients

| Surface # | 4 | 5 | 6 | 7 |
|---|---|---|---|---|
| k= | −6.5491300000E−01 | 9.9000000000E+01 | −4.6575500000E+00 | −2.4762700000E+00 |
| A4= | 5.9055102551E−04 | 2.7407723498E−03 | −2.7101907871E−03 | −4.5993377924E−03 |
| A6= | −2.5511748602E−04 | −1.3544783611E−03 | −1.1660776411E−03 | −9.3366119960E−04 |
| A8= | 1.0964466050E−04 | 5.0861195983E−04 | 4.0496519108E−04 | 9.5986972320E−04 |
| A10= | −3.2853346156E−05 | −1.3662889223E−04 | −3.3762770451E−05 | −5.8613626361E−04 |
| A12= | 6.8091109348E−06 | 2.6119169892E−05 | −2.2369624755E−05 | 2.5603594190E−04 |
| A14= | −9.9804157063E−07 | −3.6220308892E−06 | 1.0456956384E−05 | −8.0613409238E−05 |
| A16= | 1.0463990947E−07 | 3.6760265899E−07 | −2.3956506748E−06 | 1.8375780728E−05 |
| A18= | −7.8668737478E−09 | −2.7293213464E−08 | 3.5403457079E−07 | −3.0418772722E−06 |
| A20= | 4.2020348917E−10 | 1.4657815929E−09 | −3.6065478148E−08 | 3.6479375231E−07 |
| A22= | −1.5552137709E−11 | −5.5435950476E−11 | 2.5697548776E−09 | −3.1321081675E−08 |
| A24= | 3.7888755567E−13 | 1.4004607658E−12 | −1.2622169120E−10 | 1.8749120004E−09 |
| A26= | −5.4620090098E−15 | −2.1212974760E−14 | 4.0806732747E−12 | −7.4268243334E−11 |
| A28= | 3.5285359160E−17 | 1.4568802122E−16 | −7.8250309906E−14 | 1.7489001005E−12 |
| A30= | — | — | 6.7475424418E−16 | −1.8531745961E−14 |

TABLE 1C-continued

| Aspheric Coefficients | | | | |
|---|---|---|---|---|
| Surface # | 9 | 10 | 13 | 14 |
| k= | 4.8798700000E+01 | −4.3313800000E+01 | −5.1869400000E+01 | −6.8550500000E+01 |
| A4= | −7.9622252736E−04 | −3.4065325493E−04 | 4.2467951150E−03 | −5.1870545457E−04 |
| A6= | 1.0311875003E−03 | 5.9952469416E−05 | −7.2793823322E−04 | 2.6269805250E−04 |
| A8= | −1.7047714288E−03 | 2.8074156987E−04 | 1.0954578605E−04 | −1.6526264852E−04 |
| A10= | 1.4847897374E−03 | −4.0856545287E−04 | −8.8210567371E−06 | 6.4611388175E−05 |
| A12= | −8.3083190366E−04 | 2.9009362029E−04 | −3.0930801686E−07 | −1.4590325455E−05 |
| A14= | 3.1745617003E−04 | −1.2877938665E−04 | 1.5777537325E−07 | 1.9936337306E−06 |
| A16= | −8.5688864214E−05 | 3.8750148946E−05 | −1.2416155815E−08 | −1.5174697052E−07 |
| A18= | 1.6627077453E−05 | −8.1862040032E−06 | −6.2814096790E−10 | 3.0546197424E−09 |
| A20= | −2.3294428295E−06 | 1.2298239323E−06 | 2.0044656677E−10 | 5.7133438254E−10 |
| A22= | 2.3360514302E−07 | −1.3086141874E−07 | −1.8125561365E−11 | −6.4437432987E−11 |
| A24= | −1.6353189526E−08 | 9.6446644363E−09 | 9.0054249120E−13 | 3.3435182383E−12 |
| A26= | 7.5891226739E−10 | −4.6840740211E−10 | −2.6374101284E−14 | −9.8693466946E−14 |
| A28= | −2.0979014625E−11 | 1.3486109221E−11 | 4.2864247189E−16 | 1.5997260649E−15 |
| A30= | 2.6146796248E−13 | −1.7437809509E−13 | −2.9953075035E−18 | −1.1111951178E−17 |
| Surface # | 15 | 16 | 17 | 18 |
| k= | −1.6891800000E+01 | −1.7127700000E+01 | −1.2047900000E+01 | −6.7954200000E+00 |
| A4= | −1.5791477324E−03 | 3.2008499880E−03 | −3.2438615672E−03 | −4.9219367978E−04 |
| A6= | 1.2466320185E−04 | −3.5667761018E−03 | −3.6558181952E−03 | −2.6635353670E−03 |
| A8= | −1.9370597233E−04 | 1.2602664024E−03 | 7.3517439556E−04 | 6.9830175929E−04 |
| A10= | 1.3900520523E−04 | −2.5239987298E−04 | 1.2985697803E−04 | −3.6496149888E−05 |
| A12= | −4.5529800285E−05 | 3.3036087072E−05 | −8.8825880000E−05 | −1.9156978534E−05 |
| A14= | 9.1946877840E−06 | −3.0104207515E−06 | 2.0465321770E−05 | 5.5172041600E−06 |
| A16= | −1.2529502732E−06 | 2.1329225594E−07 | −2.8054744113E−06 | −7.7332299186E−07 |
| A18= | 1.1978954708E−07 | −1.3537939737E−08 | 2.5621356413E−07 | 6.8718101868E−08 |
| A20= | −8.1675606357E−09 | 7.9201713149E−10 | −1.6197191027E−08 | −4.1478896151E−09 |
| A22= | 3.9650037320E−10 | −3.7845316544E−11 | 7.1375795784E−10 | 1.7316728817E−10 |
| A24= | −1.3414396778E−11 | 1.2969476801E−12 | −2.1558414872E−11 | −4.9433976798E−12 |
| A26= | 3.0084370641E−13 | −2.8933930524E−14 | 4.2588198911E−13 | 9.2375112632E−14 |
| A28= | −4.0202051154E−15 | 3.7322427189E−16 | −4.9589343392E−15 | −1.0204553813E−15 |
| A30= | 2.4222346514E−17 | −2.1069163820E−18 | 2.5810735642E−17 | 5.0613314074E−18 |

In Table 1C, k represents the conic coefficient of the equation of the aspheric surface profiles. A4-A30 represent the aspheric coefficients ranging from the 4th order to the 30th order. The tables presented below for each embodiment are the corresponding schematic parameter and aberration curves, and the definitions of the tables are the same as Table 1A to Table 1C of the 1st embodiment. Therefore, an explanation in this regard will not be provided again.

2nd Embodiment

Figure 4:
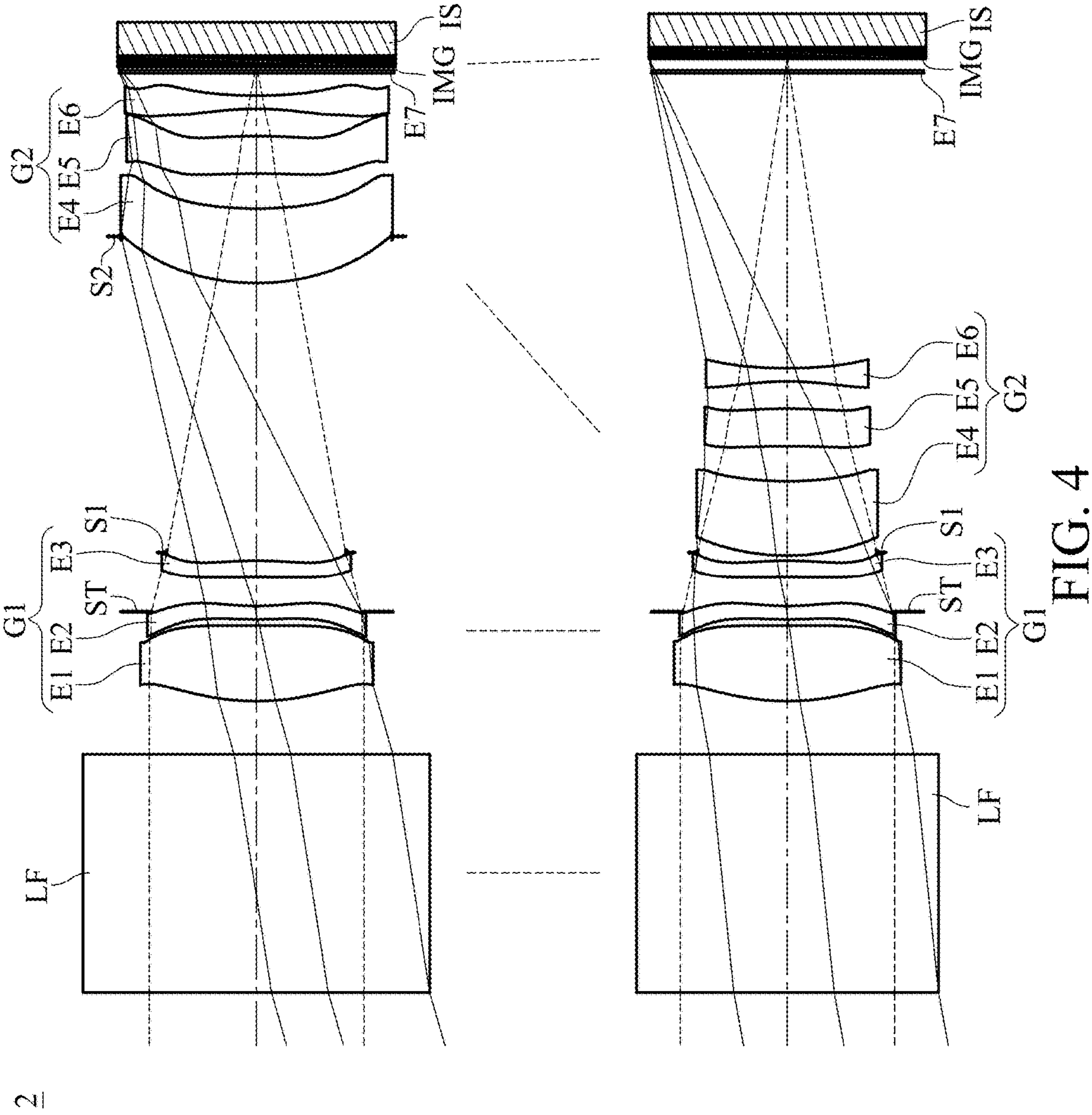
FIG. 4 is a schematic view of an image capturing unit respectively at a short-focal-end first state and at a long-focal-end first state according to the 2nd embodiment of the present disclosure.
Figure 5:
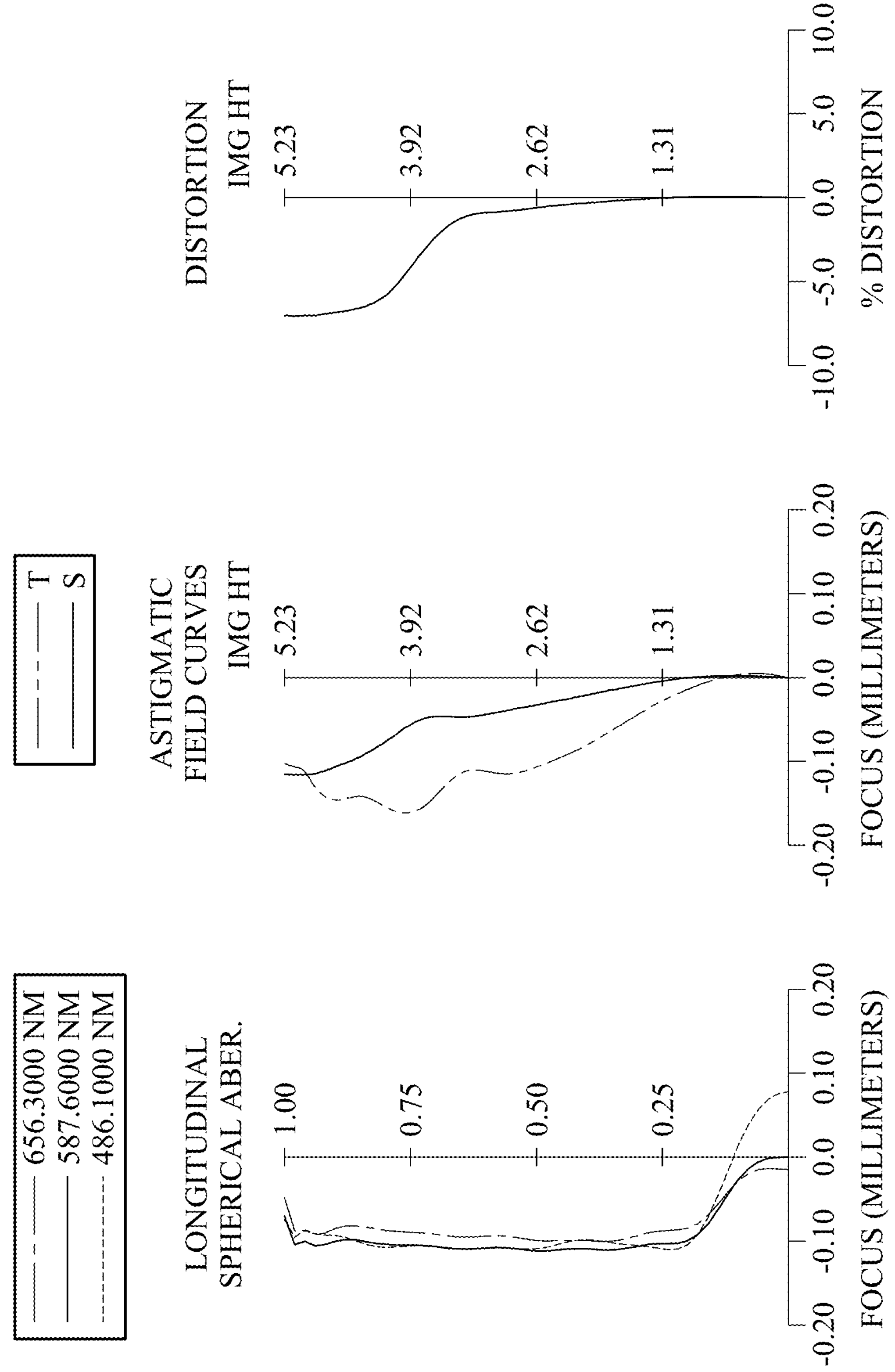
FIG. 5 shows spherical aberration curves, astigmatic field curves and a distortion curve of the image capturing unit at the short-focal-end first state according to the 2nd embodiment.
Figure 6:
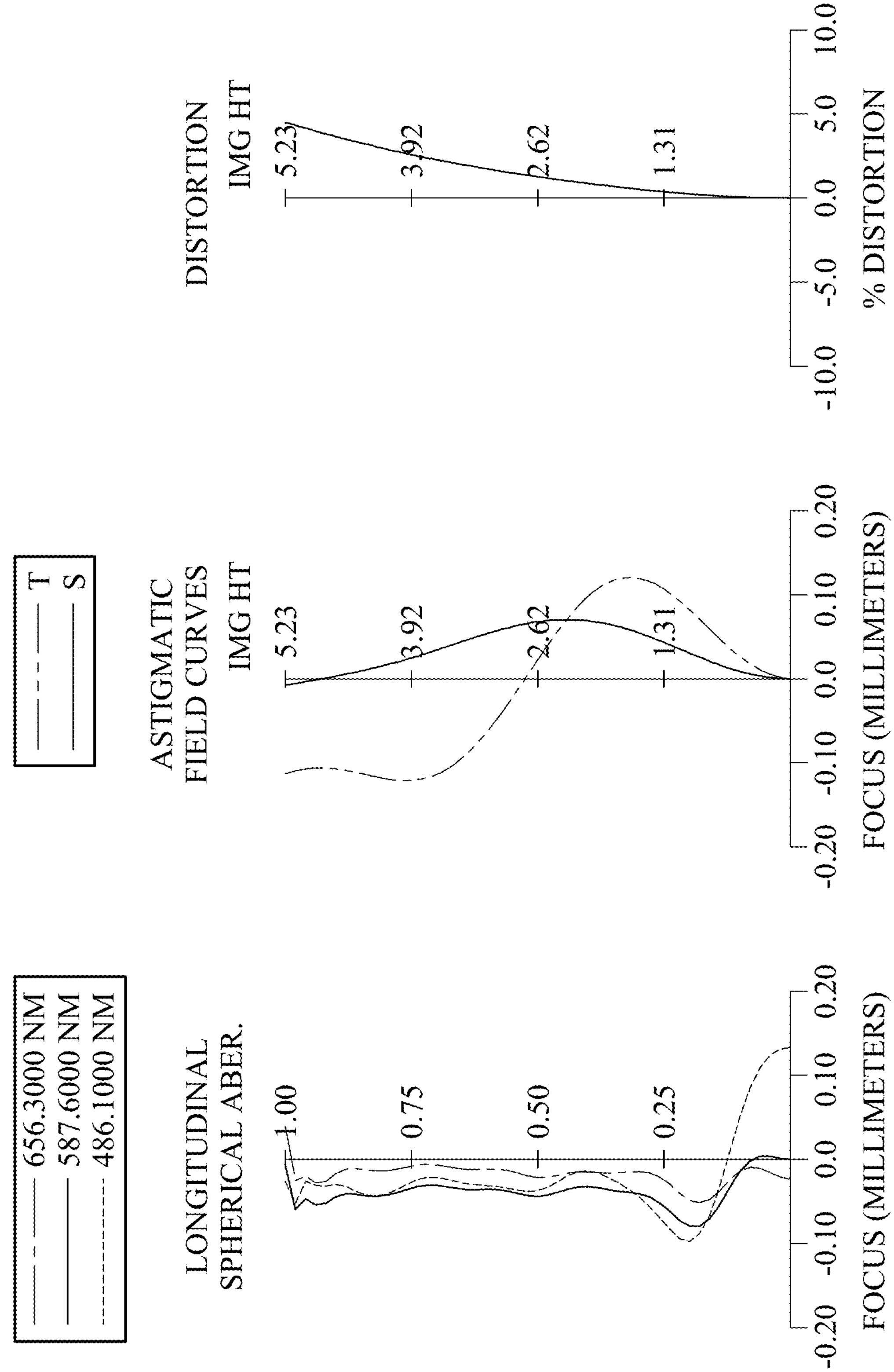
FIG. 6 shows spherical aberration curves, astigmatic field curves and a distortion curve of the image capturing unit at the long-focal-end first state according to the 2nd embodiment.

FIG. 4 is a schematic view of an image capturing unit respectively at a short-focal-end first state and at a long-focal-end first state according to the 2nd embodiment of the present disclosure. FIG. 5 shows, in order from left to right, spherical aberration curves, astigmatic field curves and a distortion curve of the image capturing unit at the short-focal-end first state according to the 2nd embodiment. FIG. 6 shows, in order from left to right, spherical aberration curves, astigmatic field curves and a distortion curve of the image capturing unit at the long-focal-end first state according to the 2nd embodiment. The upper part of FIG. 4 shows the imaging optical lens assembly at the short-focal-end first state, and the lower part of FIG. 4 shows the imaging optical lens assembly at the long-focal-end first state. In FIG. 4, the image capturing unit 2 includes the imaging optical lens assembly (its reference numeral is omitted) of the present disclosure and an image sensor IS. The imaging optical lens assembly includes, in order from an object side to an image side along an optical path, a reflective element LF, a first lens element E1, a second lens element E2, an aperture stop ST, a third lens element E3, a stop S1, a stop S2, a fourth lens element E4, a fifth lens element E5, a sixth lens element E6, a filter E7 and an image surface IMG. Further, the imaging optical lens assembly includes, in order from the object side to the image side along the optical path, a first lens group G1 and a second lens group G2. The first lens group G1 includes the first lens element E1, the second lens element E2 and the third lens element E3, and the second lens group G2 includes the fourth lens element E4, the fifth lens element E5 and the sixth lens element E6. Moreover, the first lens group G1 has positive refractive power. The imaging optical lens assembly includes six lens elements (E1, E2, E3, E4, E5 and E6) with no additional lens element disposed between each of the adjacent six lens elements.

The imaging optical lens assembly has a first state corresponding to an infinite object distance and a second state corresponding to a finite object distance. The first state refers to a state of the imaging optical lens assembly with an imaged object at an infinite distance (the infinite object distance), and the second state refers to a state of the imaging optical lens assembly with an imaged object at a finite distance (the finite object distance). When an imaged object at the infinite object distance moves to the finite object distance, the imaging optical lens assembly performs a focus process to change the first state to the second state thereof. Conversely, when an imaged object at the finite object distance moves to the infinite object distance, the imaging optical lens assembly also performs the focus process to change the second state to the first state thereof. Moreover, during the focus process of the imaging optical lens assembly, the first lens group G1 has no relative movement with respect to a reflective surface of the reflective element LF, the second lens group G2 moves along a direction parallel to an optical axis with respect to the first lens group G1, and the image surface IMG moves along a direction parallel to the optical axis. Please be noted that there is no relative movement between any two lens elements of each of the first lens group and the second lens group of the two lens groups during the focus process.

The imaging optical lens assembly at the first state has a long-focal-end first state corresponding to a long focal end and a short-focal-end first state corresponding to a short focal end during a zoom process. Moreover, when the imaging optical lens assembly changes its long-focal-end first state to the short-focal-end first state during the zoom process, the second lens group G2 moves along a direction parallel to the optical axis toward the image side with respect to the first lens group G1. Conversely, when the imaging optical lens assembly changes its short-focal-end first state to the long-focal-end first state during the zoom process, the second lens group G2 moves along a direction parallel to the optical axis towards the object side with respect to the first lens group G1. As shown in FIG. 4, the upper part of FIG. 4 shows the imaging optical lens assembly at the short-focal-end first state, and the lower part of FIG. 4 shows the imaging optical lens assembly at the long-focal-end first state. Similarly, the imaging optical lens assembly at the second state has a long-focal-end second state corresponding to the long focal end and a short-focal-end second state corresponding to the short focal end during the zoom process. Moreover, during the zoom process of the imaging optical lens assembly, the first lens group G1 has no relative movement with respect to the reflective surface of the reflective element LF, the second lens group G2 moves along a direction parallel to the optical axis with respect to the first lens group G1, and the image surface IMG moves along a direction parallel to the optical axis. Please be noted that there is no relative movement between any two lens elements of each of the first lens group and the second lens group of the two lens groups during the zoom process. Please be noted that only optical effective areas of lens elements of the imaging optical lens assembly at the long-focal-end first state in the lower part of FIG. 4 are illustrated, and the non-optical effective areas, such as peripheral areas of the stop S2 and the fourth lens element E4 through the sixth lens element E6, are omitted.

The first lens element E1 with positive refractive power has an object-side surface being convex in a paraxial region thereof and an image-side surface being convex in a paraxial region thereof. The first lens element E1 is made of glass material and has the object-side surface and the image-side surface being both aspheric. The object-side surface of the first lens element E1 has one inflection point in an off-axis region thereof. The image-side surface of the first lens element E1 has three inflection points in an off-axis region thereof. The object-side surface of the first lens element E1 has one concave critical point in the off-axis region thereof. The image-side surface of the first lens element E1 has one convex critical point and one concave critical point in the off-axis region thereof.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has two inflection points in an off-axis region thereof. The image-side surface of the second lens element E2 has two inflection points in an off-axis region thereof. The object-side surface of the second lens element E2 has one concave critical point in the off-axis region thereof. The image-side surface of the second lens element E2 has one convex critical point in the off-axis region thereof.

The third lens element E3 with positive refractive power has an object-side surface being concave in a paraxial region thereof and an image-side surface being convex in a paraxial region thereof. The third lens element E3 is made of plastic material and has the object-side surface and the image-side surface being both aspheric. The object-side surface of the third lens element E3 has one inflection point in an off-axis region thereof. The image-side surface of the third lens element E3 has one inflection point in an off-axis region thereof. The object-side surface of the third lens element E3 has one convex critical point in the off-axis region thereof. The image-side surface of the third lens element E3 has one concave critical point in the off-axis region thereof.

The fourth lens element E4 with positive refractive power has an object-side surface being convex in a paraxial region thereof and an image-side surface being concave in a paraxial region thereof. The fourth lens element E4 is made of glass material and has the object-side surface and the image-side surface being both aspheric. The object-side surface of the fourth lens element E4 has one inflection point in an off-axis region thereof. The image-side surface of the fourth lens element E4 has one inflection point in an off-axis region thereof. The image-side surface of the fourth lens element E4 has one convex critical point in the off-axis region thereof.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric. The object-side surface of the fifth lens element E5 has two inflection points in an off-axis region thereof. The image-side surface of the fifth lens element E5 has two inflection points in an off-axis region thereof. The object-side surface of the fifth lens element E5 has one convex critical point and one concave critical point in the off-axis region thereof. The image-side surface of the fifth lens element E5 has one convex critical point and one concave critical point in the off-axis region thereof.

The sixth lens element E6 with negative refractive power has an object-side surface being concave in a paraxial region thereof and an image-side surface being concave in a paraxial region thereof. The sixth lens element E6 is made of plastic material and has the object-side surface and the image-side surface being both aspheric. The object-side surface of the sixth lens element E6 has four inflection points in an off-axis region thereof. The image-side surface of the sixth lens element E6 has two inflection points in an off-axis region thereof. The object-side surface of the sixth lens element E6 has one convex critical point in the off-axis region thereof. The image-side surface of the sixth lens element E6 has one convex critical point and one concave critical point in the off-axis region thereof.

The reflective element LF is made of glass material. The reflective element LF is disposed between an imaged object and the first lens group G1 (it can be also considered that the reflective element LF is disposed at an object side of the first lens element E1). The reflective element LF will not affect the focal length of the imaging optical lens assembly. The reflective element LF is a prism which provides an optical path folding function. For simplicity, the optical path folding effect generated by the reflective element LF in FIG. 4 is omitted. The reflective element LF has an object-side surface and an image-side surface both being planar, but the present disclosure is not limited thereto. The reflective element LF can have various forms for providing different deflecting effect to the optical path. For example, the reflective element LF of the 2nd embodiment can be the reflective element LF as shown in FIG. 21 to FIG. 23, which deflects the optical path once, wherein the reflective surface RF1 of the reflective element LF deflects the first axis OA1 into the second optical axis OA2. The detail can be referred to the description related to FIG. 21 to FIG. 23, which will not be repeated again.

The filter E7 is made of glass material and located between the sixth lens element E6 and the image surface IMG, and will not affect the focal length of the imaging optical lens assembly. The image sensor IS is disposed on or near the image surface IMG.

The detailed optical data of the 2nd embodiment are shown in Table 2A and Table 2B, and the aspheric surface data are shown in Table 2C below.

TABLE 2A

| 2nd Embodiment | | | | | | | |
|---|---|---|---|---|---|---|---|
| Surface # | | Curvature Radius | Thickness | Material | Index | Abbe # | Focal Length |
| 0 | Object | Plano | D0 | | | | |
| 1 | Reflective element | Plano | 9.000 | Glass | 1.785 | 25.7 | — |
| 2 | | Plano | 2.000 | | | | |
| 3 | Lens 1 | 9.2604 (ASP) | 2.846 | Glass | 1.497 | 81.6 | 15.75 |
| 4 | | −45.4267 (ASP) | 0.239 | | | | |
| 5 | Lens 2 | 58.9115 (ASP) | 0.500 | Plastic | 1.587 | 28.3 | −20.81 |
| 6 | | 10.0886 (ASP) | −0.215 | | | | |
| 7 | Ape. Stop | Plano | 1.308 | | | | |
| 8 | Lens 3 | −78.8433 (ASP) | 0.631 | Plastic | 1.534 | 56.0 | 38.39 |
| 9 | | −16.3229 (ASP) | 0.314 | | | | |
| 10 | Stop | Plano | D1 | | | | |
| 11 | Stop | Plano | −1.750 | | | | |
| 12 | Lens 4 | 8.8237 (ASP) | 2.800 | Glass | 1.497 | 81.6 | 45.21 |
| 13 | | 12.9962 (ASP) | 1.321 | | | | |
| 14 | Lens 5 | −36.0000 (ASP) | 1.413 | Plastic | 1.669 | 19.5 | 86.37 |
| 15 | | −22.5305 (ASP) | 1.029 | | | | |
| 16 | Lens 6 | −11.0721 (ASP) | 0.500 | Plastic | 1.544 | 56.0 | −13.37 |
| 17 | | 21.5586 (ASP) | D2 | | | | |
| 18 | Filter | Plano | 0.110 | Glass | 1.517 | 64.2 | — |
| 19 | | Plano | 0.131 | | | | |
| 20 | Image | Plano | D3 | | | | |

Note:
Reference wavelength is 587.6 nm (d-line).
An effective radius of the stop S1 (Surface 10) is 3.376 mm.
An effective radius of the stop S2 (Surface 11) is 5.112 mm.

TABLE 2B

| Optical data for imaging optical lens assembly at the short-focal-end first state, the long-focal-end first state, the short-focal-end second state and the long-focal-end second state | | | |
|---|---|---|---|
| | short-focal-end first state | | long-focal-end first state |
| fSf [mm] | 19.80 | fLf [mm] | 27.05 |
| FnoSf | 2.44 | FnoLf | 3.34 |
| HFOVSf [deg.] | 16.0 | HFOVLf [deg.] | 10.5 |
| Object distance [mm] | infinity | Object distance [mm] | infinity |
| D0 [mm] | infinity | D0 [mm] | infinity |
| D1 [mm] | 11.931 | D1 [mm] | 1.636 |
| D2 [mm] | 0.839 | D2 [mm] | 11.134 |
| D3 [mm] | 0.000 | D3 [mm] | 0.319 |
| | short-focal-end second state | | long-focal-end second state |
| fSn [mm] | 19.66 | fLn [mm] | 26.00 |
| FnoSn | 2.49 | FnoLn | 3.30 |
| HFOVSn [deg.] | 15.8 | HFOVLn [deg.] | 10.6 |
| Object distance [mm] | 1511.050 | Object distance [mm] | 1511.050 |
| D0 [mm] | 1500.050 | D0 [mm] | 1500.050 |
| D1 [mm] | 12.208 | D1 [mm] | 2.769 |
| D2 [mm] | 0.562 | D2 [mm] | 10.001 |
| D3 [mm] | 0.319 | D3 [mm] | 0.319 |

In Table 21, the optical data is the same as the data of the 1st embodiment. Moreover, the imaging optical lens assembly of this embodiment can further have other focal lengths corresponding to the intermediate range of the first state and the second state in other movement focusing conditions besides the first state and the second state for different object distances.

It can be known from Table 21B, the second lens group G2 moves along a direction parallel to the optical axis with respect to the first lens group G1 during the focus process and the zoom process.

TABLE 2C

| Aspheric Coefficients | | | | |
|---|---|---|---|---|
| Surface # | 3 | 4 | 5 | 6 |
| k= | −4.9817700000E+00 | 9.9000000000E+01 | 3.8072300000E+01 | −6.8974700000E+00 |
| A4= | 1.1745891068E−03 | 3.3449709318E−02 | 4.6011991554E−02 | 1.9470163972E−02 |
| A6= | −4.2759750423E−04 | −3.4386273392E−02 | −5.7218779089E−02 | −3.3046859339E−02 |
| A8= | 5.8473815141E−05 | 1.8669852533E−02 | 3.2825259122E−02 | 2.0452124108E−02 |
| A10= | 2.7555570249E−05 | −6.3824053629E−03 | −1.1576361076E−02 | −7.5888015698E−03 |
| A12= | −1.7816460273E−05 | 1.4847634644E−03 | 2.7520606585E−03 | 1.8815973893E−03 |
| A14= | 4.9770792333E−06 | −2.4636638628E−04 | −4.6438925482E−04 | −3.3003972039E−04 |
| A16= | −8.6742189936E−07 | 2.9923323757E−05 | 5.7231381320E−05 | 4.2250462370E−05 |
| A18= | 1.0308154035E−07 | −2.6895248450E−06 | −5.2164314337E−06 | −4.0035339790E−06 |
| A20= | −8.6063338943E−09 | 1.7865600074E−07 | 3.5153680202E−07 | 2.8099323515E−07 |
| A22= | 5.0617735098E−10 | −8.6529847467E−09 | −1.7288209887E−08 | −1.4427587077E−08 |
| A24= | −2.0567851358E−11 | 2.9676559437E−10 | 6.0257372360E−10 | 5.2653560839E−10 |
| A26= | 5.5004212697E−13 | −6.8205046349E−12 | −1.4082216150E−11 | −1.2925883209E−11 |
| A28= | −8.7145858090E−15 | 9.4104583294E−14 | 1.9757089065E−13 | 1.9116652724E−13 |
| A30= | 6.1984787883E−17 | −5.8842908919E−16 | −1.2552328749E−15 | −1.2852711478E−15 |
| Surface # | 8 | 9 | 12 | 13 |
| k= | −9.9000000000E+01 | −9.6958100000E+01 | −3.5921500000E+01 | −2.1331200000E+00 |
| A4= | 3.6321261475E−03 | 7.1306454051E−04 | 6.4001217795E−03 | −3.5515779328E−04 |
| A6= | −4.8756965535E−03 | −1.9765795957E−03 | −1.2796885540E−03 | −1.6829692045E−04 |
| A8= | 2.9467328691E−03 | 2.2485268803E−03 | 2.9549707420E−04 | 1.8267981653E−04 |
| A10= | −8.2844937544E−04 | −1.2946001896E−03 | −6.0559749020E−05 | −7.0567624729E−05 |
| A12= | 1.0685497309E−04 | 5.6823926822E−04 | 9.8054057284E−06 | 1.7425759298E−05 |
| A14= | 1.6557492381E−06 | −1.9248944511E−04 | −1.1705883834E−06 | −2.7709237001E−06 |
| A16= | −2.8031152774E−06 | 4.8428781876E−05 | 1.0006409462E−07 | 2.9582088328E−07 |
| A18= | 4.5040222304E−07 | −8.8499938846E−06 | −6.0366372464E−09 | −2.2291542965E−08 |
| A20= | −3.4097273247E−08 | 1.1621621998E−06 | 2.5252454345E−10 | 1.2340827321E−09 |
| A22= | 8.5950264404E−10 | −1.0829303614E−07 | −7.0715140569E−12 | −5.1146358932E−11 |
| A24= | 6.4785466142E−11 | 6.9835747428E−09 | 1.2266134468E−13 | 1.5628995971E−12 |
| A26= | −6.4973923434E−12 | −2.9637086973E−10 | −1.0651815752E−15 | −3.3130128317E−14 |
| A28= | 2.2856021242E−13 | 7.4479727722E−12 | 3.8203415760E−19 | 4.2892160006E−16 |
| A30= | −3.0601299765E−15 | −8.4000030336E−14 | 4.5372866149E−20 | −2.5125624985E−18 |
| Surface # | 14 | 15 | 16 | 17 |
| k= | −9.5380700000E+01 | 3.8017900000E+00 | −9.5445200000E+01 | −9.9000000000E+01 |
| A4= | −4.7995203414E−04 | 8.4371674111E−04 | −6.9943387980E−03 | 4.1154453553E−03 |
| A6= | −6.8351263417E−05 | −4.6027163552E−04 | 3.7903821507E−03 | −9.6206539789E−04 |
| A8= | 3.1552017771E−04 | 5.6120842730E−04 | −1.6795164121E−03 | 5.2348880546E−04 |
| A10= | −1.5958349897E−04 | −2.5136385483E−04 | 5.5658127392E−04 | −2.5689736760E−04 |
| A12= | 5.0749520655E−05 | 7.0614573975E−05 | −1.3148712296E−04 | 8.2844244142E−05 |
| A14= | −1.0494752520E−05 | −1.2631333951E−05 | 2.2774655561E−05 | −1.7421415816E−05 |
| A16= | 1.4718394930E−06 | 1.4993642330E−06 | −2.9069540041E−06 | 2.4708845943E−06 |
| A18= | −1.4502523149E−07 | −1.2253662673E−07 | 2.7027362748E−07 | −2.4233519185E−07 |
| A20= | 1.0213435944E−08 | 7.0310927041E−09 | −1.8044107806E−08 | 1.6601084923E−08 |
| A22= | −5.1371497952E−10 | −2.8370145579E−10 | 8.5033722729E−10 | −7.9102840226E−10 |
| A24= | 1.8084050090E−11 | 7.9045557322E−12 | −2.7517769066E−11 | 2.5670404456E−11 |
| A26= | −4.2438193888E−13 | −1.4515805056E−13 | 5.8098177317E−13 | −5.4085677965E−13 |
| A28= | 5.9752632592E−15 | 1.5851080465E−15 | −7.2014861784E−15 | 6.6707595850E−15 |
| A30= | −3.8231884469E−17 | −7.8184924997E−18 | 3.9735940332E−17 | −3.6565115269E−17 |

Moreover, these parameters shown in Table 2D can be calculated from Table 2A to Table 20 as the following values and satisfy the following conditions:

TABLE 2D

| Schematic Parameters | | | |
|---|---|---|---|
| fSf [mm] | 19.80 | TLLn [mm] | 24.266 |
| FnoSf | 2.44 | TDLn [mm] | 13.705 |
| HFOVSf [deg.] | 16.0 | HFOVSf/HFOVLf | 1.52 |
| TLSf [mm] | 23.947 | 10 × \|TLSf − TLLf\|/TLSf | 0.13 |
| TDSf [mm] | 22.867 | (TDSf − TDLf)/TLSf | 0.43 |
| fLf [mm] | 27.05 | TLSf/ImgH | 4.58 |
| FnoLf | 3.34 | TLLf/ImgH | 4.64 |
| HFOVLf [deg.] | 10.5 | fSf/fG1 | 0.87 |
| TLLf [mm] | 24.266 | TG1/TG2 | 0.75 |
| TDLf [mm] | 12.572 | 10 × \|FnoSn − FnoSf\| | 0.50 |
| fSn [mm] | 19.66 | 10 × \|FnoLn − FnoLf\| | 0.40 |
| FnoSn | 2.49 | 10 × (TLSn/fSn − TLSf/fSf) | 0.25 |
| HFOVSn [deg.] | 15.8 | 10 × (TLLn/fLn − TLLf/fLf) | 0.36 |
| TLSn [mm] | 24.266 | (\|fSf/f4\| + \|fSf/f5\|)/\|fSf/f2\| | 0.70 |
| TDSn [mm] | 23.144 | CT1/CT6 | 5.69 |
| fLn [mm] | 26.00 | (CT1 + CT2 + CT3)/(T12 + T23) | 2.99 |
| FnoLn | 3.30 | DImgS [mm] | 0.319 |
| HFOVLn [deg.] | 10.6 | DImgS/CTmin | 0.64 |

In the 2nd embodiment, the equation of the aspheric surface profiles of the aforementioned lens elements is the same as the equation of the 1st embodiment.

3rd Embodiment

Figure 7:
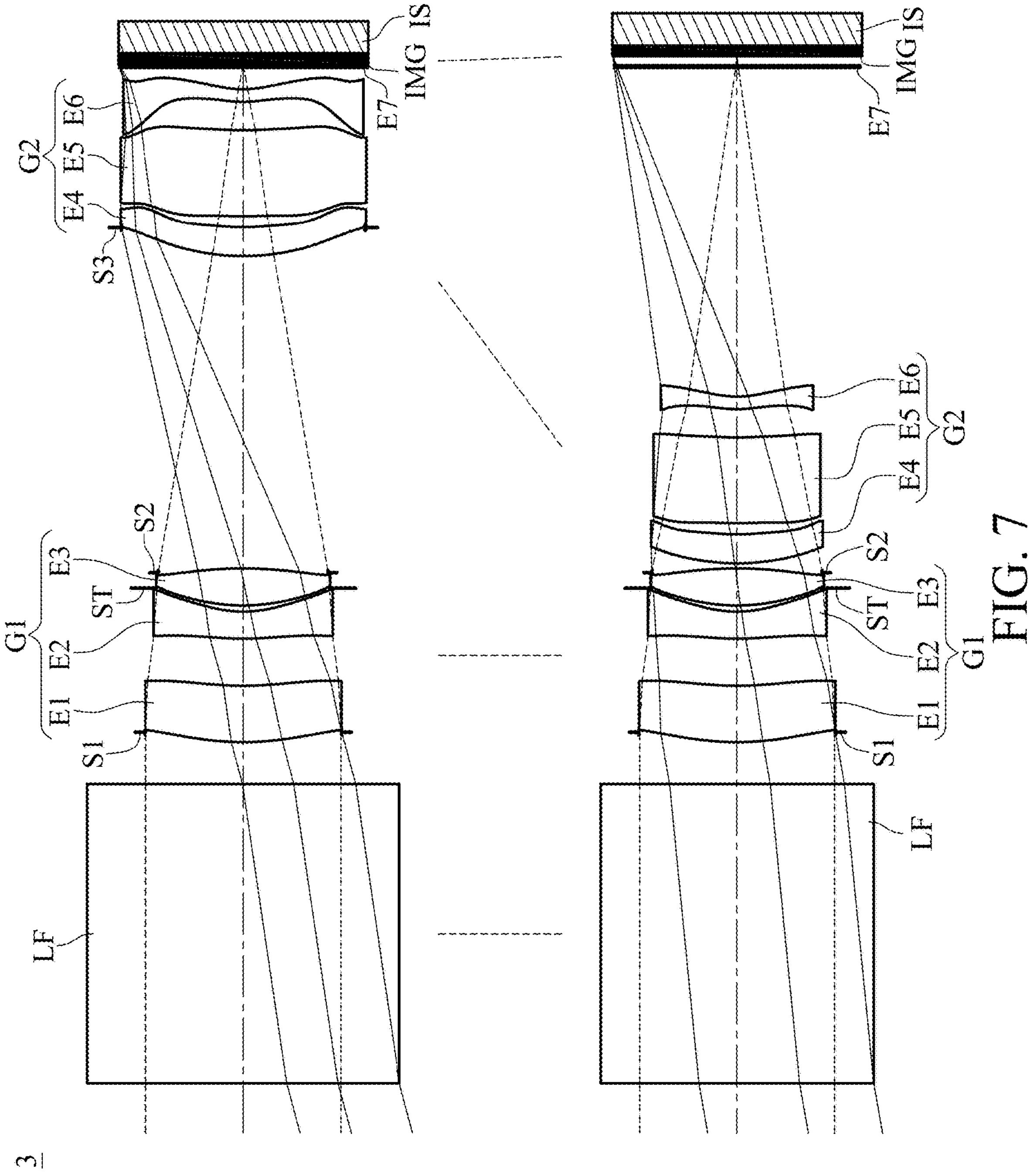
FIG. 7 is a schematic view of an image capturing unit respectively at a short-focal-end first state and at a long-focal-end first state according to the 3rd embodiment of the present disclosure.
Figure 8:
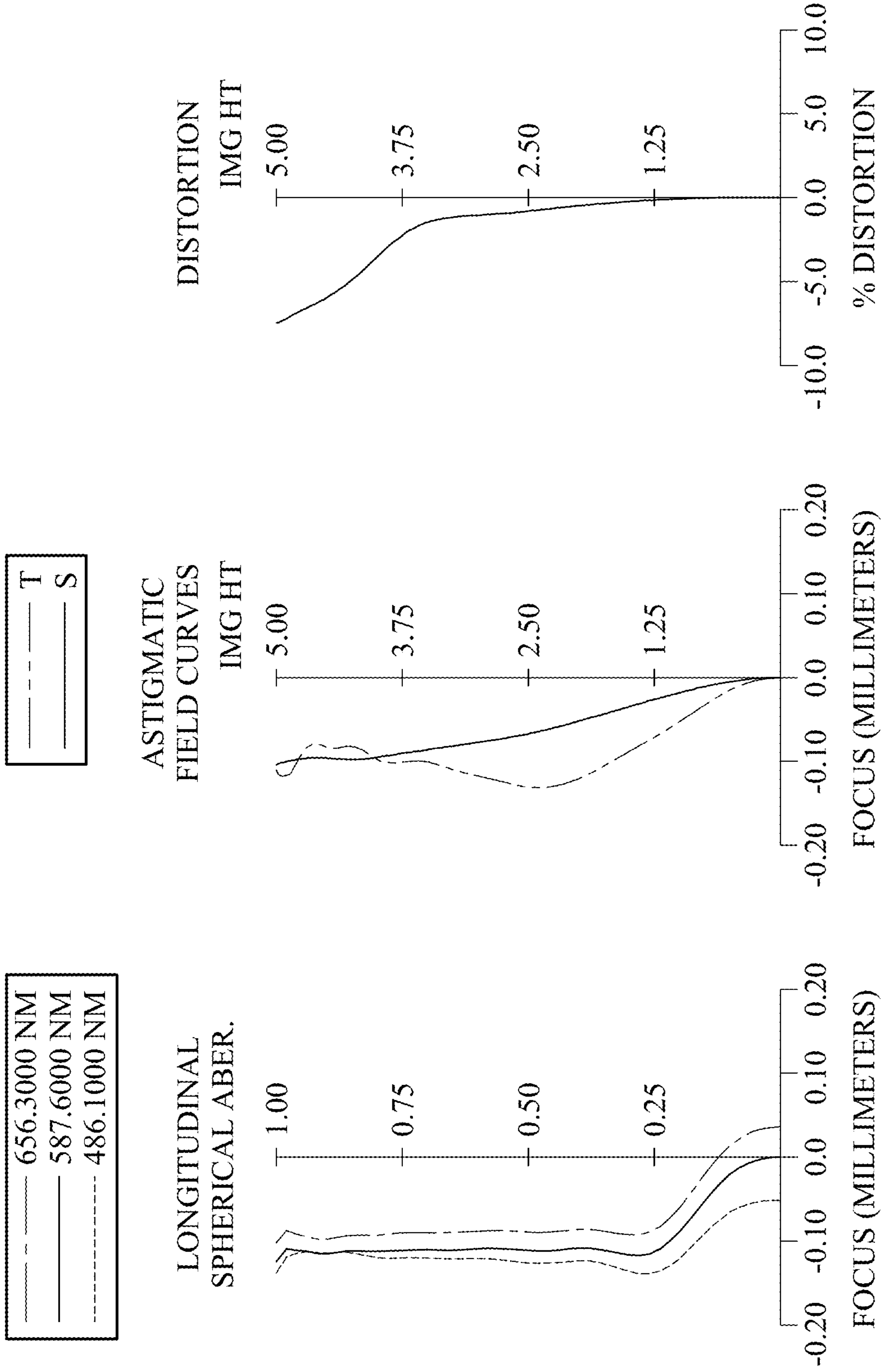
FIG. 8 shows spherical aberration curves, astigmatic field curves and a distortion curve of the image capturing unit at the short-focal-end first state according to the 3rd embodiment.
Figure 9:
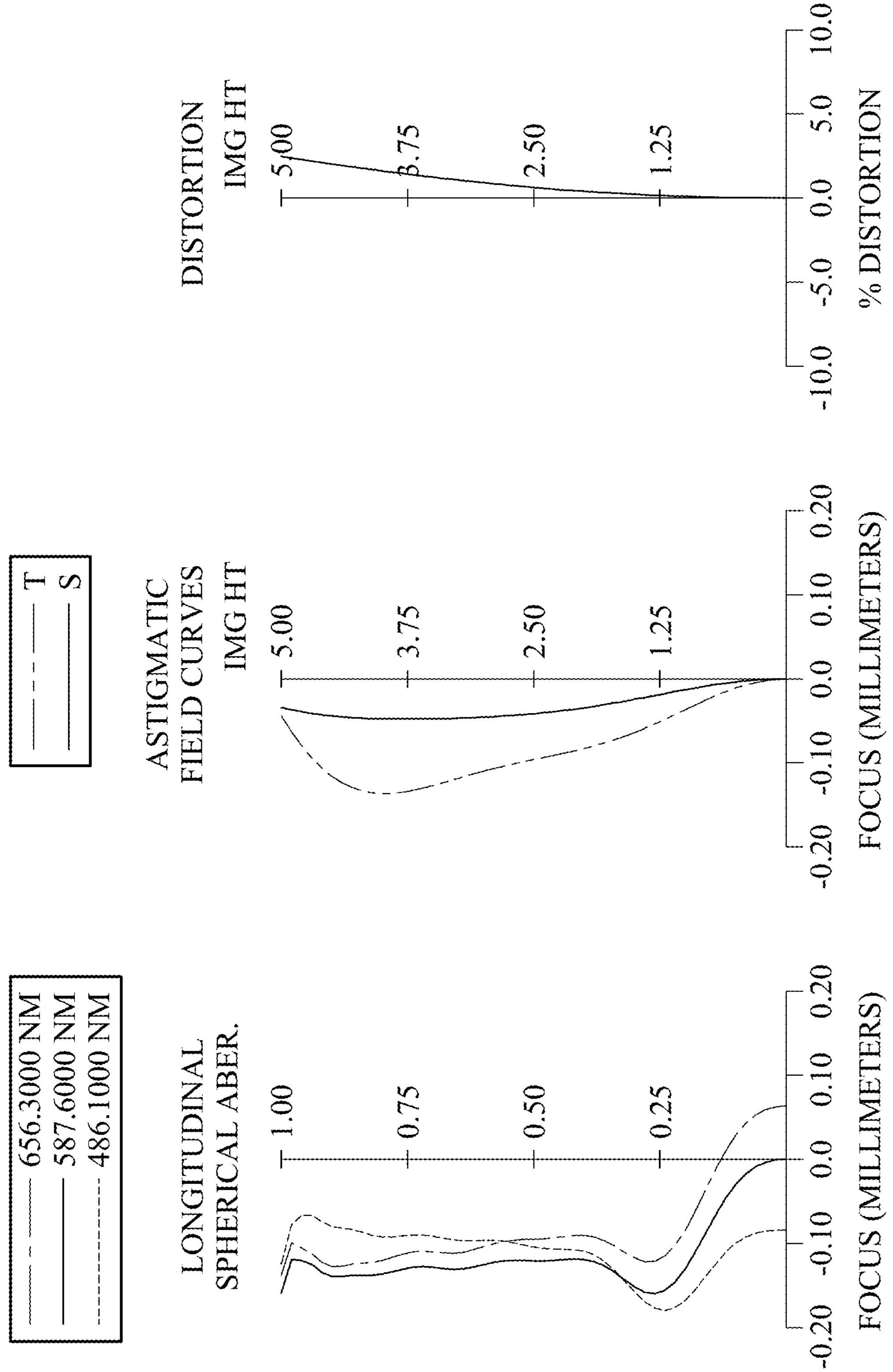
FIG. 9 shows spherical aberration curves, astigmatic field curves and a distortion curve of the image capturing unit at the long-focal-end first state according to the 3rd embodiment.

FIG. 7 is a schematic view of an image capturing unit respectively at a short-focal-end first state and at a long-focal-end first state according to the 3rd embodiment of the present disclosure. FIG. 8 shows, in order from left to right, spherical aberration curves, astigmatic field curves and a distortion curve of the image capturing unit at the short-focal-end first state according to the 3rd embodiment. FIG. 9 shows, in order from left to right, spherical aberration curves, astigmatic field curves and a distortion curve of the image capturing unit at the long-focal-end first state according to the 3rd embodiment. The upper part of FIG. 7 shows the imaging optical lens assembly at the short-focal-end first state, and the lower part of FIG. 7 shows the imaging optical lens assembly at the long-focal-end first state. In FIG. 7, the image capturing unit 3 includes the imaging optical lens assembly (its reference numeral is omitted) of the present disclosure and an image sensor IS. The imaging optical lens assembly includes, in order from an object side to an image side along an optical path, a reflective element LF, a stop S1, a first lens element E1, a second lens element E2, an aperture stop ST, a third lens element E3, a stop S2, a stop S3, a fourth lens element E4, a fifth lens element E5, a sixth lens element E6, a filter E7 and an image surface IMG. Further, the imaging optical lens assembly includes, in order from the object side to the image side along the optical path, a first lens group G1 and a second lens group G2. The first lens group G1 includes the first lens element E1, the second lens element E2 and the third lens element E3, and the second lens group G2 includes the fourth lens element E4, the fifth lens element E5 and the sixth lens element E6. Moreover, the first lens group G1 has positive refractive power. The imaging optical lens assembly includes six lens elements (E1, E2, E3, E4, E5 and E6) with no additional lens element disposed between each of the adjacent six lens elements.

The imaging optical lens assembly has a first state corresponding to an infinite object distance and a second state corresponding to a finite object distance. The first state refers to a state of the imaging optical lens assembly with an imaged object at an infinite distance (the infinite object distance), and the second state refers to a state of the imaging optical lens assembly with an imaged object at a finite distance (the finite object distance). When an imaged object at the infinite object distance moves to the finite object distance, the imaging optical lens assembly performs a focus process to change the first state to the second state thereof. Conversely, when an imaged object at the finite object distance moves to the infinite object distance, the imaging optical lens assembly also performs the focus process to change the second state to the first state thereof. Moreover, during the focus process of the imaging optical lens assembly, the first lens group G1 has no relative movement with respect to a reflective surface of the reflective element LF, the second lens group G2 moves along a direction parallel to an optical axis with respect to the first lens group G1, and the image surface IMG moves along a direction parallel to the optical axis. Please be noted that there is no relative movement between any two lens elements of each of the first lens group and the second lens group of the two lens groups during the focus process.

The imaging optical lens assembly at the first state has a long-focal-end first state corresponding to a long focal end and a short-focal-end first state corresponding to a short focal end during a zoom process. Moreover, when the imaging optical lens assembly changes its long-focal-end first state to the short-focal-end first state during the zoom process, the second lens group G2 moves along a direction parallel to the optical axis toward the image side with respect to the first lens group G1. Conversely, when the imaging optical lens assembly changes its short-focal-end first state to the long-focal-end first state during the zoom process, the second lens group G2 moves along a direction parallel to the optical axis towards the object side with respect to the first lens group G1. As shown in FIG. 7, the upper part of FIG. 7 shows the imaging optical lens assembly at the short-focal-end first state, and the lower part of FIG. 7 shows the imaging optical lens assembly at the long-focal-end first state. Similarly, the imaging optical lens assembly at the second state has a long-focal-end second state corresponding to the long focal end and a short-focal-end second state corresponding to the short focal end during the zoom process. Moreover, during the zoom process of the imaging optical lens assembly, the first lens group G1 has no relative movement with respect to the reflective surface of the reflective element LF, the second lens group G2 moves along a direction parallel to the optical axis with respect to the first lens group G1, and the image surface IMG moves along a direction parallel to the optical axis. Please be noted that there is no relative movement between any two lens elements of each of the first lens group and the second lens group of the two lens groups during the zoom process. Please be noted that only optical effective areas of lens elements of the imaging optical lens assembly at the long-focal-end first state in the lower part of FIG. 7 are illustrated, and the non-optical effective areas, such as peripheral areas of the stop S3 and the fourth lens element E4 through the sixth lens element E6, are omitted.

The first lens element E1 with positive refractive power has an object-side surface being convex in a paraxial region thereof and an image-side surface being concave in a paraxial region thereof. The first lens element E1 is made of glass material and has the object-side surface and the image-side surface being both aspheric. The object-side surface of the first lens element E1 has one inflection point in an off-axis region thereof. The image-side surface of the first lens element E1 has one inflection point in an off-axis region thereof. The image-side surface of the first lens element E1 has one convex critical point in the off-axis region thereof.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point in an off-axis region thereof. The image-side surface of the second lens element E2 has one inflection point in an off-axis region thereof. The object-side surface of the second lens element E2 has one concave critical point in the off-axis region thereof.

The third lens element E3 with positive refractive power has an object-side surface being convex in a paraxial region thereof and an image-side surface being convex in a paraxial region thereof. The third lens element E3 is made of glass material and has the object-side surface and the image-side surface being both aspheric. The image-side surface of the third lens element E3 has one inflection point in an off-axis region thereof. The image-side surface of the third lens element E3 has one concave critical point in the off-axis region thereof.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has two inflection points in an off-axis region thereof. The image-side surface of the fourth lens element E4 has four inflection points in an off-axis region thereof. The image-side surface of the fourth lens element E4 has one convex critical point in the off-axis region thereof.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has four inflection points in an off-axis region thereof. The image-side surface of the fifth lens element E5 has two inflection points in an off-axis region thereof. The object-side surface of the fifth lens element E5 has two convex critical points and two concave critical points in the off-axis region thereof. The image-side surface of the fifth lens element E5 has one convex critical point in the off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has two inflection points in an off-axis region thereof. The image-side surface of the sixth lens element E6 has two inflection points in an off-axis region thereof. The object-side surface of the sixth lens element E6 has one concave critical point in the off-axis region thereof. The image-side surface of the sixth lens element E6 has one convex critical point and one concave critical point in the off-axis region thereof.

The reflective element LF is made of glass material. The reflective element LF is disposed between an imaged object and the first lens group G1 (it can be also considered that the reflective element LF is disposed at an object side of the first lens element E1). The reflective element LF will not affect the focal length of the imaging optical lens assembly. The reflective element LF is a prism which provides an optical path folding function. For simplicity, the optical path folding effect generated by the reflective element LF in FIG. 7 is omitted. The reflective element LF has an object-side surface and an image-side surface both being planar, but the present disclosure is not limited thereto. The reflective element LF can have various forms for providing different deflecting effect to the optical path. For example, the reflective element LF of the 3rd embodiment can be the reflective element LF as shown in FIG. 21 to FIG. 23, which deflects the optical path once, wherein the reflective surface RF1 of the reflective element LF deflects the first axis OA1 into the second optical axis OA2. The detail can be referred to the description related to FIG. 21 to FIG. 23, which will not be repeated again.

The filter E7 is made of glass material and located between the sixth lens element E6 and the image surface IMG, and will not affect the focal length of the imaging optical lens assembly. The image sensor IS is disposed on or near the image surface IMG.

The detailed optical data of the 3rd embodiment are shown in Table 3A and Table 3B, and the aspheric surface data are shown in Table 3C below.

TABLE 3A

| 3rd Embodiment | | | | | | | |
|---|---|---|---|---|---|---|---|
| Surface # | | Curvature Radius | Thickness | Material | Index | Abbe # | Focal Length |
| 0 | Object | Plano | D0 | | | | |
| 1 | Reflective element | Plano | 12.000 | Glass | 1.785 | 25.7 | — |
| 2 | | Plano | 2.062 | | | | |
| 3 | Stop | Plano | −0.389 | | | | |
| 4 | Lens 1 | 11.2538 (ASP) | 2.278 | Glass | 1.671 | 47.3 | 70.53 |
| 5 | | 13.5647 (ASP) | 1.880 | | | | |
| 6 | Lens 2 | 11.2225 (ASP) | 1.081 | Plastic | 1.587 | 28.3 | −14.50 |
| 7 | | 4.6683 (ASP) | 0.940 | | | | |
| 8 | Ape. Stop | Plano | −0.690 | | | | |
| 9 | Lens 3 | 8.1495 (ASP) | 1.484 | Glass | 1.548 | 45.8 | 9.89 |
| 10 | | −15.1285 (ASP) | −0.173 | | | | |
| 11 | Stop | Plano | D1 | | | | |
| 12 | Stop | Plano | −1.150 | | | | |
| 13 | Lens 4 | 7.8847 (ASP) | 1.161 | Plastic | 1.544 | 56.0 | −228.58 |
| 14 | | 7.0299 (ASP) | 0.450 | | | | |

TABLE 3A-continued

| 3rd Embodiment | | | | | | | |
|---|---|---|---|---|---|---|---|
| Surface # | | Curvature Radius | Thickness | Material | Index | Abbe # | Focal Length |
| 15 | Lens 5 | 12.8786 (ASP) | 3.452 | Plastic | 1.544 | 56.0 | 322.22 |
| 16 | | 12.5870 (ASP) | 1.131 | | | | |
| 17 | Lens 6 | 4.2920 (ASP) | 0.500 | Plastic | 1.566 | 37.4 | −36.79 |
| 18 | | 3.4088 (ASP) | D2 | | | | |
| 19 | Filter | Plano | 0.110 | Glass | 1.517 | 64.2 | — |
| 20 | | Plano | 0.053 | | | | |
| 21 | Image | Plano | D3 | | | | |

Note:
Reference wavelength is 587.6 nm (d-line).
An effective radius of the stop S1 (Surface 3) is 3.940 mm.
An effective radius of the stop S2 (Surface 11) is 3.401 mm.
An effective radius of the stop S3 (Surface 12) is 4.889 mm.

TABLE 3B

| Optical data for imaging optical lens assembly at the short-focal-end first state, the long-focal-end first state, the short-focal-end second state and the long-focal-end second state | | | |
|---|---|---|---|
| | short-focal-end first state | | long-focal-end first state |
| fSf [mm] | 20.24 | fLf [mm] | 27.84 |
| FnoSf | 2.59 | FnoLf | 3.56 |
| HFOVSf [deg.] | 15.1 | HFOVLf [deg.] | 10.0 |
| Object distance [mm] | infinity | Object distance [mm] | infinity |
| D0 [mm] | infinity | D0 [mm] | infinity |
| D1 [mm] | 13.842 | D1 [mm] | 1.523 |
| D2 [mm] | 0.856 | D2 [mm] | 13.175 |
| D3 [mm] | 0.000 | D3 [mm] | 0.317 |
| | short-focal-end second state | | long-focal-end second state |
| fSn [mm] | 20.13 | fLn [mm] | 26.84 |
| FnoSn | 2.64 | FnoLn | 3.53 |
| HFOVSn [deg.] | 14.8 | HFOVLn [deg.] | 10.1 |
| Object distance [mm] | 1513.673 | Object distance [mm] | 1513.673 |
| D0 [mm] | 1500.000 | D0 [mm] | 1500.000 |
| D1 [mm] | 14.091 | D1 [mm] | 2.746 |
| D2 [mm] | 0.607 | D2 [mm] | 11.952 |
| D3 [mm] | 0.317 | D3 [mm] | 0.317 |

In Table 3B, the optical data is the same as the data of the 1st embodiment. Moreover, the imaging optical lens assembly of this embodiment can further have other focal lengths corresponding to the intermediate range of the first state and the second state in other movement focusing conditions besides the first state and the second state for different object distances.

It can be known from Table 3B, the second lens group G2 moves along a direction parallel to the optical axis with respect to the first lens group G1 during the focus process and the zoom process.

TABLE 3C

| Aspheric Coefficients | | | | |
|---|---|---|---|---|
| Surface # | 4 | 5 | 6 | 7 |
| k= | −6.5324100000E+00 | −7.8366200000E+01 | −2.2507400000E+00 | −9.0162500000E−01 |
| A4= | 1.5600486353E−04 | 2.6300181310E−03 | −2.4193784425E−03 | 5.2055640508E−03 |
| A6= | −1.7851669146E−04 | −1.0784065071E−03 | −1.9809652822E−03 | −7.8600283016E−03 |
| A8= | 4.1339641535E−05 | 2.4229184768E−04 | 4.0034196522E−04 | 2.4408377215E−03 |
| A10= | −6.6375586512E−06 | −3.8892434010E−05 | 2.2777037024E−04 | −1.8415694744E−04 |
| A12= | 6.8740052178E−07 | 4.2563813782E−06 | −1.7757118879E−04 | −1.1766722238E−04 |
| A14= | −4.6029645057E−08 | −3.0808403514E−07 | 6.2497239773E−05 | 5.1382273506E−05 |

TABLE 3C-continued

| Aspheric Coefficients | | | | |
|---|---|---|---|---|
| A16= | 1.9272823940E−09 | 1.4077733512E−08 | −1.4196246326E−05 | −1.1045853022E−05 |
| A18= | −4.5962882398E−11 | −3.6764512721E−10 | 2.2543208629E−06 | 1.4712501965E−06 |
| A20= | 4.7711498242E−13 | 4.1824067994E−12 | −2.5588247199E−07 | −1.1848232606E−07 |
| A22= | — | — | 2.0698436406E−08 | 4.2459211510E−09 |
| A24= | — | — | −1.1657001483E−09 | 1.5037888147E−10 |
| A26= | — | — | 4.3434843863E−11 | −2.3766753004E−11 |
| A28= | — | — | −9.6239212370E−13 | 1.0169795247E−12 |
| A30= | — | — | 9.5996689842E−15 | −1.5982316096E−14 |
| Surface # | 9 | 10 | 13 | 14 |
| k= | 2.0031500000E+00 | 7.3804500000E+00 | −2.6433700000E+01 | −3.8560500000E+01 |
| A4= | 7.3125643000E−03 | 9.7175050626E−04 | 1.0681822027E−03 | −1.2895455007E−02 |
| A6= | −4.6838484299E−03 | −1.4122673019E−04 | 2.1266497120E−04 | 3.6351605733E−03 |
| A8= | 5.6800484306E−04 | 1.0974635777E−04 | 1.4826285920E−06 | −3.4332022272E−04 |
| A10= | 4.6892117520E−04 | −7.5538809937E−05 | −1.6690141561E−05 | −5.4361177479E−05 |
| A12= | −2.9455506430E−04 | 3.8457344457E−05 | 6.2484420472E−06 | 3.3570193187E−05 |
| A14= | 9.2836081984E−05 | −1.2909993104E−05 | −1.2877350066E−06 | −7.6857466647E−06 |
| A16= | −1.9483812240E−05 | 2.9176108554E−06 | 1.6983531244E−07 | 1.0590954290E−06 |
| A18= | 2.8751846687E−06 | −4.5611035601E−07 | −1.5373573600E−08 | −9.7371725234E−08 |
| A20= | −2.9824292838E−07 | 4.9735558940E−08 | 9.8831260308E−10 | 6.2121459748E−09 |
| A22= | 2.1204071804E−08 | −3.7240822562E−09 | −4.5402205843E−11 | −2.7773569919E−10 |
| A24= | −9.8091967971E−10 | 1.8266638708E−10 | 1.4613613327E−12 | 8.5786278788E−12 |
| A26= | 2.6550682111E−11 | −5.2828769815E−12 | −3.1307671225E−14 | −1.7499563750E−13 |
| A28= | −3.1875417318E−13 | 6.8218167751E−14 | 4.0042600365E−16 | 2.1263860252E−15 |
| A30= | — | — | −2.3091758717E−18 | −1.1671711044E−17 |
| Surface # | 15 | 16 | 17 | 18 |
| k= | −3.0848900000E−01 | −5.8374800000E−01 | −1.0792800000E+01 | −1.1216100000E+01 |
| A4= | −2.2472159943E−02 | −1.5630879071E−02 | −2.8942088050E−02 | −6.9512982941E−03 |
| A6= | 6.5280391662E−03 | 6.2626605935E−03 | 9.4175981590E−03 | 4.5521674388E−04 |
| A8= | −1.1720692088E−03 | −1.9348556138E−03 | −2.9011647843E−03 | 4.7470316149E−04 |
| A10= | 1.6009166935E−04 | 4.9735189817E−04 | 8.4556332481E−04 | −2.1499000479E−04 |
| A12= | −1.3660040300E−05 | −1.0296724602E−04 | −2.0606807198E−04 | 5.0716018981E−05 |
| A14= | 2.2459135155E−07 | 1.6491522848E−05 | 3.7665381151E−05 | −8.1915143287E−06 |
| A16= | 1.0127984960E−07 | −2.0109937392E−06 | −4.9907482333E−06 | 9.6155812696E−07 |
| A18= | −1.4081094531E−08 | 1.8458872251E−07 | 4.7530846445E−07 | −8.2274815027E−08 |
| A20= | 1.0079885771E−09 | −1.2564812233E−08 | −3.2364846237E−08 | 5.0568713171E−09 |
| A22= | −4.5992846909E−11 | 6.2050686170E−10 | 1.5584458991E−09 | −2.1842979300E−10 |
| A24= | 1.4012528775E−12 | −2.1488980814E−11 | −5.1796371544E−11 | 6.4209762614E−12 |
| A26= | −2.8121979349E−14 | 4.9280554164E−13 | 1.1306822910E−12 | −1.2162655246E−13 |
| A28= | 3.4191338373E−16 | −6.7013483126E−15 | −1.4597440311E−14 | 1.3325312707E−15 |
| A30= | −1.9283852981E−18 | 4.0818657155E−17 | 8.4517954691E−17 | −6.3882138876E−18 |

Moreover, these parameters shown in Table 3D can be calculated from Table 3A to Table 3C as the following values and satisfy the following conditions:

TABLE 3D

| Schematic Parameters | | | |
|---|---|---|---|
| fSf [mm] | 20.24 | TLLn [mm] | 27.522 |
| FnoSf | 2.59 | TDLn [mm] | 15.090 |
| HFOVSf [deg.] | 15.1 | HFOVSf/HFOVLf | 1.51 |
| TLSf [mm] | 27.205 | 10 × \|TLSf − TLLf\|/TLSf | 0.12 |
| TDSf [mm] | 26.186 | (TDSf − TDLf)/TLSf | 0.45 |
| fLf [mm] | 27.84 | TLSf/ImgH | 5.44 |
| FnoLf | 3.56 | TLLf/ImgH | 5.50 |
| HFOVLf [deg.] | 10.0 | fSf/fG1 | 0.86 |
| TLLf [mm] | 27.522 | TG1/TG2 | 1.04 |
| TDLf [mm] | 13.867 | 10 × \|FnoSn − FnoSf\| | 0.50 |
| fSn [mm] | 20.13 | 10 × \|FnoLn − FnoLf\| | 0.30 |
| FnoSn | 2.64 | 10 × (TLSn/fSn − TLSf/fSf) | 0.23 |
| HFOVSn [deg.] | 14.8 | 10 × (TLLn/fLn − TLLf/fLf) | 0.37 |
| TLSn [mm] | 27.522 | (\|fSf/f4\| + \|fSf/f5\|)/\|fSf/f2\| | 0.11 |
| TDSn [mm] | 26.435 | CT1/CT6 | 4.56 |
| fLn [mm] | 26.84 | (CT1 + CT2 + CT3)/(T12 + T23) | 2.27 |
| FnoLn | 3.53 | DImgS [mm] | 0.317 |
| HFOVLn [deg.] | 10.1 | DImgS/CTmin | 0.63 |

In the 3rd embodiment, the equation of the aspheric surface profiles of the aforementioned lens elements is the same as the equation of the 1st embodiment.

4th Embodiment

Figure 10:
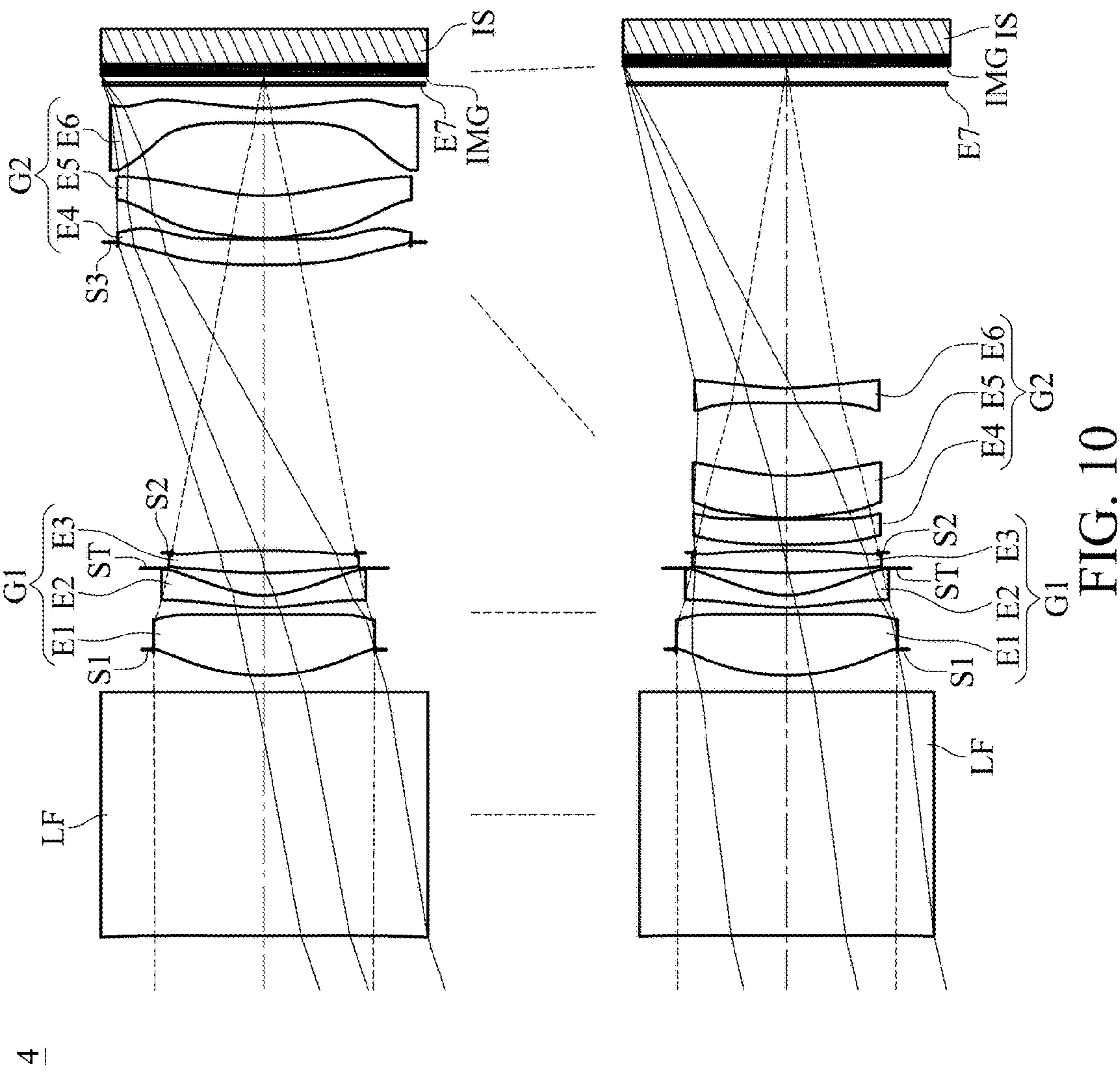
FIG. 10 is a schematic view of an image capturing unit respectively at a short-focal-end first state and at a long-focal-end first state according to the 4th embodiment of the present disclosure.
Figure 11:
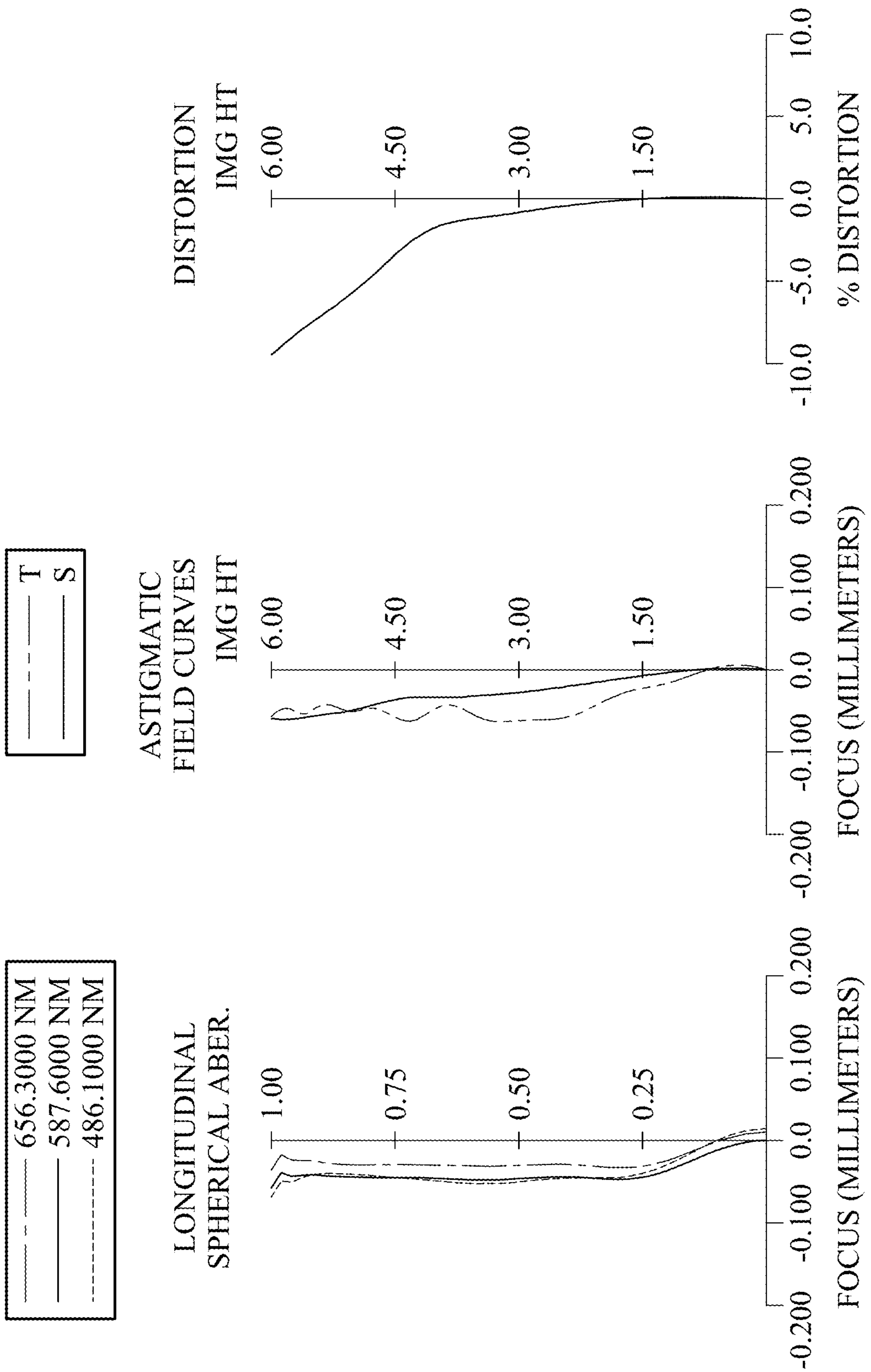
FIG. 11 shows spherical aberration curves, astigmatic field curves and a distortion curve of the image capturing unit at the short-focal-end first state according to the 4th embodiment.
Figure 12:
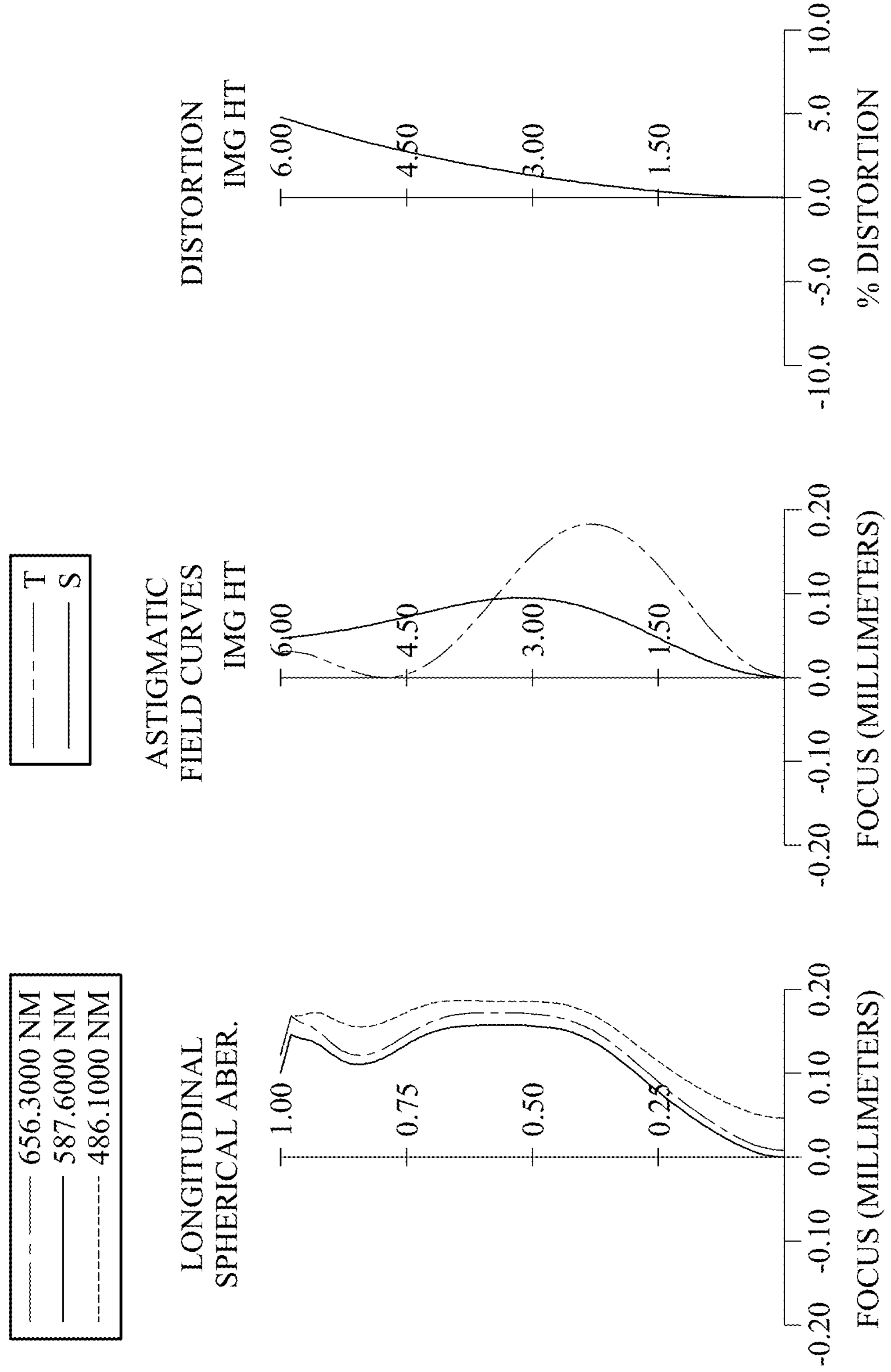
FIG. 12 shows spherical aberration curves, astigmatic field curves and a distortion curve of the image capturing unit at the long-focal-end first state according to the 4th embodiment.

FIG. 10 is a schematic view of an image capturing unit respectively at a short-focal-end first state and at a long-focal-end first state according to the 4th embodiment of the present disclosure. FIG. 11 shows, in order from left to right, spherical aberration curves, astigmatic field curves and a distortion curve of the image capturing unit at the short-focal-end first state according to the 4th embodiment. FIG. 12 shows, in order from left to right, spherical aberration curves, astigmatic field curves and a distortion curve of the image capturing unit at the long-focal-end first state according to the 4th embodiment. The upper part of FIG. 10 shows the imaging optical lens assembly at the short-focal-end first state, and the lower part of FIG. 10 shows the imaging optical lens assembly at the long-focal-end first state. In FIG. 10, the image capturing unit 4 includes the imaging optical lens assembly (its reference numeral is omitted) of the present disclosure and an image sensor IS. The imaging optical lens assembly includes, in order from an object side to an image side along an optical path, a reflective element LF, a stop S1, a first lens element E1, a second lens element E2, an aperture stop ST, a third lens element E3, a stop S2, a stop S3, a fourth lens element E4, a fifth lens element E5, a sixth lens element E6, a filter E7 and an image surface IMG. Further, the imaging optical lens assembly includes, in order from the object side to the image side along the optical path, a first lens group G1 and a second lens group G2. The first lens group G1 includes the first lens element E1, the second lens element E2 and the third lens element E3, and the second lens group G2 includes the fourth lens element E4, the fifth lens element E5 and the sixth lens element E6. Moreover, the first lens group G1 has positive refractive power. The imaging optical lens assembly includes six lens elements (E1, E2, E3, E4, E5 and E6) with no additional lens element disposed between each of the adjacent six lens elements.

The imaging optical lens assembly has a first state corresponding to an infinite object distance and a second state corresponding to a finite object distance. The first state refers to a state of the imaging optical lens assembly with an imaged object at an infinite distance (the infinite object distance), and the second state refers to a state of the imaging optical lens assembly with an imaged object at a finite distance (the finite object distance). When an imaged object at the infinite object distance moves to the finite object distance, the imaging optical lens assembly performs a focus process to change the first state to the second state thereof. Conversely, when an imaged object at the finite object distance moves to the infinite object distance, the imaging optical lens assembly also performs the focus process to change the second state to the first state thereof. Moreover, during the focus process of the imaging optical lens assembly, the first lens group G1 has no relative movement with respect to a reflective surface of the reflective element LF, the second lens group G2 moves along a direction parallel to an optical axis with respect to the first lens group G1, and the image surface IMG moves along a direction parallel to the optical axis. Please be noted that there is no relative movement between any two lens elements of each of the first lens group and the second lens group of the two lens groups during the focus process.

The imaging optical lens assembly at the first state has a long-focal-end first state corresponding to a long focal end and a short-focal-end first state corresponding to a short focal end during a zoom process. Moreover, when the imaging optical lens assembly changes its long-focal-end first state to the short-focal-end first state during the zoom process, the second lens group G2 moves along a direction parallel to the optical axis toward the image side with respect to the first lens group G1. Conversely, when the imaging optical lens assembly changes its short-focal-end first state to the long-focal-end first state during the zoom process, the second lens group G2 moves along a direction parallel to the optical axis towards the object side with respect to the first lens group G1. As shown in FIG. 10, the upper part of FIG. 10 shows the imaging optical lens assembly at the short-focal-end first state, and the lower part of FIG. 10 shows the imaging optical lens assembly at the long-focal-end first state. Similarly, the imaging optical lens assembly at the second state has a long-focal-end second state corresponding to the long focal end and a short-focal-end second state corresponding to the short focal end during the zoom process. Moreover, during the zoom process of the imaging optical lens assembly, the first lens group G1 has no relative movement with respect to the reflective surface of the reflective element LF, the second lens group G2 moves along a direction parallel to the optical axis with respect to the first lens group G1, and the image surface IMG moves along a direction parallel to the optical axis. Please be noted that there is no relative movement between any two lens elements of each of the first lens group and the second lens group of the two lens groups during the zoom process. Please be noted that only optical effective areas of lens elements of the imaging optical lens assembly at the long-focal-end first state in the lower part of FIG. 10 are illustrated, and the non-optical effective areas, such as peripheral areas of the stop S3 and the fourth lens element E4 through the sixth lens element E6, are omitted.

The first lens element E1 with positive refractive power has an object-side surface being convex in a paraxial region thereof and an image-side surface being convex in a paraxial region thereof. The first lens element E1 is made of glass material and has the object-side surface and the image-side surface being both aspheric. The object-side surface of the first lens element E1 has one inflection point in an off-axis region thereof. The image-side surface of the first lens element E1 has two inflection points in an off-axis region thereof. The image-side surface of the first lens element E1 has one convex critical point and one concave critical point in the off-axis region thereof.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has two inflection points in an off-axis region thereof. The image-side surface of the second lens element E2 has two inflection points in an off-axis region thereof.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric. The object-side surface of the third lens element E3 has two inflection points in an off-axis region thereof. The image-side surface of the third lens element E3 has one inflection point in an off-axis region thereof. The image-side surface of the third lens element E3 has one concave critical point in the off-axis region thereof.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has two inflection points in an off-axis region thereof. The image-side surface of the fourth lens element E4 has four inflection points in an off-axis region thereof. The image-side surface of the fourth lens element E4 has one convex critical point in the off-axis region thereof.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has three inflection points in an off-axis region thereof. The image-side surface of the fifth lens element E5 has four inflection points in an off-axis region thereof. The image-side surface of the fifth lens element E5 has one convex critical point and one concave critical point in the off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has two inflection points in an off-axis region thereof. The image-side surface of the sixth lens element E6 has two inflection points in an off-axis region thereof. The object-side surface of the sixth lens element E6 has one concave critical point in the off-axis region thereof. The image-side surface of the sixth lens element E6 has one convex critical point and one concave critical point in the off-axis region thereof.

The reflective element LF is made of glass material. The reflective element LF is disposed between an imaged object and the first lens group G1 (it can be also considered that the reflective element LF is disposed at an object side of the first lens element E1). The reflective element LF is a prism which provides an optical path folding function. For simplicity, the optical path folding effect generated by the reflective element LF in FIG. 10 is omitted. The reflective element LF has an object-side surface being aspheric and convex in a paraxial region thereof and an image-side surface being planar, but the present disclosure is not limited thereto. The reflective element LF can have various forms for providing different deflecting effect to the optical path. For example, the reflective element LF of the 4th embodiment can be the reflective element LF as shown in FIG. 21 to FIG. 23, which deflects the optical path once, wherein the reflective surface R of the reflective element LF deflects the first axis OA1 into the second optical axis OA2. The detail can be referred to the description related to FIG. 21 to FIG. 23, which will not be repeated again.

The filter E is made of glass material and located between the sixth lens element E6 and the image surface IMG, and will not affect the focal length of the imaging optical lens assembly. The image sensor IS is disposed on or near the image surface PMG.

The detailed optical data of the 4th embodiment are shown in Table 4A and Table 4B, and the aspheric surface data are shown in Table 4C below.

TABLE 4A

| 4th Embodiment | | | | | | | |
|---|---|---|---|---|---|---|---|
| Surface # | | Curvature Radius | Thickness | Material | Index | Abbe # | Focal Length |
| 0 | Object | Plano | D0 | | | | |
| 1 | Reflective element | 400.7812 (ASP) | 9.000 | Glass | 1.785 | 25.7 | 510.74 |
| 2 | | Plano | 1.562 | | | | |
| 3 | Stop | Plano | −0.959 | | | | |
| 4 | Lens 1 | 7.9462 (ASP) | 2.254 | Glass | 1.497 | 81.6 | 13.86 |
| 5 | | −46.9146 (ASP) | 0.244 | | | | |
| 6 | Lens 2 | 8.0035 (ASP) | 0.450 | Plastic | 1.566 | 37.4 | −11.71 |
| 7 | | 3.5528 (ASP) | 0.991 | | | | |
| 8 | Ape. Stop | Plano | −0.166 | | | | |
| 9 | Lens 3 | 17.6814 (ASP) | 0.849 | Plastic | 1.544 | 56.0 | 18.82 |
| 10 | | −23.9233 (ASP) | −0.102 | | | | |
| 11 | Stop | Plano | D1 | | | | |
| 12 | Stop | Plano | −0.840 | | | | |
| 13 | Lens 4 | 34.6196 (ASP) | 0.943 | Plastic | 1.544 | 56.0 | 72.09 |
| 14 | | 292.4474 (ASP) | 0.040 | | | | |
| 15 | Lens 5 | 7.5991 (ASP) | 1.561 | Plastic | 1.544 | 56.0 | −208.85 |
| 16 | | 6.6072 (ASP) | 2.674 | | | | |
| 17 | Lens 6 | 22.9363 (ASP) | 0.550 | Plastic | 1.566 | 37.4 | −26.13 |
| 18 | | 8.9149 (ASP) | D2 | | | | |
| 19 | Filter | Plano | 0.110 | Glass | 1.517 | 64.2 | — |
| 20 | | Plano | 0.254 | | | | |
| 21 | Image | Plano | D3 | | | | |

Note:
Reference wavelength is 587.6 nm (d-line).
An effective radius of the stop S1 (Surface 3) is 4.080 mm.
An effective radius of the stop S2 (Surface 11) is 3.384 mm.
An effective radius of the stop S3 (Surface 12) is 5.398 mm.

TABLE 4B

| Optical data for imaging optical lens assembly at the short-focal-end first state, the long-focal-end first state, the short-focal-end second state and the long-focal-end second state | | | |
|---|---|---|---|
| | short-focal-end first state | | long-focal-end first state |
| fSf [mm] | 19.32 | fLf [mm] | 24.53 |
| FnoSf | 2.40 | FnoLf | 3.05 |
| HFOVSf [deg.] | 19.0 | HFOVLf [deg.] | 13.0 |
| Object distance [mm] | infinity | Object distance [mm] | infinity |
| D0 [mm] | infinity | D0 [mm] | infinity |
| D1 [mm] | 11.470 | D1 [mm] | 1.142 |
| D2 [mm] | 0.839 | D2 [mm] | 11.167 |

TABLE 4B-continued

| Optical data for imaging optical lens assembly at the short-focal-end first state, the long-focal-end first state, the short-focal-end second state and the long-focal-end second state | | | |
|---|---|---|---|
| D3 [mm] | 0.000 | D3 [mm] | 0.336 |
| | short-focal-end second state | | long-focal-end second state |
| fSn [mm] | 19.22 | fLn [mm] | 23.89 |
| FnoSn | 2.44 | FnoLn | 3.04 |
| HFOVSn [deg.] | 18.7 | HFOVLn [deg.] | 13.1 |
| Object distance [mm] | 1509.603 | Object distance [mm] | 1509.603 |
| D0 [mm] | 1500.000 | D0 [mm] | 1500.000 |
| D1 [mm] | 11.709 | D1 [mm] | 2.165 |
| D2 [mm] | 0.600 | D2 [mm] | 10.144 |
| D3 [mm] | 0.280 | D3 [mm] | 0.346 |

In Table 4B, the optical data is the same as the data of the 1st embodiment. Moreover, the imaging optical lens assembly of this embodiment can further have other focal lengths corresponding to the intermediate range of the first state and the second state in other movement focusing conditions besides the first state and the second state for different object distances.

It can be known from Table 41B, the second lens group G2 moves along a direction parallel to the optical axis with respect to the first lens group G1 during the focus process and the zoom process.

TABLE 4C

| Aspheric Coefficients | | | | |
|---|---|---|---|---|
| Surface # | 1 | 4 | 5 | 6 |
| k= | −9.0096900000E+01 | −9.7631700000E−01 | 9.8998500000E+01 | −3.3293900000E+00 |
| A4= | −7.7149801424E−05 | 5.3207832152E−04 | 5.0622263741E−03 | −5.8241927190E−03 |
| A6= | −4.8533911215E−07 | −5.1921024834E−05 | −1.2753400662E−03 | 3.2355029720E−04 |
| A8= | 8.0526258536E−08 | 1.2466037559E−05 | 2.6767879311E−04 | −5.8714428158E−05 |
| A10= | −3.5269984842E−09 | −2.3505449598E−06 | −4.2408178473E−05 | 4.1289581731E−05 |
| A12= | 7.2764429216E−11 | 2.4692285211E−07 | 4.3855155673E−06 | −1.1807857093E−05 |
| A14= | −6.2074598888E−13 | −1.6896132465E−08 | −2.9154091574E−07 | 1.7930997758E−06 |
| A16= | — | 7.1789093814E−10 | 1.2088957722E−08 | −1.6653743696E−07 |
| A18= | — | −1.8058321726E−11 | −2.8509369725E−10 | 1.0310588400E−08 |
| A20= | — | 2.1405537522E−13 | 2.9249608820E−12 | −4.6911169788E−10 |
| A22= | — | — | — | 1.7088115838E−11 |
| A24= | — | — | — | −4.5702762952E−13 |
| A26= | — | — | — | 6.0994531170E−15 |
| Surface # | 7 | 9 | 10 | 13 |
| k= | −1.8670000000E+00 | 1.7797400000E+01 | 1.2019500000E+00 | 3.6161900000E+01 |
| A4= | −8.9884089723E−03 | 2.0068824455E−05 | 4.6348170235E−04 | 3.1933258167E−03 |
| A6= | 1.5799454197E−03 | 1.1334539474E−04 | 7.9661328558E−05 | −3.3457186987E−04 |
| A8= | −4.8025834112E−04 | −3.7967826264E−04 | −1.3433116900E−04 | −4.3855640500E−05 |
| A10= | 1.5992288173E−04 | 2.4742340082E−04 | 9.3332633878E−05 | 1.5910218417E−05 |
| A12= | −4.2019722245E−05 | −1.0889201793E−04 | −4.4325968637E−05 | −1.0531377711E−06 |
| A14= | 8.7410454974E−06 | 3.2862656686E−05 | 1.4008960639E−05 | −1.1200315071E−07 |
| A16= | −1.4391410836E−06 | −6.7527710030E−06 | −2.9182916160E−06 | 2.4522162539E−08 |
| A18= | 1.7595789633E−07 | 9.4457050515E−07 | 4.0165906171E−07 | −2.0023265210E−09 |
| A20= | −1.4806418570E−08 | −8.9507752200E−08 | −3.6131998927E−08 | 9.4393399318E−11 |
| A22= | 7.9434840557E−10 | 5.6369629622E−09 | 2.0443044836E−09 | −2.7739217802E−12 |
| A24= | −2.4251515484E−11 | −2.2526712726E−10 | −6.6075775182E−11 | 5.0267568413E−14 |
| A26= | 3.1955823517E−13 | 5.1520204347E−12 | 9.3131510173E−13 | −5.1480124917E−16 |
| A28= | — | −5.1116251009E−14 | — | 2.2778776459E−18 |
| Surface # | 14 | 15 | 16 | 17 |
| k= | −9.9000000000E+01 | −3.2122900000E−02 | 1.1294900000E−01 | 1.5293100000E+01 |
| A4= | 6.7098975298E−03 | −2.0158849453E−04 | −6.1985940647E−03 | −1.0918637988E−02 |
| A6= | −3.7075866394E−03 | −3.0754110944E−03 | 1.6631101606E−04 | 2.6368324201E−03 |
| A8= | 8.2197247843E−04 | 7.0556582656E−04 | 2.2747318058E−05 | −1.0592661059E−03 |
| A10= | −8.4335115263E−05 | −3.4198824596E−05 | 5.4331450196E−06 | 3.6184579345E−04 |
| A12= | 3.6663634857E−06 | −9.4128641219E−06 | −2.1078053629E−06 | −8.4106886681E−05 |
| A14= | 1.1227433927E−07 | 2.0643707432E−06 | 2.5151169106E−07 | 1.3196736931E−05 |

TABLE 4C-continued

| Aspheric Coefficients | | | | |
|---|---|---|---|---|
| A16= | −2.8016805084E−08 | −2.1023352287E−07 | −1.3790181600E−08 | −1.4308026907E−06 |
| A18= | 2.1343163418E−09 | 1.3365905796E−08 | 1.7238837134E−10 | 1.0889556519E−07 |
| A20= | −9.9213873218E−11 | −5.6686481418E−10 | 2.2431114649E−11 | −5.8500162013E−09 |
| A22= | 3.0388651685E−12 | 1.6129958930E−11 | −1.4534456266E−12 | 2.2049387085E−10 |
| A24= | −5.9858921841E−14 | −2.9708562833E−13 | 4.0368361074E−14 | −5.7035492454E−12 |
| A26= | 6.8703244567E−16 | 3.2112409737E−15 | −5.5949709774E−16 | 9.6436563050E−14 |
| A28= | −3.4876546150E−18 | −1.5501498228E−17 | 3.1523097481E−18 | −9.6008187089E−16 |
| A30= | — | — | — | 4.2684495078E−18 |

| Surface # | 18 |
|---|---|
| k= | 9.7063600000E−01 |
| A4= | −8.0222887199E−03 |
| A6= | 1.1203489281E−03 |
| A8= | −1.7258980912E−04 |
| A10= | 4.0328723610E−05 |
| A12= | −8.4865154825E−06 |
| A14= | 1.1788607673E−06 |
| A16= | −1.0670364042E−07 |
| A18= | 6.4253170358E−09 |
| A20= | −2.5973607028E−10 |
| A22= | 6.9740852350E−12 |
| A24= | −1.1947990031E−13 |
| A26= | 1.1839559466E−15 |
| A28= | −5.1714461195E−18 |

Moreover, these parameters shown in Table 4D can be calculated from Table 4A to Table 4C as the following values and satisfy the following conditions:

TABLE 4D

| Schematic Parameters | | | |
|---|---|---|---|
| fSf [mm] | 19.32 | TLLn [mm] | 22.467 |
| FnoSf | 2.40 | TDLn [mm] | 11.613 |
| HFOVSf [deg.] | 19.0 | HFOVSf/HFOVLf | 1.46 |
| TLSf [mm] | 22.120 | 10 × \|TLSf − TLLf\|/TLSf | 0.15 |
| TDSf [mm] | 20.918 | (TDSf − TDLf)/TLSf | 0.47 |
| fLf [mm] | 24.53 | TLSf/ImgH | 3.69 |
| FnoLf | 3.05 | TLLf/ImgH | 3.74 |
| HFOVLf [deg.] | 13.0 | fSf/fG1 | 0.86 |
| TLLf [mm] | 22.456 | TG1/TG2 | 0.80 |
| TDLf [mm] | 10.590 | 10 × \|FnoSn − FnoSf\| | 0.40 |
| fSn [mm] | 19.22 | 10 × \|FnoLn − FnoLf\| | 0.10 |
| FnoSn | 2.44 | 10 × (TLSn/fSn − TLSf/fSf) | 0.21 |
| HFOVSn [deg.] | 18.7 | 10 × (TLLn/fLn − TLLf/fLf) | 0.25 |
| TLSn [mm] | 22.400 | (\|fSf/f4\| + \|fSf/f5\|)/\|fSf/f2\| | 0.22 |
| TDSn [mm] | 21.157 | CT1/CT6 | 4.10 |
| fLn [mm] | 23.89 | (CT1 + CT2 + CT3)/(T12 + T23) | 3.32 |
| FnoLn | 3.04 | DImgS [mm] | 0.280 |
| HFOVLn [deg.] | 13.1 | DImgS/CTmin | 0.62 |

In the 4th embodiment, the equation of the aspheric surface profiles of the aforementioned lens elements is the same as the equation of the 1st embodiment.

5th Embodiment

Figure 13:
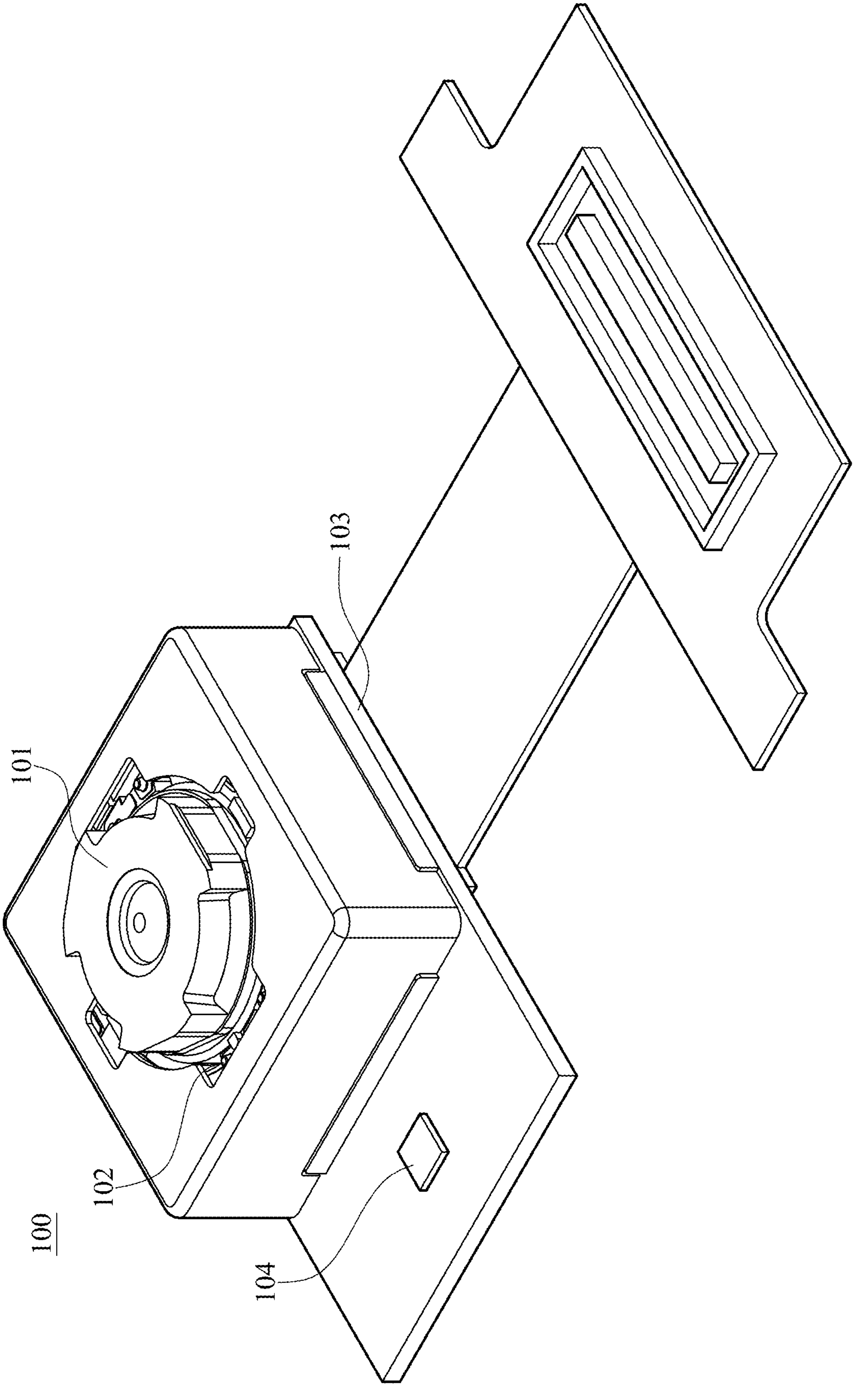
FIG. 13 is a perspective view of an image capturing unit according to the 5th embodiment of the present disclosure.

FIG. 13 is a perspective view of an image capturing unit according to the 5th embodiment of the present disclosure. In this embodiment, an image capturing unit 100 is a camera module including a lens unit 101, a driving device 102, an image sensor 103 and an image stabilizer 104. The lens unit 101 includes the imaging optical lens assembly disclosed in the 1st embodiment, a barrel and a holder member (their reference numerals are omitted) for holding the imaging optical lens assembly. However, the lens unit 101 may alternatively be provided with the imaging optical lens assembly disclosed in other embodiments of the present disclosure, and the present disclosure is not limited thereto. The imaging light converges in the lens unit 101 of the image capturing unit 100 to generate an image with the driving device 102 utilized for image focusing on the image sensor 103, and the generated image is then digitally transmitted to other electronic component for further processing.

The driving device 102 can have auto focusing functionality, and different driving configurations can be obtained through the usages of voice coil motors (VCM), micro electro-mechanical systems (MEMS), piezoelectric systems, or shape memory alloy materials. The driving device 102 can include a guide element that can be a ball type or a post type. The guide element helps to reduce movement resistance of the moving lens group during the zoom process or the focus process. The driving device 102 is favorable for obtaining a better imaging position of the lens unit 101, so that a clear image of the imaged object can be captured by the lens unit 101 with different object distances. The image sensor 103 (for example, CCD or CMOS), which can feature high photosensitivity and low noise, is disposed on the image surface of the imaging optical lens assembly to provide higher image quality. The image sensor 103 can also be moved in three dimensions with respect to a base, such that the focus can be achieved by moving the image sensor 103.

The image stabilizer 104, such as an accelerometer, a gyro sensor and a Hall effect sensor, is configured to work with the driving device 102 to provide optical image stabilization (OIS). The driving device 102 working with the image stabilizer 104 is favorable for compensating for pan and tilt of the lens unit 101 to reduce blurring associated with motion during exposure. In some cases, the compensation can be provided by electronic image stabilization (EIS) with image processing software, thereby improving image quality while in motion or low-light conditions.

6th Embodiment

Figure 14:
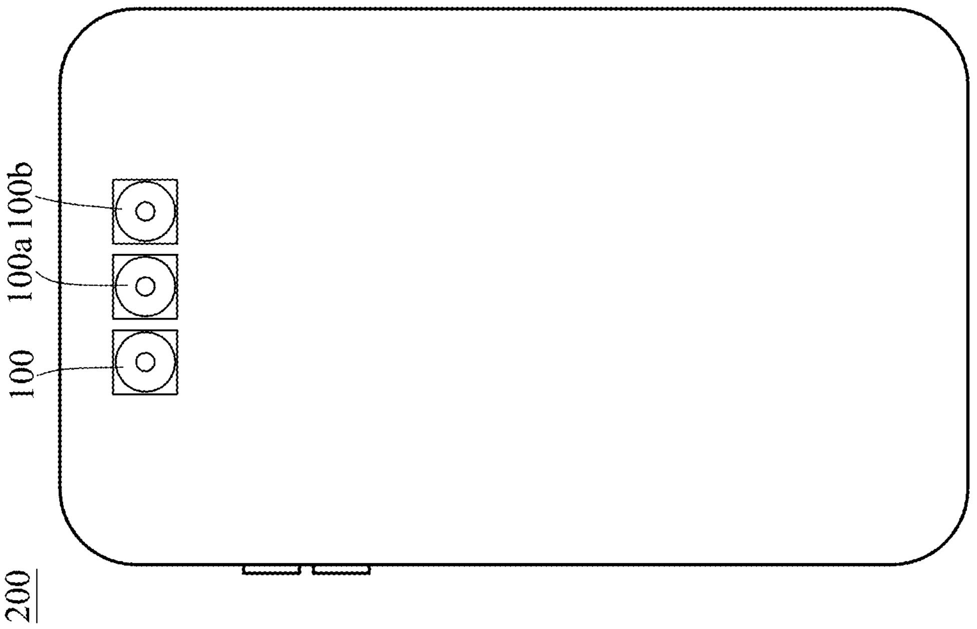
FIG. 14 is one perspective view of an electronic device according to the 6th embodiment of the present disclosure.
Figure 15:
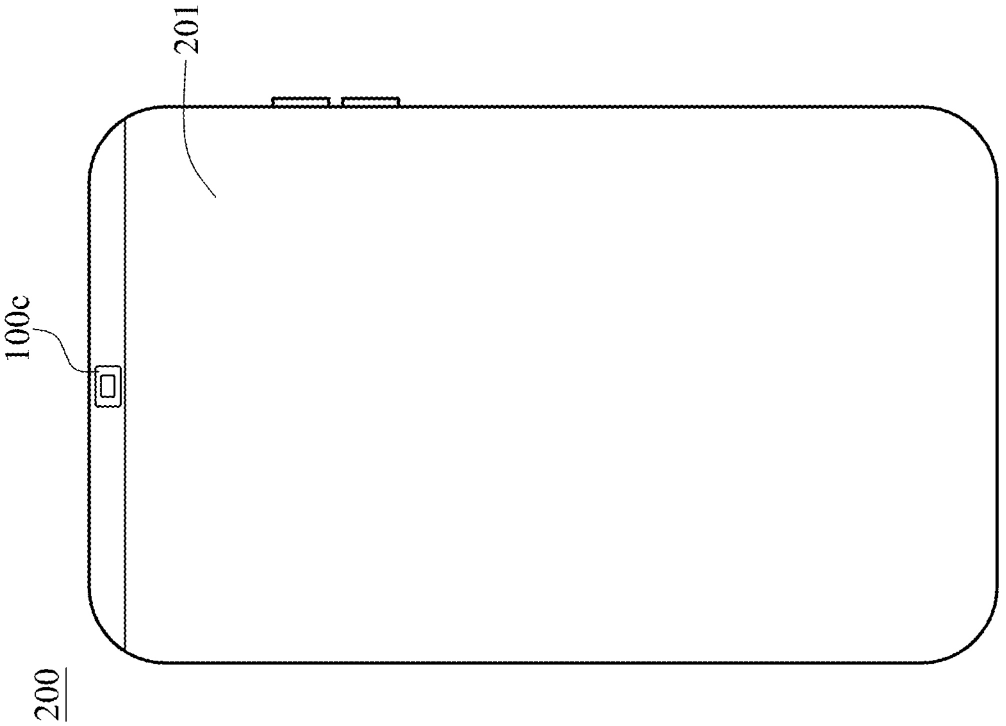
FIG. 15 is another perspective view of the electronic device in FIG. 14.

FIG. 14 is one perspective view of an electronic device according to the 6th embodiment of the present disclosure. FIG. 15 is another perspective view of the electronic device in FIG. 14.

In this embodiment, an electronic device 200 is a smartphone including the image capturing unit 100 disclosed in the 5th embodiment, an image capturing unit 100_a_, an image capturing unit 100_b_, an image capturing unit 100_c_ and a display unit 201. As shown in FIG. 14, the image capturing unit 100, the image capturing unit 100_a_ and the image capturing unit 100_b_ are disposed on the same side of the electronic device 200 and face the same side. As shown in FIG. 15, the image capturing unit 100_c_ and the display unit 201 are disposed on the opposite side of the electronic device 200, such that the image capturing unit 100_c_ can be a front-facing camera of the electronic device 200 for taking selfies, but the present disclosure is not limited thereto. Furthermore, each of the image capturing units 100_a_, 100_b_ and 100_c_ can include the imaging optical lens assembly of the present disclosure and can have a configuration similar to that of the image capturing unit 100. In detail, each of the image capturing units 100_a_, 100_b_ and 100_c_ can include a lens unit, a driving device, an image sensor, an image stabilizer and a reflective element for deflecting the optical path, and each of the lens unit can include an optical lens assembly such as the imaging optical lens assembly of the present disclosure, a barrel and a holder member for holding the imaging optical lens assembly.

The image capturing unit 100 is a telephoto image capturing unit, the image capturing unit 100_a_ is a wide-angle image capturing unit, the image capturing unit 100_b_ is an ultra-wide-angle image capturing unit, and the image capturing unit 100_c_ is a wide-angle image capturing unit. In this embodiment, the image capturing units 100, 100_a_ and 100_b_ have different fields of view, such that the electronic device 200 can have various magnification ratios so as to meet the requirement of optical zoom functionality. Moreover, half of a maximum field of view of the image capturing unit 100 ranges from 5 degrees to 30 degrees, and half of a maximum field of view of the image capturing unit 100_a_ ranges from 30 degrees to 60 degrees. Therefore, it is favorable for having a relatively large zoom ratio of the electronic device 200 to enlarge application ranges thereof. Moreover, as shown in FIG. 15, the image capturing unit 100_c_ can have a non-circular opening, and the lens barrel or the lens elements in the image capturing unit 100_c_ can have one or more trimmed edges at outer diameter positions thereof for corresponding to the non-circular opening. Therefore, it is favorable for further reducing the length of the image capturing unit 100_c_ along single axis, thereby reducing the overall size of the lens, increasing the area ratio of the display unit 201 with respect to the electronic device 200, reducing the thickness of the electronic device 200, and achieving compactness of the overall module. In this embodiment, the electronic device 200 includes multiple image capturing units 100, 100_a_, 100_b_ and 100_c_, but the present disclosure is not limited to the number and arrangement of image capturing units.

7th Embodiment

Figure 16:
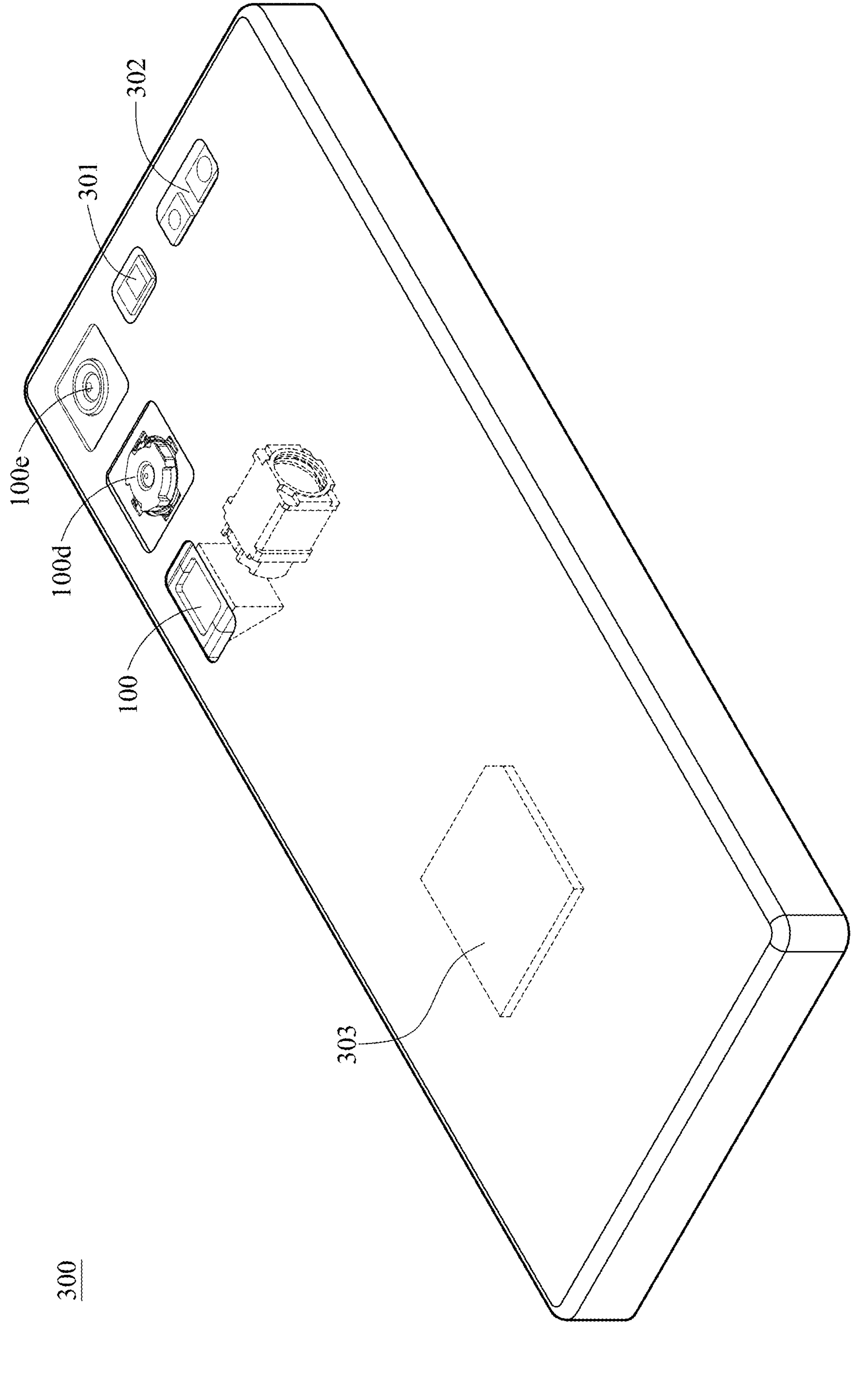
FIG. 16 is one perspective view of an electronic device according to the 7th embodiment of the present disclosure.
Figure 17:
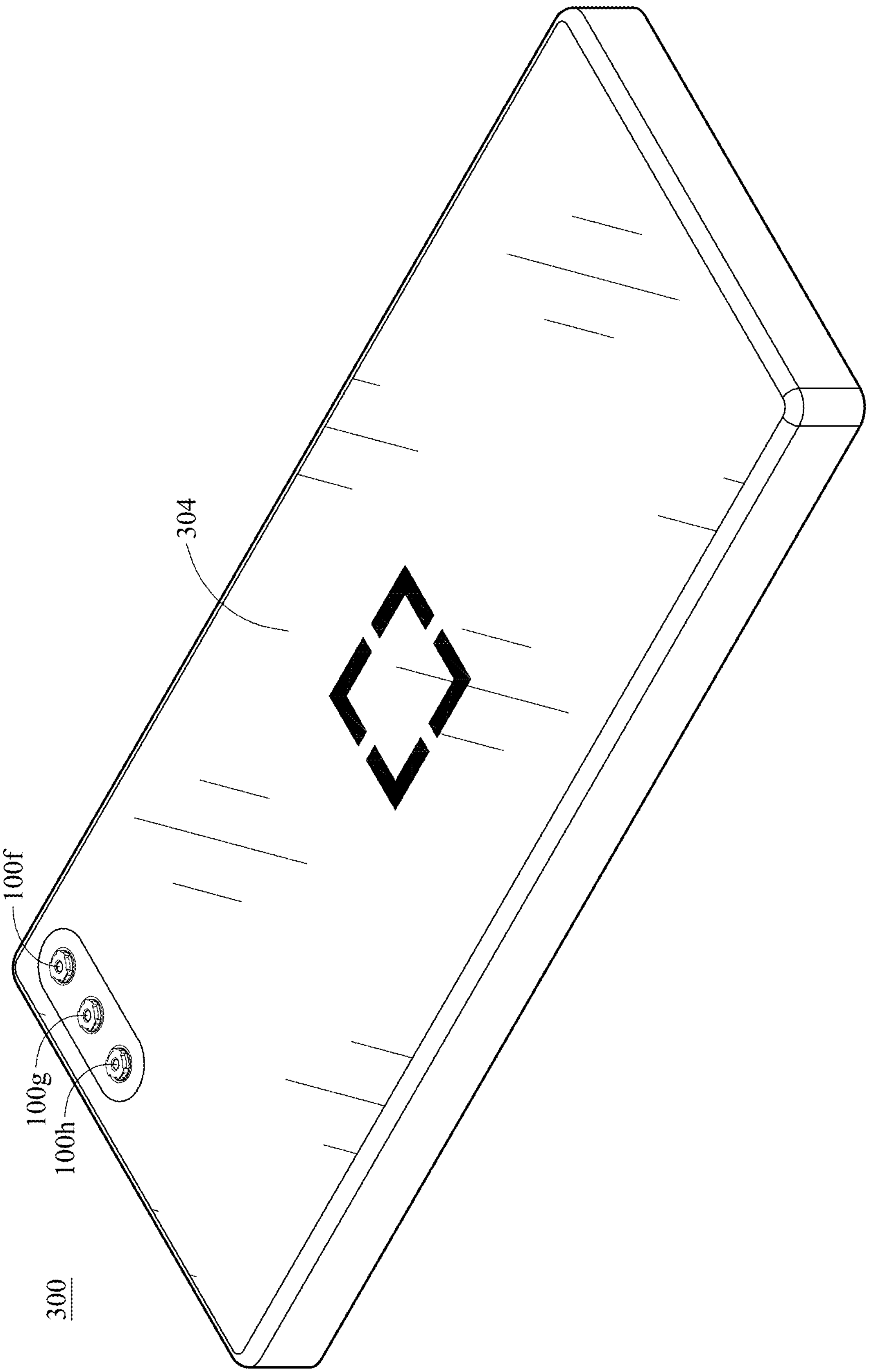
FIG. 17 is another perspective view of the electronic device in FIG. 16.
Figure 18:
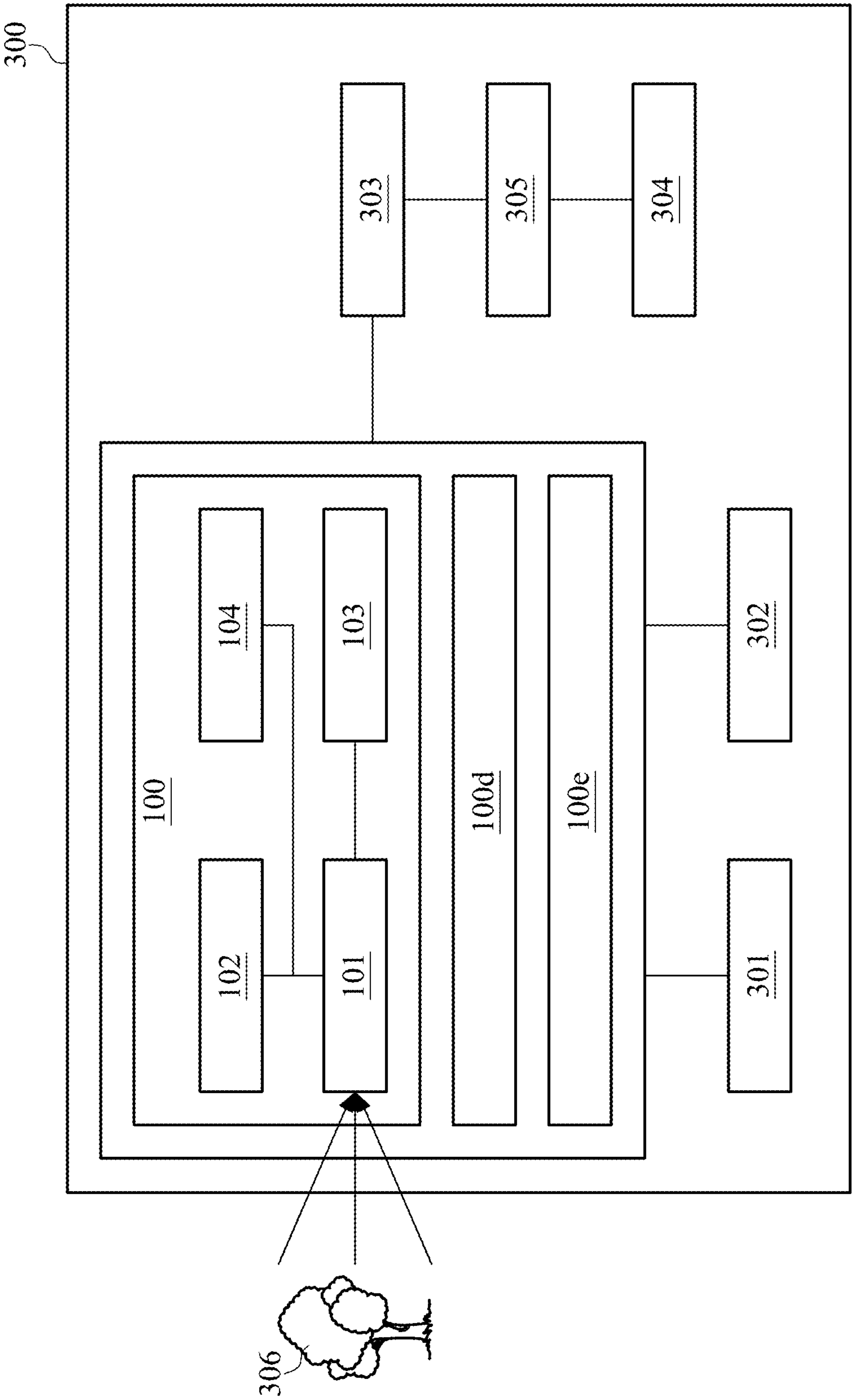
FIG. 18 is a block diagram of the electronic device in FIG. 16.

FIG. 16 is one perspective view of an electronic device according to the 7th embodiment of the present disclosure. FIG. 17 is another perspective view of the electronic device in FIG. 16. FIG. 18 is a block diagram of the electronic device in FIG. 16.

In this embodiment, an electronic device 300 is a smartphone including the image capturing unit 100 disclosed in the 5th embodiment, an image capturing unit 100_d_, an image capturing unit 100_e_, an image capturing unit 100_f_, an image capturing unit 100_g_, an image capturing unit 100_h_, a flash module 301, a focus assist module 302, an image signal processor 303, a display module 304 and an image software processor 305. The image capturing unit 100, the image capturing unit 100_d_ and the image capturing unit 100_e_ are disposed on the same side of the electronic device 300. The focus assist module 302 can be a laser rangefinder or a ToF (time of flight) module, but the present disclosure is not limited thereto. The image capturing unit 100_f_, the image capturing unit 100_g_, the image capturing unit 100_h_ and the display module 304 are disposed on the opposite side of the electronic device 300, and the display module 304 can be a user interface, such that the image capturing units 100_f_, 100_g_, 100_h_ can be front-facing cameras of the electronic device 300 for taking selfies, but the present disclosure is not limited thereto. Furthermore, each of the image capturing units 100_d_, 100_e_, 100_f_, 100_g_ and 100_h_ can include the imaging optical lens assembly of the present disclosure and can have a configuration similar to that of the image capturing unit 100. In detail, each of the image capturing units 100_d_, 100_e_, 100_f_, 100_g_ and 100_h_ can include a lens unit, a driving device, an image sensor, an image stabilizer and a reflective element for deflecting the optical path, and each of the lens unit can include an optical lens assembly such as the imaging optical lens assembly of the present disclosure, a barrel and a holder member for holding the imaging optical lens assembly.

The image capturing unit 100 is a telephoto image capturing unit, the image capturing unit 100_d_ is a wide-angle image capturing unit, the image capturing unit 100_e_ is an ultra-wide-angle image capturing unit, the image capturing unit 100_f_ is a wide-angle image capturing unit, the image capturing unit 100_g_ is an ultra-wide-angle image capturing unit, and the image capturing unit 100_h_ is a ToF image capturing unit. In this embodiment, the image capturing units 100, 100_d_ and 100_e_ have different fields of view, such that the electronic device 300 can have various magnification ratios so as to meet the requirement of optical zoom functionality. Moreover, half of a maximum field of view of the image capturing unit 100 ranges from 5 degrees to 30 degrees, and half of a maximum field of view of the image capturing unit 100_d_ ranges from 30 degrees to 60 degrees. Therefore, it is favorable for having a relatively large zoom ratio of the electronic device 300 to enlarge application ranges thereof. Moreover, the image capturing unit 100 can be a telephoto image capturing unit having an optical path folding element configuration such as a reflective element configuration, such that the total track length of the image capturing unit 100 is not limited by the thickness of the electronic device 300. Moreover, the optical path folding element configuration such as the reflective element configuration of the image capturing unit 100 can be similar to, for example, one of the structures shown in FIG. 21 to FIG. 25, which can be referred to foregoing descriptions corresponding to FIG. 21 to FIG. 25, and the details in this regard will not be provided again. In addition, the image capturing unit 100_h_ can determine depth information of an imaged object. In this embodiment, the electronic device 300 includes multiple image capturing units 100, 100_d_, 100_e_, 100_f_, 100_g_ and 100_h_, but the present disclosure is not limited to the number and arrangement of image capturing units.

When a user captures images of an object 306, the light rays converge in the image capturing unit 100, the image capturing unit 100_d_ or the image capturing unit 100_e_ to generate images, and the flash module 301 is activated for light supplement. The focus assist module 302 detects the object distance of the imaged object 306 to achieve fast auto focusing. The image signal processor 303 is configured to optimize the captured image to improve image quality. The light beam emitted from the focus assist module 302 can be either conventional infrared or laser. In addition, the light rays may converge in the image capturing unit 100*f*, 100*g* or 100*h* to generate images. The display module 304 can include a touch screen, and the user is able to interact with the display module 304 and the image software processor 305 having multiple functions to capture images and complete image processing. Alternatively, the user may capture images via a physical button. The image processed by the image software processor 305 can be displayed on the display module 304.

8th Embodiment

Figure 19:
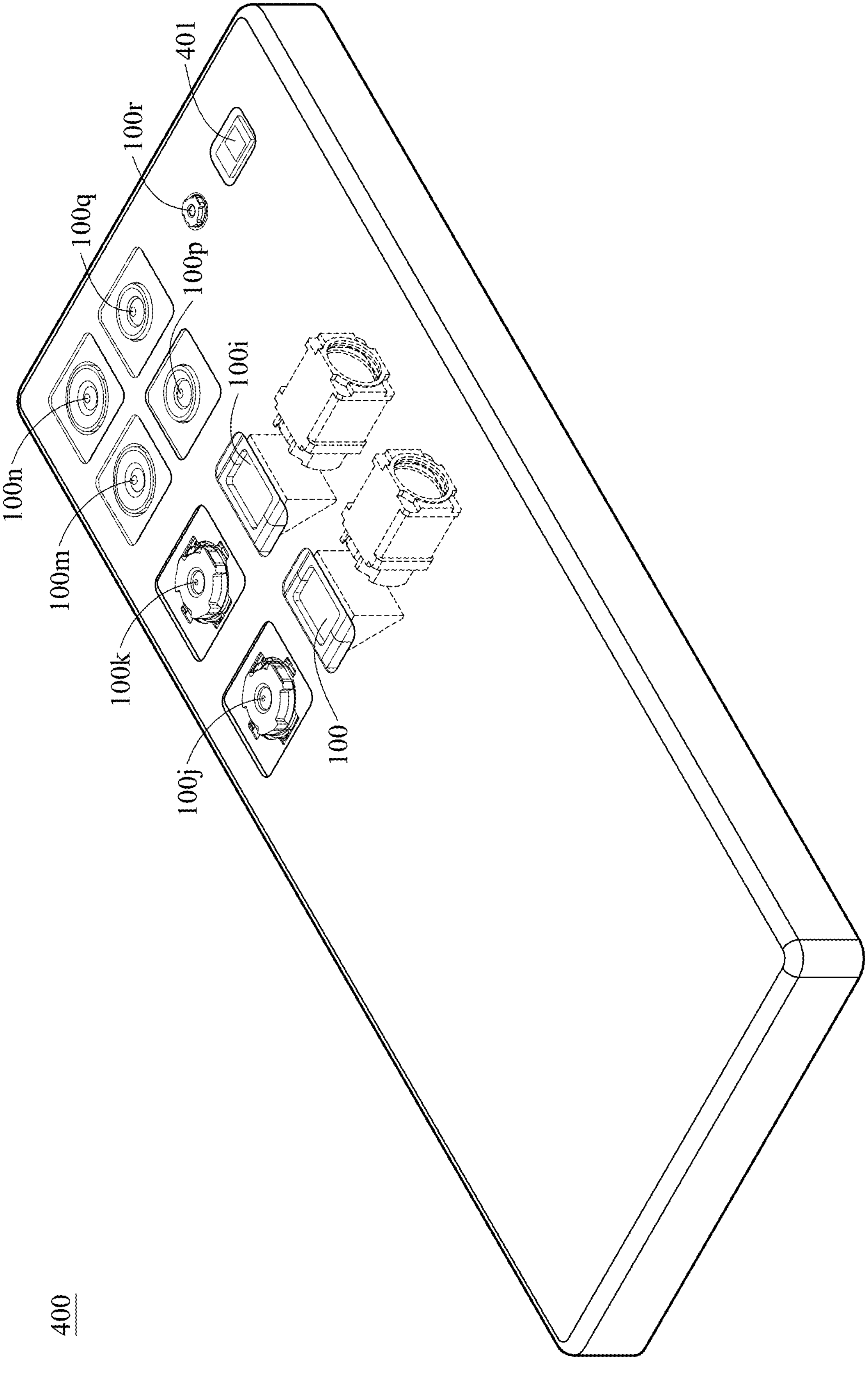
FIG. 19 is one perspective view of an electronic device according to the 8th embodiment of the present disclosure.

FIG. 19 is one perspective view of an electronic device according to the 8th embodiment of the present disclosure.

In this embodiment, an electronic device 400 is a smartphone including the image capturing unit 100 disclosed in the 5th embodiment, an image capturing unit 100*i*, an image capturing unit 100*j*, an image capturing unit 100*k*, an image capturing unit 100*m*, an image capturing unit 100*n*, an image capturing unit 100*p*, an image capturing unit 100*q*, an image capturing unit 100*r*, a flash module 401, a focus assist module, an image signal processor, a display module and an image software processor (not shown). The image capturing units 100, 100*i*, 100*j*, 100*k*, 100*m*, 100*n*, 100*p*, 100*q* and 100*r* are disposed on the same side of the electronic device 400, while the display module is disposed on the opposite side of the electronic device 400. Furthermore, each of the image capturing units 100*i*, 100*j*, 100*k*, 100*m*, 100*n*, 100*p*, 100*q* and 100*r* can include the imaging optical lens assembly of the present disclosure and can have a configuration similar to that of the image capturing unit 100, and the details in this regard will not be provided again.

The image capturing unit 100 is a telephoto image capturing unit, the image capturing unit 100*i* is a telephoto image capturing unit, the image capturing unit 100*j* is a wide-angle image capturing unit, the image capturing unit 100*k* is a wide-angle image capturing unit, the image capturing unit 100*m* is an ultra-wide-angle image capturing unit, the image capturing unit 100*n* is an ultra-wide-angle image capturing unit, the image capturing unit 100*p* is a telephoto image capturing unit, the image capturing unit 100*q* is a telephoto image capturing unit, and the image capturing unit 100*r* is a ToF image capturing unit. In this embodiment, the image capturing units 100, 100*i*, 100*j*, 100*k*, 100*m*, 100*n*, 100*p*, and 100*q* have different fields of view, such that the electronic device 400 can have various magnification ratios so as to meet the requirement of optical zoom functionality. Moreover, half of a maximum field of view of the image capturing unit 100 ranges from 5 degrees to 30 degrees, and half of a maximum field of view of the image capturing unit 100*j* ranges from 30 degrees to 60 degrees. Therefore, it is favorable for having a relatively large zoom ratio of the electronic device 400 to enlarge application ranges thereof. Moreover, each of the image capturing units 100 and 100*i* can be a telephoto image capturing unit having an optical path folding element configuration such as a reflective element configuration. Moreover, the optical path folding element configuration of each of the image capturing unit 100 and 100*i* can be similar to, for example, one of the structures shown in FIG. 21 to FIG. 25, which can be referred to foregoing descriptions corresponding to FIG. 21 to FIG. 25, and the details in this regard will not be provided again. In addition, the image capturing unit 100*r* can determine depth information of the imaged object. In this embodiment, the electronic device 400 includes multiple image capturing units 100, 100*i*, 100*j*, 100*k*, 100*m*, 100*n*, 100*p*, 100*q* and 100*r*, but the present disclosure is not limited to the number and arrangement of image capturing units. When a user captures images of an object, the light rays converge in the image capturing unit 100, 100*i*, 100*j*, 100*k*, 100*m*, 100*n*, 100*p*, 100*q* or 100*r* to generate images, and the flash module 401 is activated for light supplement. Further, the subsequent processes are performed in a manner similar to the abovementioned embodiments, and the details in this regard will not be provided again.

The smartphone in this embodiment is only exemplary for showing the image capturing unit of the present disclosure installed in an electronic device, and the present disclosure is not limited thereto. The image capturing unit can be optionally applied to optical systems with a movable focus. Furthermore, the imaging optical lens assembly of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1A-4D show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical lens assembly comprising two lens groups, the two lens groups being, in order from an object side to an image side along an optical path, a first lens group and a second lens group, each lens element of the two lens groups having an object-side surface facing toward the object side and an image-side surface facing toward the image side, and a total number of lens groups of the imaging optical lens assembly being two;

wherein the imaging optical lens assembly has a first state corresponding to an infinite object distance;

wherein the imaging optical lens assembly at the first state has a long-focal-end first state corresponding to a long focal end and a short-focal-end first state corresponding to a short focal end during a zoom process, and at least one lens group of the two lens groups moves along a direction parallel to an optical axis during the zoom process;

wherein the first lens group has positive refractive power, and at least one of the object-side surface and the image-side surface of at least one lens element of the two lens groups has at least one inflection point in an off-axis region thereof;

wherein half of a maximum field of view of the imaging optical lens assembly at the short-focal-end first state is HFOVSf, half of a maximum field of view of the imaging optical lens assembly at the long-focal-end first state is HFOVLf, an axial distance between the object-side surface of a lens element closest to the object side and an image surface of the imaging optical lens assembly at the short-focal-end first state is TLSf, an axial distance between the object-side surface of the lens element closest to the object side and the image surface of the imaging optical lens assembly at the long-focal-end first state is TLLf, and the following conditions are satisfied:

$$1.20 < HFOVSf/HFOVLf < 2.50; \text{ and}$$

$$0 \leq 10 \times |TLSf - TLLf|/TLSf < 1.00.$$

2. The imaging optical lens assembly of claim 1, wherein half of the maximum field of view of the imaging optical lens assembly at the short-focal-end first state is HFOVSf, half of the maximum field of view of the imaging optical lens assembly at the long-focal-end first state is HFOVLf, and the following condition is satisfied:

$$1.22 < HFOVSf/HFOVLf < 2.00.$$

3. The imaging optical lens assembly of claim 1, wherein the axial distance between the object-side surface of the lens element closest to the object side and the image surface of the imaging optical lens assembly at the short-focal-end first state is TLSf, the axial distance between the object-side surface of the lens element closest to the object side and the image surface of the imaging optical lens assembly at the long-focal-end first state is TLLf, and the following condition is satisfied:

$$0.01 < 10 \times |TLSf - TLLf|/TLSf < 0.50.$$

4. The imaging optical lens assembly of claim 1, wherein an f-number of the imaging optical lens assembly at the short-focal-end first state is FnoSf, an f-number of the imaging optical lens assembly at the long-focal-end first state is FnoLf, and the following conditions are satisfied:

$$1.50 < FnoSf < 4.00; \text{ and}$$

$$1.80 < FnoLf < 4.50.$$

5. The imaging optical lens assembly of claim 1, wherein a lens element of the first lens group closest to the object side has positive refractive power.

6. The imaging optical lens assembly of claim 5, wherein the imaging optical lens assembly comprises six lens elements, and the six lens elements are, in order from the object side to the image side along the optical path, a first lens element, a second lens element, a third lens element, a fourth lens element, a fifth lens element and a sixth lens element; wherein half of the maximum field of view of the imaging optical lens assembly at the short-focal-end first state is HFOVSf, and the following condition is satisfied:

$$8.0 \text{ degrees} < HFOVSf < 25.0 \text{ degrees}.$$

7. The imaging optical lens assembly of claim 6, wherein the first lens group comprises the first lens element, the second lens element and the third lens element, the second lens group comprises the fourth lens element, the fifth lens element and the sixth lens element, the second lens group moves along a direction parallel to the optical axis during the zoom process, and all lens elements of each of the first lens group and the second lens group have no relative movement with respect to each other during the zoom process.

8. The imaging optical lens assembly of claim 7, wherein the object-side surface of the first lens element is convex in a paraxial region thereof, the second lens element has negative refractive power, and the sixth lens element has negative refractive power.

9. The imaging optical lens assembly of claim 7, wherein the image-side surface of the sixth lens element is concave in a paraxial region thereof, and the image-side surface of the sixth lens element has at least one inflection point in an off-axis region thereof.

10. The imaging optical lens assembly of claim 7, wherein the axial distance between the object-side surface of the lens element closest to the object side and the image surface of the imaging optical lens assembly at the short-focal-end first state is TLSf, the axial distance between the object-side surface of the lens element closest to the object side and the image surface of the imaging optical lens assembly at the long-focal-end first state is TLLf, a maximum image height of the imaging optical lens assembly is ImgH, and the following conditions are satisfied:

$$3.00 < TLSf/ImgH < 6.50; \text{ and}$$

$$3.00 < TLLf/ImgH < 6.50.$$

11. The imaging optical lens assembly of claim 7, wherein an axial distance between the object-side surface of a lens element of the first lens group closest to the object side and the image-side surface of a lens element of the first lens group closest to the image side is TG1, an axial distance between the object-side surface of a lens element of the second lens group closest to the object side and the image-side surface of a lens element of the second lens group closest to the image side is TG2, and the following condition is satisfied:

$$0.50 < TG1/TG2 < 1.80.$$

12. The imaging optical lens assembly of claim 1, further comprising a reflective element, wherein the reflective element has at least one reflective surface, the reflective element is located between an imaged object and the first lens group, and the first lens group has no relative movement with respect to the at least one reflective surface during the zoom process.

13. An image capturing unit comprising:

the imaging optical lens assembly of claim 1; and an image sensor disposed on the image surface of the imaging optical lens assembly.

14. An electronic device comprising:

a first image capturing unit comprising the image capturing unit of claim 13, wherein half of a maximum field of view of the first image capturing unit ranges from 5 degrees to 30 degrees; and a second image capturing unit located on a same side of the electronic device as the first image capturing unit, wherein half of a maximum field of view of the second image capturing unit ranges from 30 degrees to 60 degrees.

15. An imaging optical lens assembly comprising two lens groups, the two lens groups being, in order from an object side to an image side along an optical path, a first lens group and a second lens group, each lens element of the two lens groups having an object-side surface facing toward the object side and an image-side surface facing toward the image side, and a total number of lens groups of the imaging optical lens assembly being two;

wherein the imaging optical lens assembly has a first state corresponding to an infinite object distance and a second state corresponding to a finite object distance;

wherein the imaging optical lens assembly performs a focus process to change the first state to the second state thereof during movement of an imaged object from the infinite object distance to the finite object distance;

wherein the imaging optical lens assembly at the first state has a long-focal-end first state corresponding to a long focal end and a short-focal-end first state corresponding to a short focal end during a zoom process, and at least one lens group of the two lens groups moves along a direction parallel to an optical axis during the zoom process;

wherein at least one of the object-side surface and the image-side surface of at least one lens element of the two lens groups has at least one inflection point in an off-axis region thereof;

wherein half of a maximum field of view of the imaging optical lens assembly at the short-focal-end first state is HFOVSf, half of a maximum field of view of the imaging optical lens assembly at the long-focal-end first state is HFOVLf, an axial distance between the object-side surface of a lens element closest to the object side and an image surface of the imaging optical lens assembly at the short-focal-end first state is TLSf, an axial distance between the object-side surface of the lens element closest to the object side and the image surface of the imaging optical lens assembly at the long-focal-end first state is TLLf, and the following conditions are satisfied:

$$1.20 < HFOVSf/HFOVLf < 2.50; \text{ and}$$

$$0 \leq 10 \times |TLSf - TLLf|/TLSf < 1.00.$$

16. The imaging optical lens assembly of claim 15, wherein an axial distance between the object-side surface of the lens element closest to the object side and the image-side surface of a lens element closest to the image side of the imaging optical lens assembly at the short-focal-end first state is TDSf, an axial distance between the object-side surface of the lens element closest to the object side and the image-side surface of the lens element closest to the image side of the imaging optical lens assembly at the long-focal-end first state is TDLf, the axial distance between the object-side surface of the lens element closest to the object side and the image surface of the imaging optical lens assembly at the short-focal-end first state is TLSf, and the following condition is satisfied:

$$0.20 < (TDSf - TDLf)/TLSf < 0.70.$$

17. The imaging optical lens assembly of claim 15, wherein the axial distance between the object-side surface of the lens element closest to the object side and the image surface of the imaging optical lens assembly at the short-focal-end first state is TLSf, the axial distance between the object-side surface of the lens element closest to the object side and the image surface of the imaging optical lens assembly at the long-focal-end first state is TLLf, and the following condition is satisfied:

$$0.01 < 10 \times |TLSf - TLLf|/TLSf < 0.30.$$

18. The imaging optical lens assembly of claim 15, wherein a focal length of the imaging optical lens assembly at the short-focal-end first state is fSf, a focal length of the first lens group is fG1, and the following condition is satisfied:

$$0.30 < fSf/fG1 < 2.00.$$

19. The imaging optical lens assembly of claim 15, wherein the imaging optical lens assembly at the second state has a long-focal-end second state corresponding to the long focal end and a short-focal-end second state corresponding to the short focal end during the zoom process, an f-number of the imaging optical lens assembly at the short-focal-end first state is FnoSf, an f-number of the imaging optical lens assembly at the short-focal-end second state is FnoSn, an f-number of the imaging optical lens assembly at the long-focal-end first state is FnoLf, an f-number of the imaging optical lens assembly at the long-focal-end second state is FnoLn, and the following conditions are satisfied:

$$0.01 < 10 \times |FnoSn - FnoSf| < 1.00; \text{ and}$$

$$0.01 < 10 \times |FnoLn - FnoLf| < 1.00.$$

20. The imaging optical lens assembly of claim 15, wherein the imaging optical lens assembly at the second state has a long-focal-end second state corresponding to the long focal end and a short-focal-end second state corresponding to the short focal end during the zoom process, the axial distance between the object-side surface of the lens element closest to the object side and the image surface of the imaging optical lens assembly at the short-focal-end first state is TLSf, an axial distance between the object-side surface of the lens element closest to the object side and the image surface of the imaging optical lens assembly at the short-focal-end second state is TLSn, the axial distance between the object-side surface of the lens element closest to the object side and the image surface of the imaging optical lens assembly at the long-focal-end first state is TLLf, an axial distance between the object-side surface of the lens element closest to the object side and the image surface of the imaging optical lens assembly at the long-focal-end second state is TLLn, a focal length of the imaging optical lens assembly at the short-focal-end first state is fSf, a focal length of the imaging optical lens assembly at the short-focal-end second state is fSn, a focal length of the imaging optical lens assembly at the long-focal-end first state is fLf, a focal length of the imaging optical lens assembly at the long-focal-end second state is fLn, and the following conditions are satisfied:

$$0.10 < 10\times(TLSn/fSn - TLSf/fSf) < 0.80; \text{ and}$$

$$0.10 < 10\times(TLLn/fLn - TLLf/fLf) < 0.80.$$

21. The imaging optical lens assembly of claim 15, wherein the imaging optical lens assembly comprises six lens elements, the six lens elements are, in order from the object side to the image side along the optical path, a first lens element, a second lens element, a third lens element, a fourth lens element, a fifth lens element and a sixth lens element, the first lens group comprises the first lens element, the second lens element and the third lens element, and the second lens group comprises the fourth lens element, the fifth lens element and the sixth lens element.

22. The imaging optical lens assembly of claim 21, wherein a central thickness of the first lens element is CT1, a central thickness of the second lens element is CT2, a central thickness of the third lens element is CT3, an axial distance between the first lens element and the second lens element is T12, an axial distance between the second lens element and the third lens element is T23, and the following condition is satisfied:

$$1.00 < (CT1 + CT2 + CT3)/(T12 + T23) < 4.50.$$

23. The imaging optical lens assembly of claim 21, wherein a central thickness of the first lens element is CT1, a central thickness of the sixth lens element is CT6, and the following condition is satisfied:

$$2.50 < CT1/CT6 < 8.00.$$

24. The imaging optical lens assembly of claim 21, wherein a focal length of the imaging optical lens assembly at the short-focal-end first state is fSf, a focal length of the second lens element is f2, a focal length of the fourth lens element is f4, a focal length of the fifth lens element is f5, and the following condition is satisfied:

$$0.01 < (|fSf/f4| + |fSf/f5|)/|fSf/f2| < 1.50.$$

25. The imaging optical lens assembly of claim 15, wherein the imaging optical lens assembly at the second state has a long-focal-end second state corresponding to the long focal end and a short-focal-end second state corresponding to the short focal end during the zoom process, the image surface moves along a direction parallel to the optical axis during the zoom process or the focus process, a displacement of the image surface during changing of the imaging optical lens assembly from the short-focal-end first state to the short-focal-end second state is DImgS, and the following condition is satisfied:

$$0.050 \text{ mm} < DImgS < 0.800 \text{ mm}.$$

26. The imaging optical lens assembly of claim 15, wherein the imaging optical lens assembly at the second state has a long-focal-end second state corresponding to the long focal end and a short-focal-end second state corresponding to the short focal end during the zoom process, the image surface moves along a direction parallel to the optical axis during the zoom process or the focus process, a displacement of the image surface during changing of the imaging optical lens assembly from the short-focal-end first state to the short-focal-end second state is DImgS, a minimum value among central thicknesses of all lens elements of the imaging optical lens assembly is CTmin, and the following condition is satisfied:

$$0.20 < DImgS/CTmin < 1.50.$$

27. The imaging optical lens assembly of claim 15, further comprising a reflective element, wherein the reflective element has at least one reflective surface, the reflective element is located between the imaged object and the first lens group, and the first lens group has no relative movement with respect to the at least one reflective surface during the zoom process.

28. The imaging optical lens assembly of claim 15, wherein half of the maximum field of view of the imaging optical lens assembly at the short-focal-end first state is HFOVSf, half of the maximum field of view of the imaging optical lens assembly at the long-focal-end first state is HFOVLf, the axial distance between the object-side surface of the lens element closest to the object side and the image surface of the imaging optical lens assembly at the short-focal-end first state is TLSf, the axial distance between the object-side surface of the lens element closest to the object side and the image surface of the imaging optical lens assembly at the long-focal-end first state is TLLf, and the following conditions are satisfied:

$$1.28 \leq HFOVSf/ \leq 1.52; \text{ and}$$

$$0.02 \leq 10\times|TLSf - TLLf|/TLSf \leq 0.15.$$

* * * * *